US009215957B2

(12) United States Patent
Cohen et al.

(10) Patent No.: US 9,215,957 B2
(45) Date of Patent: Dec. 22, 2015

(54) AUTONOMOUS ROBOT AUTO-DOCKING AND ENERGY MANAGEMENT SYSTEMS AND METHODS

(71) Applicant: iRobot Corporation, Bedford, MA (US)

(72) Inventors: David A. Cohen, Brookline, MA (US); Daniel N. Ozick, Newton, MA (US); Clara Vu, Cambridge, MA (US); James Lynch, Georgetown, MA (US); Philip R. Mass, Portland, OR (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 14/475,984

(22) Filed: Sep. 3, 2014

(65) Prior Publication Data

US 2015/0057800 A1 Feb. 26, 2015

Related U.S. Application Data

(63) Continuation of application No. 13/291,633, filed on Nov. 8, 2011, now Pat. No. 8,854,001, which is a continuation of application No. 11/648,230, filed on Dec. 29, 2006, now Pat. No. 8,749,196, which is a continuation of application No. 10/762,219, filed on Jan. 21, 2004, now Pat. No. 7,332,890.

(51) Int. Cl.
*H02J 7/00* (2006.01)
*A47L 9/00* (2006.01)
(Continued)

(52) U.S. Cl.
CPC ............... *A47L 9/0063* (2013.01); *A47L 9/009* (2013.01); *A47L 9/2805* (2013.01); *A47L 9/2852* (2013.01);
(Continued)

(58) Field of Classification Search
CPC ............. H02J 7/0021; A47L 2201/002; A47L 2201/04
USPC .......... 320/104, 107, 109, 134; 700/258, 262; 901/46; 180/167
See application file for complete search history.

(56) References Cited

U.S. PATENT DOCUMENTS

| 1,755,054 A | 4/1930 | Darst |
| 1,780,221 A | 11/1930 | Buchmann |

(Continued)

FOREIGN PATENT DOCUMENTS

| DE | 2128842 C3 | 12/1980 |
| DE | 3317376 C2 | 12/1987 |

(Continued)

OTHER PUBLICATIONS

Andersen et al., "Landmark based navigation strategies," SPIE Conference on Mobile Robots XIII, SPIE vol. 3525, pp. 170-181, Jan. 8, 1999.

(Continued)

*Primary Examiner* — Edward Tso
*Assistant Examiner* — Aaron Piggush
(74) *Attorney, Agent, or Firm* — Fish & Richardson P.C.

(57) ABSTRACT

A method for energy management in a robotic device includes providing a base station for mating with the robotic device, determining a quantity of energy stored in an energy storage unit of the robotic device, and performing a predetermined task based at least in part on the quantity of energy stored. Also disclosed are systems for emitting avoidance signals to prevent inadvertent contact between the robot and the base station, and systems for emitting homing signals to allow the robotic device to accurately dock with the base station.

13 Claims, 12 Drawing Sheets

(51) Int. Cl.
*A47L 9/28* (2006.01)
*G05D 1/02* (2006.01)
*H02J 7/04* (2006.01)
*G01S 1/16* (2006.01)
*G01S 1/70* (2006.01)

(52) U.S. Cl.
CPC ............ *A47L 9/2857* (2013.01); *A47L 9/2873* (2013.01); *A47L 9/2889* (2013.01); *A47L 9/2894* (2013.01); *G01S 1/16* (2013.01); *G01S 1/70* (2013.01); *G05D 1/0225* (2013.01); *G05D 1/0242* (2013.01); *H02J 7/0036* (2013.01); *H02J 7/0044* (2013.01); *H02J 7/045* (2013.01); *A47L 2201/02* (2013.01); *A47L 2201/022* (2013.01); *G05D 1/0219* (2013.01); *G05D 1/0227* (2013.01); *G05D 2201/0203* (2013.01); *G05D 2201/0208* (2013.01); *G05D 2201/0215* (2013.01); *H02J 7/0052* (2013.01)

(56) References Cited

U.S. PATENT DOCUMENTS

| | | | |
|---|---|---|---|
| 1,970,302 A | 8/1934 | Gerhardt | |
| 2,136,324 A | 11/1938 | John | |
| 2,302,111 A | 11/1942 | Dow et al. | |
| 2,353,621 A | 7/1944 | Sav et al. | |
| 2,770,825 A | 11/1956 | Pullen | |
| 2,930,055 A | 3/1960 | Fallen et al. | |
| 3,119,369 A | 1/1964 | Harland et al. | |
| 3,166,138 A | 1/1965 | Dunn | |
| 3,333,564 A | 8/1967 | Waters | |
| 3,375,375 A | 3/1968 | Robert et al. | |
| 3,381,652 A | 5/1968 | Schaefer et al. | |
| 3,457,575 A | 7/1969 | Bienek | |
| 3,550,714 A | 12/1970 | Bellinger | |
| 3,569,727 A | 3/1971 | Aggarwal et al. | |
| 3,649,981 A | 3/1972 | Woodworth | |
| 3,674,316 A | 7/1972 | De Bray | |
| 3,678,882 A | 7/1972 | Kinsella | |
| 3,690,559 A | 9/1972 | Rudloff | |
| 3,744,586 A | 7/1973 | Leinauer | |
| 3,756,667 A | 9/1973 | Bombardier et al. | |
| 3,809,004 A | 5/1974 | Leonheart | |
| 3,816,004 A | 6/1974 | Bignardi | |
| 3,845,831 A | 11/1974 | James | |
| RE28,268 E | 12/1974 | Autrand | |
| 3,851,349 A | 12/1974 | Lowder | |
| 3,853,086 A | 12/1974 | Asplund | |
| 3,863,285 A | 2/1975 | Hukuba | |
| 3,888,181 A | 6/1975 | Kups | |
| 3,937,174 A | 2/1976 | Haaga | |
| 3,952,361 A | 4/1976 | Wilkins | |
| 3,989,311 A | 11/1976 | Debrey | |
| 3,989,931 A | 11/1976 | Phillips | |
| 4,004,313 A | 1/1977 | Capra | |
| 4,012,681 A | 3/1977 | Finger et al. | |
| 4,070,170 A | 1/1978 | Leinfelt | |
| 4,099,284 A | 7/1978 | Shinozaki et al. | |
| 4,119,900 A | 10/1978 | Kremnitz | |
| 4,175,589 A | 11/1979 | Nakamura et al. | |
| 4,175,892 A | 11/1979 | De bray | |
| 4,196,727 A | 4/1980 | Verkaart et al. | |
| 4,198,727 A | 4/1980 | Farmer | |
| 4,199,838 A | 4/1980 | Simonsson | |
| 4,209,254 A | 6/1980 | Reymond et al. | |
| D258,901 S | 4/1981 | Keyworth | |
| 4,297,578 A | 10/1981 | Carter | |
| 4,305,234 A | 12/1981 | Pichelman | |
| 4,306,329 A | 12/1981 | Yokoi | |
| 4,309,758 A | 1/1982 | Halsall et al. | |
| 4,328,545 A | 5/1982 | Halsall et al. | |
| 4,367,403 A | 1/1983 | Miller | |
| 4,369,543 A | 1/1983 | Chen et al. | |
| 4,401,909 A | 8/1983 | Gorsek | |
| 4,416,033 A | 11/1983 | Specht | |
| 4,445,245 A | 5/1984 | Lu | |
| 4,465,370 A | 8/1984 | Yuasa et al. | |
| 4,477,998 A | 10/1984 | You | |
| 4,481,692 A | 11/1984 | Kurz | |
| 4,482,960 A | 11/1984 | Pryor | |
| 4,492,058 A | 1/1985 | Goldfarb et al. | |
| 4,513,469 A | 4/1985 | Godfrey et al. | |
| D278,732 S | 5/1985 | Ohkado | |
| 4,518,437 A | 5/1985 | Sommer | |
| 4,534,637 A | 8/1985 | Suzuki et al. | |
| 4,556,313 A | 12/1985 | Miller et al. | |
| 4,575,211 A | 3/1986 | Matsumura et al. | |
| 4,580,311 A | 4/1986 | Kurz | |
| 4,601,082 A | 7/1986 | Kurz | |
| 4,618,213 A | 10/1986 | Chen | |
| 4,620,285 A | 10/1986 | Perdue | |
| 4,624,026 A | 11/1986 | Olson et al. | |
| 4,626,995 A | 12/1986 | Lofgren et al. | |
| 4,628,454 A | 12/1986 | Ito | |
| 4,638,445 A | 1/1987 | Mattaboni | |
| 4,644,156 A | 2/1987 | Takahashi et al. | |
| 4,649,504 A | 3/1987 | Krouglicof et al. | |
| 4,652,917 A | 3/1987 | Miller | |
| 4,654,492 A | 3/1987 | Koerner et al. | |
| 4,654,924 A | 4/1987 | Getz et al. | |
| 4,660,969 A | 4/1987 | Sorimachi et al. | |
| 4,662,854 A | 5/1987 | Fang | |
| 4,674,048 A | 6/1987 | Okumura | |
| 4,679,152 A * | 7/1987 | Perdue .................. | B25J 19/005 180/167 |
| 4,680,827 A | 7/1987 | Hummel | |
| 4,696,074 A | 9/1987 | Cavalli | |
| D292,223 S | 10/1987 | Trumbull | |
| 4,700,301 A | 10/1987 | Dyke | |
| 4,700,427 A | 10/1987 | Knepper | |
| 4,703,820 A | 11/1987 | Reinaud | |
| 4,709,773 A | 12/1987 | Clement et al. | |
| 4,710,020 A | 12/1987 | Maddox et al. | |
| 4,712,740 A | 12/1987 | Duncan et al. | |
| 4,716,621 A | 1/1988 | Zoni | |
| 4,728,801 A | 3/1988 | O'Connor | |
| 4,733,343 A | 3/1988 | Yoneda et al. | |
| 4,733,430 A | 3/1988 | Westergren | |
| 4,733,431 A | 3/1988 | Martin | |
| 4,735,136 A | 4/1988 | Lee et al. | |
| 4,735,138 A | 4/1988 | Gawler et al. | |
| 4,748,336 A | 5/1988 | Fujie et al. | |
| 4,748,833 A | 6/1988 | Nagasawa | |
| 4,756,049 A | 7/1988 | Uehara | |
| 4,767,213 A | 8/1988 | Hummel | |
| 4,769,700 A | 9/1988 | Pryor | |
| 4,777,416 A | 10/1988 | George et al. | |
| D298,766 S | 11/1988 | Tanno et al. | |
| 4,782,550 A | 11/1988 | Jacobs | |
| 4,796,198 A | 1/1989 | Boultinghouse et al. | |
| 4,806,751 A | 2/1989 | Abe et al. | |
| 4,811,228 A | 3/1989 | Hyyppa | |
| 4,813,906 A | 3/1989 | Matsuyama et al. | |
| 4,815,157 A | 3/1989 | Tsuchiya | |
| 4,817,000 A | 3/1989 | Eberhardt | |
| 4,818,875 A | 4/1989 | Weiner | |
| 4,829,442 A | 5/1989 | Kadonoff et al. | |
| 4,829,626 A | 5/1989 | Harkonen et al. | |
| 4,832,098 A | 5/1989 | Palinkas et al. | |
| 4,851,661 A | 7/1989 | Everett | |
| 4,854,000 A | 8/1989 | Takimoto | |
| 4,854,006 A | 8/1989 | Nishimura et al. | |
| 4,855,915 A | 8/1989 | Dallaire | |
| 4,857,912 A | 8/1989 | Everett et al. | |
| 4,858,132 A | 8/1989 | Holmquist | |
| 4,867,570 A | 9/1989 | Sorimachi et al. | |
| 4,880,474 A | 11/1989 | Koharagi et al. | |
| 4,887,415 A | 12/1989 | Martin | |
| 4,891,762 A | 1/1990 | Chotiros | |
| 4,893,025 A | 1/1990 | Lee | |
| 4,901,394 A | 2/1990 | Nakamura et al. | |
| 4,905,151 A | 2/1990 | Weiman et al. | |
| 4,909,972 A | 3/1990 | Britz | |

(56) References Cited

U.S. PATENT DOCUMENTS

| | | |
|---|---|---|
| 4,912,643 A | 3/1990 | Beirne |
| 4,918,441 A | 4/1990 | Bohman |
| 4,919,224 A | 4/1990 | Shyu et al. |
| 4,919,489 A | 4/1990 | Kopsco |
| 4,920,060 A | 4/1990 | Parrent et al. |
| 4,920,605 A | 5/1990 | Takashima |
| 4,933,864 A | 6/1990 | Evans et al. |
| 4,937,912 A | 7/1990 | Kurz |
| 4,953,253 A | 9/1990 | Fukuda et al. |
| 4,954,962 A | 9/1990 | Evans et al. |
| 4,955,714 A | 9/1990 | Stotler et al. |
| 4,956,891 A | 9/1990 | Wulff |
| 4,961,303 A | 10/1990 | McCarty et al. |
| 4,961,304 A | 10/1990 | Ovsborn et al. |
| 4,962,453 A | 10/1990 | Pong et al. |
| 4,967,862 A | 11/1990 | Pong et al. |
| 4,971,591 A | 11/1990 | Raviv et al. |
| 4,973,912 A | 11/1990 | Kaminski et al. |
| 4,974,283 A | 12/1990 | Holsten et al. |
| 4,977,618 A | 12/1990 | Allen |
| 4,977,639 A | 12/1990 | Takahashi et al. |
| 4,986,663 A | 1/1991 | Cecchi et al. |
| 5,001,635 A | 3/1991 | Yasutomi et al. |
| 5,002,145 A | 3/1991 | Wakaumi et al. |
| 5,012,886 A | 5/1991 | Jonas et al. |
| 5,018,240 A | 5/1991 | Holman |
| 5,020,186 A | 6/1991 | Lessig et al. |
| 5,022,812 A | 6/1991 | Coughlan et al. |
| 5,023,788 A | 6/1991 | Kitazume et al. |
| 5,024,529 A | 6/1991 | Svetkoff et al. |
| D318,500 S | 7/1991 | Malewicki et al. |
| 5,032,775 A | 7/1991 | Mizuno et al. |
| 5,033,151 A | 7/1991 | Kraft et al. |
| 5,033,291 A | 7/1991 | Podoloff et al. |
| 5,040,116 A | 8/1991 | Evans et al. |
| 5,045,769 A | 9/1991 | Everett |
| 5,049,802 A | 9/1991 | Mintus et al. |
| 5,051,906 A | 9/1991 | Evans et al. |
| 5,062,819 A | 11/1991 | Mallory |
| 5,070,567 A | 12/1991 | Holland |
| 5,084,934 A | 2/1992 | Lessig et al. |
| 5,086,535 A | 2/1992 | Grossmeyer et al. |
| 5,090,321 A | 2/1992 | Abouav |
| 5,093,955 A | 3/1992 | Blehert et al. |
| 5,094,311 A | 3/1992 | Akeel |
| 5,098,262 A | 3/1992 | Wecker et al. |
| 5,105,502 A | 4/1992 | Takashima |
| 5,105,550 A | 4/1992 | Shenoha |
| 5,109,566 A | 5/1992 | Kobayashi et al. |
| 5,111,401 A | 5/1992 | Everett, Jr. et al. |
| 5,115,538 A | 5/1992 | Cochran et al. |
| 5,127,128 A | 7/1992 | Lee |
| 5,136,675 A | 8/1992 | Hodson |
| 5,136,750 A | 8/1992 | Takashima et al. |
| 5,142,985 A | 9/1992 | Stearns et al. |
| 5,144,471 A | 9/1992 | Takanashi et al. |
| 5,144,714 A | 9/1992 | Mori et al. |
| 5,144,715 A | 9/1992 | Matsuyo et al. |
| 5,152,028 A | 10/1992 | Hirano |
| 5,152,202 A | 10/1992 | Strauss |
| 5,154,617 A | 10/1992 | Suman et al. |
| 5,155,684 A | 10/1992 | Burke et al. |
| 5,163,202 A | 11/1992 | Kawakami et al. |
| 5,163,320 A | 11/1992 | Goshima et al. |
| 5,164,579 A | 11/1992 | Pryor et al. |
| 5,165,064 A | 11/1992 | Mattaboni |
| 5,170,352 A | 12/1992 | McTamaney et al. |
| 5,173,881 A | 12/1992 | Sindle |
| 5,182,833 A | 2/1993 | Yamaguchi et al. |
| 5,187,662 A | 2/1993 | Kamimura et al. |
| 5,202,742 A | 4/1993 | Frank et al. |
| 5,204,814 A | 4/1993 | Noonan et al. |
| 5,206,500 A | 4/1993 | Decker et al. |
| 5,208,521 A | 5/1993 | Aoyama |
| 5,216,777 A | 6/1993 | Moro et al. |
| 5,222,786 A | 6/1993 | Sovis et al. |
| 5,227,985 A | 7/1993 | DeMenthon |
| 5,233,682 A | 8/1993 | Abe et al. |
| 5,239,720 A | 8/1993 | Wood et al. |
| 5,251,358 A | 10/1993 | Moro et al. |
| 5,261,139 A | 11/1993 | Lewis |
| 5,276,618 A | 1/1994 | Everett |
| 5,276,939 A | 1/1994 | Uenishi |
| 5,277,064 A | 1/1994 | Knigga et al. |
| 5,279,672 A | 1/1994 | Betker et al. |
| 5,284,452 A | 2/1994 | Corona |
| 5,284,522 A | 2/1994 | Kobayashi et al. |
| 5,293,955 A | 3/1994 | Lee |
| D345,707 S | 4/1994 | Alister |
| 5,303,448 A | 4/1994 | Hennessey et al. |
| 5,307,273 A | 4/1994 | Oh et al. |
| 5,309,592 A | 5/1994 | Hiratsuka |
| 5,310,379 A | 5/1994 | Hippely et al. |
| 5,315,227 A | 5/1994 | Pierson et al. |
| 5,319,827 A | 6/1994 | Yang |
| 5,319,828 A | 6/1994 | Waldhauser et al. |
| 5,321,614 A | 6/1994 | Ashworth |
| 5,323,483 A | 6/1994 | Baeg |
| 5,324,948 A | 6/1994 | Dudar et al. |
| 5,331,713 A | 7/1994 | Tipton |
| 5,341,186 A | 8/1994 | Kato |
| 5,341,540 A | 8/1994 | Soupert et al. |
| 5,341,549 A | 8/1994 | Wirtz et al. |
| 5,345,649 A | 9/1994 | Whitlow |
| 5,352,901 A | 10/1994 | Poorman |
| 5,353,224 A | 10/1994 | Lee et al. |
| 5,363,305 A | 11/1994 | Cox et al. |
| 5,363,935 A | 11/1994 | Schempf et al. |
| 5,369,347 A | 11/1994 | Yoo |
| 5,369,838 A | 12/1994 | Wood et al. |
| 5,386,862 A | 2/1995 | Glover et al. |
| 5,399,951 A | 3/1995 | Lavallee et al. |
| 5,400,244 A | 3/1995 | Watanabe et al. |
| 5,404,612 A | 4/1995 | Ishikawa |
| 5,410,479 A | 4/1995 | Coker |
| 5,435,405 A | 7/1995 | Schempf et al. |
| 5,440,216 A | 8/1995 | Kim |
| 5,442,358 A | 8/1995 | Keeler et al. |
| 5,444,965 A | 8/1995 | Colens |
| 5,446,356 A | 8/1995 | Kim |
| 5,446,445 A | 8/1995 | Bloomfield et al. |
| 5,451,135 A | 9/1995 | Schempf et al. |
| 5,454,129 A | 10/1995 | Kell |
| 5,455,982 A | 10/1995 | Armstrong et al. |
| 5,465,525 A | 11/1995 | Mifune et al. |
| 5,465,619 A | 11/1995 | Sotack et al. |
| 5,467,273 A | 11/1995 | Faibish et al. |
| 5,471,560 A | 11/1995 | Allard et al. |
| 5,491,670 A | 2/1996 | Weber |
| 5,497,529 A | 3/1996 | Boesi |
| 5,498,948 A | 3/1996 | Bruni et al. |
| 5,502,638 A | 3/1996 | Takenaka |
| 5,505,072 A | 4/1996 | Oreper |
| 5,507,067 A | 4/1996 | Hoekstra et al. |
| 5,510,893 A | 4/1996 | Suzuki |
| 5,511,147 A | 4/1996 | Abdel-Malek |
| 5,515,572 A | 5/1996 | Hoekstra et al. |
| 5,534,762 A | 7/1996 | Kim |
| 5,535,476 A | 7/1996 | Kresse et al. |
| 5,537,017 A | 7/1996 | Feiten et al. |
| 5,537,711 A | 7/1996 | Tseng |
| 5,539,953 A | 7/1996 | Kurz |
| 5,542,146 A | 8/1996 | Hoekstra et al. |
| 5,542,148 A | 8/1996 | Young |
| 5,546,631 A | 8/1996 | Chambon |
| 5,548,511 A | 8/1996 | Bancroft |
| 5,551,119 A | 9/1996 | Wörwag |
| 5,551,525 A | 9/1996 | Pack et al. |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| D375,592 S | 11/1996 | Ljunggren |
| 5,608,306 A | 3/1997 | Rybeck et al. |

(56) References Cited

U.S. PATENT DOCUMENTS

| | | | |
|---|---|---|---|
| 5,608,894 A | 3/1997 | Kawakami et al. | |
| 5,608,944 A | 3/1997 | Gordon | |
| 5,610,488 A | 3/1997 | Miyazawa | |
| 5,611,106 A | 3/1997 | Wulff | |
| 5,611,108 A | 3/1997 | Knowlton et al. | |
| 5,613,261 A | 3/1997 | Kawakami et al. | |
| 5,613,269 A | 3/1997 | Miwa | |
| 5,621,291 A | 4/1997 | Lee | |
| 5,622,236 A | 4/1997 | Azumi et al. | |
| 5,634,237 A | 6/1997 | Paranjpe | |
| 5,634,239 A | 6/1997 | Tuvin et al. | |
| 5,636,402 A | 6/1997 | Kubo et al. | |
| 5,642,299 A | 6/1997 | Hardin et al. | |
| 5,646,494 A * | 7/1997 | Han | A47L 11/4011 318/587 |
| 5,647,554 A | 7/1997 | Ikegami et al. | |
| 5,650,702 A | 7/1997 | Azumi | |
| 5,652,489 A | 7/1997 | Kawakami | |
| 5,682,313 A | 10/1997 | Edlund et al. | |
| 5,682,839 A | 11/1997 | Grimsley et al. | |
| 5,696,675 A | 12/1997 | Nakamura et al. | |
| 5,698,861 A | 12/1997 | Oh | |
| 5,709,007 A | 1/1998 | Chiang | |
| 5,710,506 A | 1/1998 | Broell et al. | |
| 5,714,119 A | 2/1998 | Kawagoe et al. | |
| 5,717,169 A | 2/1998 | Liang et al. | |
| 5,717,484 A | 2/1998 | Hamaguchi et al. | |
| 5,720,077 A | 2/1998 | Nakamura et al. | |
| 5,732,401 A | 3/1998 | Conway | |
| 5,735,017 A | 4/1998 | Barnes et al. | |
| 5,735,959 A | 4/1998 | Kubo et al. | |
| 5,742,975 A | 4/1998 | Knowlton et al. | |
| 5,745,235 A | 4/1998 | Vercammen et al. | |
| 5,752,871 A | 5/1998 | Tsuzuki | |
| 5,756,904 A | 5/1998 | Oreper et al. | |
| 5,761,762 A | 6/1998 | Kubo | |
| 5,764,888 A | 6/1998 | Bolan et al. | |
| 5,767,437 A | 6/1998 | Rogers | |
| 5,767,960 A | 6/1998 | Orman | |
| 5,770,936 A | 6/1998 | Hirai et al. | |
| 5,777,596 A | 7/1998 | Herbert | |
| 5,778,486 A | 7/1998 | Kim | |
| 5,781,697 A | 7/1998 | Jeong | |
| 5,781,960 A | 7/1998 | Kilstrom et al. | |
| 5,784,755 A | 7/1998 | Karr et al. | |
| 5,786,602 A | 7/1998 | Pryor et al. | |
| 5,787,545 A | 8/1998 | Colens | |
| 5,793,900 A | 8/1998 | Nourbakhsh et al. | |
| 5,794,297 A | 8/1998 | Muta | |
| 5,802,665 A | 9/1998 | Knowlton et al. | |
| 5,812,267 A | 9/1998 | Everett et al. | |
| 5,814,808 A | 9/1998 | Takada et al. | |
| 5,815,880 A | 10/1998 | Nakanishi | |
| 5,815,884 A | 10/1998 | Imamura et al. | |
| 5,819,008 A | 10/1998 | Asama et al. | |
| 5,819,360 A | 10/1998 | Fujii | |
| 5,819,936 A | 10/1998 | Saveliev et al. | |
| 5,820,821 A | 10/1998 | Kawagoe et al. | |
| 5,821,730 A | 10/1998 | Drapkin | |
| 5,825,981 A | 10/1998 | Matsuda | |
| 5,828,770 A | 10/1998 | Leis et al. | |
| 5,831,597 A | 11/1998 | West et al. | |
| 5,836,045 A | 11/1998 | Anthony et al. | |
| 5,839,156 A | 11/1998 | Park et al. | |
| 5,839,532 A | 11/1998 | Yoshiji et al. | |
| 5,841,259 A | 11/1998 | Kim et al. | |
| 5,867,800 A | 2/1999 | Leif | |
| 5,867,861 A | 2/1999 | Kasen et al. | |
| 5,869,910 A | 2/1999 | Colens | |
| 5,894,621 A | 4/1999 | Kubo | |
| 5,896,611 A | 4/1999 | Haaga | |
| 5,903,124 A | 5/1999 | Kawakami | |
| 5,905,209 A | 5/1999 | Oreper | |
| 5,907,886 A | 6/1999 | Buscher | |
| 5,910,700 A | 6/1999 | Crotzer | |
| 5,911,260 A | 6/1999 | Suzuki | |
| 5,916,008 A | 6/1999 | Wong | |
| 5,924,167 A | 7/1999 | Wright et al. | |
| 5,926,909 A | 7/1999 | McGee | |
| 5,933,102 A | 8/1999 | Miller et al. | |
| 5,933,913 A | 8/1999 | Wright et al. | |
| 5,935,179 A | 8/1999 | Kleiner et al. | |
| 5,935,333 A | 8/1999 | Davis | |
| 5,940,346 A | 8/1999 | Sadowsky et al. | |
| 5,940,927 A | 8/1999 | Haegermarck et al. | |
| 5,940,930 A | 8/1999 | Oh et al. | |
| 5,942,869 A | 8/1999 | Katou et al. | |
| 5,943,730 A | 8/1999 | Boomgaarden | |
| 5,943,733 A | 8/1999 | Tagliaferri | |
| 5,943,933 A | 8/1999 | Evans et al. | |
| 5,947,225 A | 9/1999 | Kawakami et al. | |
| 5,950,408 A | 9/1999 | Schaedler | |
| 5,959,423 A | 9/1999 | Nakanishi et al. | |
| 5,968,281 A | 10/1999 | Wright et al. | |
| 5,974,348 A | 10/1999 | Rocks | |
| 5,974,365 A | 10/1999 | Mitchell | |
| 5,983,448 A | 11/1999 | Wright et al. | |
| 5,984,880 A | 11/1999 | Lander et al. | |
| 5,987,383 A | 11/1999 | Keller et al. | |
| 5,989,700 A | 11/1999 | Krivopal | |
| 5,991,951 A | 11/1999 | Kubo et al. | |
| 5,995,883 A | 11/1999 | Nishikado | |
| 5,995,884 A * | 11/1999 | Allen et al. | G05D 1/0025 180/167 |
| 5,996,167 A | 12/1999 | Close | |
| 5,998,953 A | 12/1999 | Nakamura et al. | |
| 5,998,971 A | 12/1999 | Corbridge | |
| 6,000,088 A | 12/1999 | Wright et al. | |
| 6,009,358 A | 12/1999 | Angott et al. | |
| 6,012,618 A | 1/2000 | Matsuo et al. | |
| 6,021,545 A | 2/2000 | Delgado et al. | |
| 6,023,813 A | 2/2000 | Thatcher et al. | |
| 6,023,814 A | 2/2000 | Imamura | |
| 6,025,687 A | 2/2000 | Himeda et al. | |
| 6,026,539 A | 2/2000 | Mouw et al. | |
| 6,030,464 A | 2/2000 | Azevedo | |
| 6,030,465 A | 2/2000 | Marcussen et al. | |
| 6,032,327 A | 3/2000 | Oka et al. | |
| 6,032,542 A | 3/2000 | Warnick et al. | |
| 6,036,572 A | 3/2000 | Sze | |
| 6,038,501 A | 3/2000 | Kawakami | |
| 6,040,669 A | 3/2000 | Hog | |
| 6,041,471 A | 3/2000 | Charky et al. | |
| 6,041,472 A | 3/2000 | Kasen et al. | |
| 6,046,800 A | 4/2000 | Ohtomo et al. | |
| 6,049,620 A | 4/2000 | Dickinson et al. | |
| 6,050,648 A | 4/2000 | Keleny | |
| 6,052,821 A | 4/2000 | Chouly et al. | |
| 6,055,042 A | 4/2000 | Sarangapani | |
| 6,055,702 A | 5/2000 | Imamura et al. | |
| 6,061,868 A | 5/2000 | Moritsch et al. | |
| 6,065,182 A | 5/2000 | Wright et al. | |
| 6,070,290 A | 6/2000 | Schwarze et al. | |
| 6,073,432 A | 6/2000 | Schaedler | |
| 6,076,025 A | 6/2000 | Ueno et al. | |
| 6,076,026 A | 6/2000 | Jambhekar et al. | |
| 6,076,226 A | 6/2000 | Reed | |
| 6,076,227 A | 6/2000 | Schallig et al. | |
| 6,081,257 A | 6/2000 | Zeller | |
| 6,088,020 A | 7/2000 | Mor | |
| 6,094,775 A | 8/2000 | Behmer | |
| 6,099,091 A | 8/2000 | Campbell | |
| 6,101,670 A | 8/2000 | Song | |
| 6,101,671 A | 8/2000 | Wright et al. | |
| 6,108,031 A | 8/2000 | King et al. | |
| 6,108,067 A | 8/2000 | Okamoto | |
| 6,108,076 A | 8/2000 | Hanseder | |
| 6,108,269 A | 8/2000 | Kabel | |
| 6,108,597 A | 8/2000 | Kirchner et al. | |
| 6,108,859 A | 8/2000 | Burgoon | |
| 6,112,143 A | 8/2000 | Allen et al. | |
| 6,112,996 A | 9/2000 | Matsuo | |
| 6,119,057 A | 9/2000 | Kawagoe | |
| 6,122,798 A | 9/2000 | Kobayashi et al. | |

(56) References Cited

U.S. PATENT DOCUMENTS

| | | |
|---|---|---|
| 6,124,694 A | 9/2000 | Bancroft et al. |
| 6,125,498 A | 10/2000 | Roberts et al. |
| 6,131,237 A | 10/2000 | Kasper et al. |
| 6,138,063 A | 10/2000 | Himeda |
| 6,142,252 A | 11/2000 | Kinto et al. |
| 6,146,041 A | 11/2000 | Chen et al. |
| 6,146,278 A | 11/2000 | Kobayashi |
| 6,154,279 A | 11/2000 | Thayer |
| 6,154,694 A | 11/2000 | Aoki et al. |
| 6,160,479 A | 12/2000 | Ahlen et al. |
| 6,167,332 A | 12/2000 | Kurtzberg et al. |
| 6,167,587 B1 | 1/2001 | Kasper et al. |
| 6,192,548 B1 | 2/2001 | Huffman |
| 6,192,549 B1 | 2/2001 | Kasen et al. |
| 6,202,243 B1 | 3/2001 | Beaufoy et al. |
| 6,216,307 B1 | 4/2001 | Kaleta et al. |
| 6,220,865 B1 | 4/2001 | Macri et al. |
| 6,226,830 B1 | 5/2001 | Hendriks et al. |
| 6,230,362 B1 | 5/2001 | Kasper et al. |
| 6,237,741 B1 | 5/2001 | Guidetti |
| 6,240,342 B1 | 5/2001 | Fiegert et al. |
| 6,243,913 B1 | 6/2001 | Frank et al. |
| 6,255,793 B1 | 7/2001 | Peless et al. |
| 6,259,979 B1 | 7/2001 | Holmquist |
| 6,261,379 B1 | 7/2001 | Conrad et al. |
| 6,263,539 B1 | 7/2001 | Baig |
| 6,263,989 B1 | 7/2001 | Won |
| 6,272,936 B1 | 8/2001 | Oreper et al. |
| 6,276,478 B1 | 8/2001 | Hopkins et al. |
| 6,278,918 B1 | 8/2001 | Dickson et al. |
| 6,279,196 B2 | 8/2001 | Kasen et al. |
| 6,282,526 B1 | 8/2001 | Ganesh |
| 6,283,034 B1 | 9/2001 | Miles |
| 6,285,778 B1 | 9/2001 | Nakajima et al. |
| 6,285,930 B1 | 9/2001 | Dickson et al. |
| 6,286,181 B1 | 9/2001 | Kasper et al. |
| 6,300,737 B1 | 10/2001 | Bergvall et al. |
| 6,321,337 B1 | 11/2001 | Reshef et al. |
| 6,321,515 B1 | 11/2001 | Colens |
| 6,323,570 B1 | 11/2001 | Nishimura et al. |
| 6,324,714 B1 | 12/2001 | Walz et al. |
| 6,327,741 B1 | 12/2001 | Reed |
| 6,332,400 B1 | 12/2001 | Meyer |
| 6,339,735 B1 | 1/2002 | Peless et al. |
| 6,362,875 B1 | 3/2002 | Burkley |
| 6,370,453 B2 | 4/2002 | Sommer |
| 6,374,155 B1 | 4/2002 | Wallach et al. |
| 6,374,157 B1 | 4/2002 | Takamura |
| 6,381,802 B2 | 5/2002 | Park |
| 6,385,515 B1 | 5/2002 | Dickson et al. |
| 6,388,013 B1 | 5/2002 | Saraf et al. |
| 6,389,329 B1 | 5/2002 | Colens |
| 6,397,429 B1 | 6/2002 | Legatt et al. |
| 6,400,048 B1 | 6/2002 | Nishimura et al. |
| 6,401,294 B2 | 6/2002 | Kasper |
| 6,408,226 B1 | 6/2002 | Byrne et al. |
| 6,412,141 B2 | 7/2002 | Kasper et al. |
| 6,415,203 B1 | 7/2002 | Inoue et al. |
| 6,418,586 B2 | 7/2002 | Fulghum |
| 6,421,870 B1 | 7/2002 | Basham et al. |
| 6,427,285 B1 | 8/2002 | Legatt et al. |
| 6,430,471 B1 | 8/2002 | Kintou et al. |
| 6,431,296 B1 | 8/2002 | Won |
| 6,437,227 B1 | 8/2002 | Theimer |
| 6,437,465 B1 | 8/2002 | Nishimura et al. |
| 6,438,456 B1 | 8/2002 | Feddema et al. |
| 6,438,793 B1 | 8/2002 | Miner et al. |
| 6,442,476 B1 | 8/2002 | Poropat |
| 6,442,789 B1 | 9/2002 | Legatt et al. |
| 6,443,509 B1 | 9/2002 | Levin et al. |
| 6,444,003 B1 | 9/2002 | Sutcliffe |
| 6,446,302 B1 | 9/2002 | Kasper et al. |
| 6,454,036 B1 | 9/2002 | Airey et al. |
| D464,091 S | 10/2002 | Christianson |
| 6,457,206 B1 | 10/2002 | Judson |
| 6,459,955 B1 | 10/2002 | Bartsch et al. |
| 6,463,368 B1 | 10/2002 | Feiten et al. |
| 6,465,982 B1 | 10/2002 | Bergvall et al. |
| 6,473,167 B1 | 10/2002 | Odell |
| 6,480,762 B1 | 11/2002 | Uchikubo et al. |
| 6,481,515 B1 | 11/2002 | Kirkpatrick et al. |
| 6,482,252 B1 | 11/2002 | Conrad et al. |
| 6,490,539 B1 | 12/2002 | Dickson et al. |
| 6,491,127 B1 | 12/2002 | Holmberg et al. |
| 6,493,612 B1 | 12/2002 | Bisset et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,502,657 B2 | 1/2003 | Kerrebrock et al. |
| 6,504,610 B1 | 1/2003 | Bauer et al. |
| 6,507,773 B2 | 1/2003 | Parker et al. |
| 6,519,808 B2 | 2/2003 | Legatt et al. |
| 6,525,509 B1 | 2/2003 | Petersson et al. |
| D471,243 S | 3/2003 | Cioffi et al. |
| 6,530,102 B1 | 3/2003 | Pierce et al. |
| 6,530,117 B2 | 3/2003 | Peterson |
| 6,532,404 B2 | 3/2003 | Colens |
| 6,535,793 B2 | 3/2003 | Allard |
| 6,540,424 B1 | 4/2003 | Hall et al. |
| 6,540,607 B2 | 4/2003 | Mokris et al. |
| 6,548,982 B1 | 4/2003 | Papanikolopoulos et al. |
| 6,553,612 B1 | 4/2003 | Dyson et al. |
| 6,556,722 B1 | 4/2003 | Russell et al. |
| 6,556,892 B2 | 4/2003 | Kuroki et al. |
| 6,557,104 B2 | 4/2003 | Vu et al. |
| D474,312 S | 5/2003 | Stephens et al. |
| 6,563,130 B2 | 5/2003 | Dworkowski et al. |
| 6,571,415 B2 | 6/2003 | Gerber et al. |
| 6,571,422 B1 | 6/2003 | Gordon et al. |
| 6,572,711 B2 | 6/2003 | Sclafani et al. |
| 6,574,536 B1 | 6/2003 | Kawagoe et al. |
| 6,580,246 B2 | 6/2003 | Jacobs |
| 6,584,376 B1 | 6/2003 | Van Kommer |
| 6,586,908 B2 | 7/2003 | Petersson et al. |
| 6,587,573 B1 | 7/2003 | Stam et al. |
| 6,590,222 B1 | 7/2003 | Bisset et al. |
| 6,594,551 B2 | 7/2003 | McKinney et al. |
| 6,594,844 B2 | 7/2003 | Jones |
| 6,597,076 B2 | 7/2003 | Scheible et al. |
| D478,884 S | 8/2003 | Slipy et al. |
| 6,601,265 B1 | 8/2003 | Burlington |
| 6,604,021 B2 | 8/2003 | Imai et al. |
| 6,604,022 B2 | 8/2003 | Parker et al. |
| 6,605,156 B1 | 8/2003 | Clark et al. |
| 6,609,269 B2 | 8/2003 | Kasper |
| 6,611,120 B2 | 8/2003 | Song et al. |
| 6,611,734 B2 | 8/2003 | Parker et al. |
| 6,611,738 B2 | 8/2003 | Ruffner |
| 6,615,108 B1 | 9/2003 | Peless et al. |
| 6,615,434 B1 | 9/2003 | Davis et al. |
| 6,615,885 B1 | 9/2003 | Ohm |
| 6,622,465 B2 | 9/2003 | Jerome et al. |
| 6,624,744 B1 | 9/2003 | Wilson et al. |
| 6,625,843 B2 | 9/2003 | Kim et al. |
| 6,629,028 B2 | 9/2003 | Paromtchik et al. |
| 6,633,150 B1 | 10/2003 | Wallach et al. |
| 6,637,546 B1 | 10/2003 | Wang |
| 6,639,659 B2 | 10/2003 | Granger |
| 6,658,325 B2 | 12/2003 | Zweig |
| 6,658,354 B2 | 12/2003 | Lin |
| 6,658,692 B2 | 12/2003 | Lenkiewicz et al. |
| 6,658,693 B1 | 12/2003 | Reed |
| 6,661,239 B1 | 12/2003 | Ozick |
| 6,662,889 B2 | 12/2003 | De Fazio et al. |
| 6,668,951 B2 | 12/2003 | Won |
| 6,670,817 B2 | 12/2003 | Fournier et al. |
| 6,671,592 B1 | 12/2003 | Bisset et al. |
| 6,671,925 B2 | 1/2004 | Field et al. |
| 6,677,938 B1 | 1/2004 | Maynard |
| 6,687,571 B1 | 2/2004 | Byrne et al. |
| 6,690,134 B1 | 2/2004 | Jones et al. |
| 6,690,993 B2 | 2/2004 | Foulke et al. |
| 6,697,147 B2 | 2/2004 | Ko et al. |
| 6,705,332 B2 | 3/2004 | Field et al. |

(56) References Cited

U.S. PATENT DOCUMENTS

| | | |
|---|---|---|
| 6,711,280 B2 | 3/2004 | Stafsudd et al. |
| 6,732,826 B2 | 5/2004 | Song et al. |
| 6,735,811 B2 | 5/2004 | Field et al. |
| 6,735,812 B2 | 5/2004 | Hekman et al. |
| 6,737,591 B1 | 5/2004 | Lapstun et al. |
| 6,741,054 B2 | 5/2004 | Koselka et al. |
| 6,741,364 B2 | 5/2004 | Lange et al. |
| 6,748,297 B2 | 6/2004 | Song et al. |
| 6,756,703 B2 | 6/2004 | Chang |
| 6,760,647 B2 | 7/2004 | Nourbakhsh et al. |
| 6,764,373 B1 | 7/2004 | Osawa et al. |
| 6,769,004 B2 | 7/2004 | Barrett |
| 6,774,596 B1 | 8/2004 | Bisset |
| 6,779,380 B1 | 8/2004 | Nieuwkamp |
| 6,781,338 B2 | 8/2004 | Jones et al. |
| 6,809,490 B2 | 10/2004 | Jones et al. |
| 6,810,305 B2 | 10/2004 | Kirkpatrick |
| 6,810,350 B2 | 10/2004 | Blakley |
| 6,830,120 B1 | 12/2004 | Yashima et al. |
| 6,832,407 B2 | 12/2004 | Salem et al. |
| 6,836,701 B2 | 12/2004 | McKee |
| 6,841,963 B2 | 1/2005 | Song et al. |
| 6,845,297 B2 | 1/2005 | Allard |
| 6,848,146 B2 | 2/2005 | Wright et al. |
| 6,854,148 B1 | 2/2005 | Rief et al. |
| 6,856,811 B2 | 2/2005 | Burdue et al. |
| 6,859,010 B2 | 2/2005 | Jeon et al. |
| 6,859,682 B2 | 2/2005 | Naka et al. |
| 6,860,206 B1 | 3/2005 | Rudakevych et al. |
| 6,865,447 B2 | 3/2005 | Lau et al. |
| 6,870,792 B2 | 3/2005 | Chiappetta |
| 6,871,115 B2 | 3/2005 | Huang et al. |
| 6,883,201 B2 | 4/2005 | Jones et al. |
| 6,886,651 B1 | 5/2005 | Slocum et al. |
| 6,888,333 B2 | 5/2005 | Laby |
| 6,901,624 B2 | 6/2005 | Mori et al. |
| 6,906,702 B1 | 6/2005 | Tanaka et al. |
| 6,914,403 B2 | 7/2005 | Tsurumi |
| 6,917,854 B2 | 7/2005 | Bayer |
| 6,925,357 B2 | 8/2005 | Wang et al. |
| 6,925,679 B2 | 8/2005 | Wallach et al. |
| 6,929,548 B2 | 8/2005 | Wang |
| D510,066 S | 9/2005 | Hickey et al. |
| 6,938,298 B2 | 9/2005 | Aasen |
| 6,940,291 B1 | 9/2005 | Ozick |
| 6,941,199 B1 | 9/2005 | Bottomley et al. |
| 6,956,348 B2 | 10/2005 | Landry et al. |
| 6,957,712 B2 | 10/2005 | Song et al. |
| 6,960,986 B2 | 11/2005 | Asama et al. |
| 6,965,209 B2 | 11/2005 | Jones et al. |
| 6,965,211 B2 | 11/2005 | Tsurumi |
| 6,968,592 B2 | 11/2005 | Takeuchi et al. |
| 6,971,140 B2 | 12/2005 | Kim |
| 6,975,246 B1 | 12/2005 | Trudeau |
| 6,980,229 B1 | 12/2005 | Ebersole |
| 6,985,556 B2 | 1/2006 | Shanmugavel et al. |
| 6,993,954 B1 | 2/2006 | George et al. |
| 6,999,850 B2 | 2/2006 | McDonald |
| 7,013,527 B2 | 3/2006 | Thomas et al. |
| 7,024,278 B2 | 4/2006 | Chiappetta et al. |
| 7,024,280 B2 | 4/2006 | Parker et al. |
| 7,027,893 B2 | 4/2006 | Perry et al. |
| 7,030,768 B2 | 4/2006 | Wanie |
| 7,031,805 B2 | 4/2006 | Lee et al. |
| 7,032,469 B2 | 4/2006 | Bailey |
| 7,040,869 B2 | 5/2006 | Beenker |
| 7,041,029 B2 | 5/2006 | Fulghum et al. |
| 7,051,399 B2 | 5/2006 | Field et al. |
| 7,053,578 B2 | 5/2006 | Diehl et al. |
| 7,054,716 B2 | 5/2006 | McKee et al. |
| 7,055,210 B2 | 6/2006 | Keppler et al. |
| 7,057,120 B2 | 6/2006 | Ma et al. |
| 7,057,643 B2 | 6/2006 | Iida et al. |
| 7,059,012 B2 | 6/2006 | Song et al. |
| 7,065,430 B2 | 6/2006 | Naka et al. |
| 7,066,291 B2 | 6/2006 | Martins et al. |
| 7,069,124 B1 | 6/2006 | Whittaker et al. |
| 7,079,923 B2 | 7/2006 | Abramson et al. |
| 7,085,623 B2 | 8/2006 | Siegers |
| 7,085,624 B2 | 8/2006 | Aldred et al. |
| 7,113,847 B2 | 9/2006 | Chmura et al. |
| 7,133,746 B2 | 11/2006 | Abramson et al. |
| 7,142,198 B2 | 11/2006 | Lee |
| 7,148,458 B2 | 12/2006 | Schell et al. |
| 7,155,308 B2 | 12/2006 | Jones |
| 7,167,775 B2 | 1/2007 | Abramson et al. |
| 7,171,285 B2 | 1/2007 | Kim et al. |
| 7,173,391 B2 | 2/2007 | Jones et al. |
| 7,174,238 B1 | 2/2007 | Zweig |
| 7,188,000 B2 | 3/2007 | Chiappetta et al. |
| 7,193,384 B1 | 3/2007 | Norman et al. |
| 7,196,487 B2 | 3/2007 | Jones et al. |
| 7,201,786 B2 | 4/2007 | Wegelin et al. |
| 7,206,677 B2 | 4/2007 | Hulden |
| 7,211,980 B1 | 5/2007 | Bruemmer et al. |
| 7,225,500 B2 | 6/2007 | Diehl et al. |
| 7,246,405 B2 | 7/2007 | Yan |
| 7,248,951 B2 | 7/2007 | Hulden |
| 7,275,280 B2 | 10/2007 | Haegermarck et al. |
| 7,283,892 B1 | 10/2007 | Boillot et al. |
| 7,288,912 B2 | 10/2007 | Landry et al. |
| 7,318,248 B1 | 1/2008 | Yan et al. |
| 7,320,149 B1 | 1/2008 | Huffman et al. |
| 7,321,807 B2 | 1/2008 | Laski |
| 7,324,870 B2 | 1/2008 | Lee |
| 7,328,196 B2 | 2/2008 | Peters |
| 7,332,890 B2 | 2/2008 | Cohen et al. |
| 7,346,428 B1 | 3/2008 | Huffman et al. |
| 7,352,153 B2 | 4/2008 | Yan |
| 7,359,766 B2 | 4/2008 | Jeon et al. |
| 7,360,277 B2 | 4/2008 | Moshenrose et al. |
| 7,363,108 B2 | 4/2008 | Noda et al. |
| 7,388,879 B2 | 6/2008 | Sabe et al. |
| 7,389,156 B2 | 6/2008 | Ziegler et al. |
| 7,389,166 B2 | 6/2008 | Harwig et al. |
| 7,408,157 B2 | 8/2008 | Yan |
| 7,418,762 B2 | 9/2008 | Arai et al. |
| 7,430,455 B2 | 9/2008 | Casey et al. |
| 7,430,462 B2 | 9/2008 | Chiu et al. |
| 7,441,298 B2 | 10/2008 | Svendsen et al. |
| 7,444,206 B2 | 10/2008 | Abramson et al. |
| 7,448,113 B2 | 11/2008 | Jones et al. |
| 7,459,871 B2 | 12/2008 | Landry et al. |
| 7,467,026 B2 | 12/2008 | Sakagami et al. |
| 7,474,941 B2 | 1/2009 | Kim et al. |
| 7,503,096 B2 | 3/2009 | Lin |
| 7,515,991 B2 | 4/2009 | Egawa et al. |
| 7,539,557 B2 | 5/2009 | Yamauchi |
| 7,555,363 B2 | 6/2009 | Augenbraun et al. |
| 7,557,703 B2 | 7/2009 | Yamada et al. |
| 7,568,259 B2 | 8/2009 | Yan |
| 7,571,511 B2 | 8/2009 | Jones et al. |
| 7,578,020 B2 | 8/2009 | Jaworski et al. |
| 7,600,521 B2 | 10/2009 | Woo |
| 7,603,744 B2 | 10/2009 | Reindle |
| 7,611,583 B2 | 11/2009 | Buckley et al. |
| 7,617,557 B2 | 11/2009 | Reindle |
| 7,620,476 B2 | 11/2009 | Morse et al. |
| 7,636,928 B2 | 12/2009 | Uno |
| 7,636,982 B2 | 12/2009 | Jones et al. |
| 7,647,144 B2 | 1/2010 | Haegermarck |
| 7,650,666 B2 | 1/2010 | Jang |
| 7,660,650 B2 | 2/2010 | Kawagoe et al. |
| 7,663,333 B2 | 2/2010 | Jones et al. |
| 7,693,605 B2 | 4/2010 | Park |
| 7,706,917 B1 | 4/2010 | Chiappetta et al. |
| 7,761,954 B2 | 7/2010 | Ziegler et al. |
| 7,765,635 B2 | 8/2010 | Park |
| 7,784,147 B2 | 8/2010 | Burkholder et al. |
| 7,801,645 B2 | 9/2010 | Taylor et al. |
| 7,805,220 B2 | 9/2010 | Taylor et al. |
| 7,809,944 B2 | 10/2010 | Kawamoto |
| 7,832,048 B2 | 11/2010 | Harwig et al. |
| 7,849,555 B2 | 12/2010 | Hahm et al. |

(56) References Cited

U.S. PATENT DOCUMENTS

| | | |
|---|---|---|
| 7,853,645 B2 | 12/2010 | Brown et al. |
| 7,860,680 B2 | 12/2010 | Arms et al. |
| 7,920,941 B2 | 4/2011 | Park et al. |
| 7,937,800 B2 | 5/2011 | Yan |
| 7,957,836 B2 | 6/2011 | Myeong et al. |
| 8,087,117 B2 | 1/2012 | Kapoor et al. |
| 2001/0004719 A1 | 6/2001 | Sommer |
| 2001/0013929 A1 | 8/2001 | Torsten |
| 2001/0020200 A1 | 9/2001 | Das et al. |
| 2001/0025183 A1 | 9/2001 | Shahidi |
| 2001/0037163 A1 | 11/2001 | Allard |
| 2001/0043509 A1 | 11/2001 | Green et al. |
| 2001/0045883 A1 | 11/2001 | Holdaway et al. |
| 2001/0047231 A1 | 11/2001 | Peless et al. |
| 2001/0047895 A1 | 12/2001 | De Fazio et al. |
| 2002/0011367 A1 | 1/2002 | Kolesnik |
| 2002/0011813 A1 | 1/2002 | Koselka et al. |
| 2002/0016649 A1 | 2/2002 | Jones |
| 2002/0021219 A1 | 2/2002 | Edwards |
| 2002/0027652 A1 | 3/2002 | Paromtchik et al. |
| 2002/0036779 A1 | 3/2002 | Kiyoi et al. |
| 2002/0081937 A1 | 6/2002 | Yamada et al. |
| 2002/0095239 A1 | 7/2002 | Wallach et al. |
| 2002/0097400 A1 | 7/2002 | Jung et al. |
| 2002/0104963 A1 | 8/2002 | Mancevski |
| 2002/0108209 A1 | 8/2002 | Peterson |
| 2002/0112742 A1 | 8/2002 | Bredo et al. |
| 2002/0113973 A1 | 8/2002 | Ge |
| 2002/0116089 A1 | 8/2002 | Kirkpatrick |
| 2002/0120364 A1 | 8/2002 | Colens |
| 2002/0124343 A1 | 9/2002 | Reed |
| 2002/0153185 A1 | 10/2002 | Song et al. |
| 2002/0156556 A1 | 10/2002 | Ruffner |
| 2002/0159051 A1 | 10/2002 | Guo |
| 2002/0166193 A1 | 11/2002 | Kasper |
| 2002/0169521 A1 | 11/2002 | Goodman et al. |
| 2002/0173877 A1 | 11/2002 | Zweig |
| 2002/0189871 A1 | 12/2002 | Won |
| 2003/0009259 A1 | 1/2003 | Hattori et al. |
| 2003/0015232 A1 | 1/2003 | Nguyen |
| 2003/0019071 A1 | 1/2003 | Field et al. |
| 2003/0023356 A1 | 1/2003 | Keable |
| 2003/0024986 A1 | 2/2003 | Mazz et al. |
| 2003/0025472 A1 | 2/2003 | Jones et al. |
| 2003/0028286 A1 | 2/2003 | Glenn et al. |
| 2003/0030399 A1 | 2/2003 | Jacobs |
| 2003/0058262 A1 | 3/2003 | Sato et al. |
| 2003/0060928 A1 | 3/2003 | Abramson et al. |
| 2003/0067451 A1 | 4/2003 | Tagg et al. |
| 2003/0097875 A1 | 5/2003 | Lentz et al. |
| 2003/0120389 A1 | 6/2003 | Abramson et al. |
| 2003/0124312 A1 | 7/2003 | Autumn |
| 2003/0126352 A1 | 7/2003 | Barrett |
| 2003/0137268 A1 | 7/2003 | Papanikolopoulos et al. |
| 2003/0146384 A1 | 8/2003 | Logsdon et al. |
| 2003/0159232 A1 | 8/2003 | Hekman et al. |
| 2003/0168081 A1 | 9/2003 | Lee et al. |
| 2003/0175138 A1 | 9/2003 | Beenker |
| 2003/0192144 A1 | 10/2003 | Song et al. |
| 2003/0193657 A1 | 10/2003 | Uomori et al. |
| 2003/0216834 A1 | 11/2003 | Allard |
| 2003/0221114 A1 | 11/2003 | Hino et al. |
| 2003/0229421 A1 | 12/2003 | Chmura et al. |
| 2003/0229474 A1 | 12/2003 | Suzuki et al. |
| 2003/0233171 A1 | 12/2003 | Heiligensetzer |
| 2003/0233177 A1 | 12/2003 | Johnson et al. |
| 2003/0233870 A1 | 12/2003 | Mancevski |
| 2003/0233930 A1 | 12/2003 | Ozick |
| 2004/0016077 A1 | 1/2004 | Song et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030451 A1 | 2/2004 | Solomon |
| 2004/0030570 A1 | 2/2004 | Solomon |
| 2004/0030571 A1 | 2/2004 | Solomon |
| 2004/0031113 A1 | 2/2004 | Wosewick et al. |
| 2004/0049877 A1 | 3/2004 | Jones et al. |
| 2004/0055163 A1 | 3/2004 | McCambridge et al. |
| 2004/0068351 A1 | 4/2004 | Solomon |
| 2004/0068415 A1 | 4/2004 | Solomon |
| 2004/0068416 A1 | 4/2004 | Solomon |
| 2004/0074038 A1 | 4/2004 | Im et al. |
| 2004/0074044 A1 | 4/2004 | Diehl et al. |
| 2004/0076324 A1 | 4/2004 | Burl et al. |
| 2004/0083570 A1 | 5/2004 | Song et al. |
| 2004/0085037 A1 | 5/2004 | Jones et al. |
| 2004/0088079 A1 | 5/2004 | Lavarec et al. |
| 2004/0093122 A1 | 5/2004 | Galibraith |
| 2004/0098167 A1 | 5/2004 | Yi et al. |
| 2004/0111184 A1 | 6/2004 | Chiappetta et al. |
| 2004/0111821 A1 | 6/2004 | Lenkiewicz et al. |
| 2004/0113777 A1 | 6/2004 | Matsuhira et al. |
| 2004/0117064 A1 | 6/2004 | McDonald |
| 2004/0117846 A1 | 6/2004 | Karaoguz et al. |
| 2004/0118998 A1 | 6/2004 | Wingett et al. |
| 2004/0128028 A1 | 7/2004 | Miyamoto et al. |
| 2004/0133316 A1 | 7/2004 | Dean |
| 2004/0134336 A1 | 7/2004 | Solomon |
| 2004/0134337 A1 | 7/2004 | Solomon |
| 2004/0143919 A1 | 7/2004 | Wilder |
| 2004/0148419 A1 | 7/2004 | Chen et al. |
| 2004/0148731 A1 | 8/2004 | Damman et al. |
| 2004/0153212 A1 | 8/2004 | Profio et al. |
| 2004/0156541 A1 | 8/2004 | Jeon et al. |
| 2004/0158357 A1 | 8/2004 | Lee et al. |
| 2004/0181706 A1 | 9/2004 | Chen et al. |
| 2004/0187249 A1 | 9/2004 | Jones et al. |
| 2004/0187457 A1 | 9/2004 | Colens |
| 2004/0196451 A1 | 10/2004 | Aoyama |
| 2004/0200505 A1 | 10/2004 | Taylor et al. |
| 2004/0201361 A1 | 10/2004 | Koh et al. |
| 2004/0204792 A1 | 10/2004 | Taylor et al. |
| 2004/0204804 A1 | 10/2004 | Lee et al. |
| 2004/0210345 A1 | 10/2004 | Noda et al. |
| 2004/0210347 A1 | 10/2004 | Sawada et al. |
| 2004/0211444 A1 | 10/2004 | Taylor et al. |
| 2004/0221790 A1 | 11/2004 | Sinclair et al. |
| 2004/0236468 A1 | 11/2004 | Taylor et al. |
| 2004/0244138 A1 | 12/2004 | Taylor et al. |
| 2004/0255425 A1 | 12/2004 | Arai et al. |
| 2005/0000543 A1 | 1/2005 | Taylor et al. |
| 2005/0010330 A1 | 1/2005 | Abramson et al. |
| 2005/0010331 A1 | 1/2005 | Taylor et al. |
| 2005/0015920 A1 | 1/2005 | Kim et al. |
| 2005/0021181 A1 | 1/2005 | Kim et al. |
| 2005/0028316 A1 | 2/2005 | Thomas et al. |
| 2005/0053912 A1 | 3/2005 | Roth et al. |
| 2005/0055796 A1 | 3/2005 | Wright et al. |
| 2005/0067994 A1 | 3/2005 | Jones et al. |
| 2005/0081782 A1 | 4/2005 | Buckley et al. |
| 2005/0085947 A1 | 4/2005 | Aldred et al. |
| 2005/0091782 A1 | 5/2005 | Gordon et al. |
| 2005/0091786 A1 | 5/2005 | Wright et al. |
| 2005/0137749 A1 | 6/2005 | Jeon et al. |
| 2005/0144751 A1 | 7/2005 | Kegg et al. |
| 2005/0150074 A1 | 7/2005 | Diehl et al. |
| 2005/0150519 A1 | 7/2005 | Keppler et al. |
| 2005/0154795 A1 | 7/2005 | Kuz et al. |
| 2005/0156562 A1 | 7/2005 | Cohen et al. |
| 2005/0162119 A1 | 7/2005 | Landry et al. |
| 2005/0163119 A1 | 7/2005 | Ito et al. |
| 2005/0165508 A1 | 7/2005 | Kanda et al. |
| 2005/0166354 A1 | 8/2005 | Uehigashi |
| 2005/0166355 A1 | 8/2005 | Tani |
| 2005/0172445 A1 | 8/2005 | Diehl et al. |
| 2005/0183229 A1 | 8/2005 | Uehigashi |
| 2005/0183230 A1 | 8/2005 | Uehigashi |
| 2005/0187678 A1 | 8/2005 | Myeong et al. |
| 2005/0192707 A1 | 9/2005 | Park et al. |
| 2005/0204717 A1 | 9/2005 | Colens |
| 2005/0209736 A1 | 9/2005 | Kawagoe |
| 2005/0211880 A1 | 9/2005 | Schell et al. |
| 2005/0212929 A1 | 9/2005 | Schell et al. |

(56) References Cited

U.S. PATENT DOCUMENTS

| | | |
|---|---|---|
| 2005/0213082 A1 | 9/2005 | DiBernardo et al. |
| 2005/0213109 A1 | 9/2005 | Schell et al. |
| 2005/0217042 A1 | 10/2005 | Reindle |
| 2005/0218852 A1 | 10/2005 | Landry et al. |
| 2005/0222933 A1 | 10/2005 | Wesby |
| 2005/0229340 A1 | 10/2005 | Sawalski et al. |
| 2005/0229355 A1 | 10/2005 | Crouch et al. |
| 2005/0235451 A1 | 10/2005 | Yan |
| 2005/0251292 A1 | 11/2005 | Casey et al. |
| 2005/0255425 A1 | 11/2005 | Pierson |
| 2005/0258154 A1 | 11/2005 | Blankenship et al. |
| 2005/0273967 A1 | 12/2005 | Taylor et al. |
| 2005/0288819 A1 | 12/2005 | De Guzman |
| 2006/0000050 A1 | 1/2006 | Cipolla et al. |
| 2006/0009879 A1 | 1/2006 | Lynch et al. |
| 2006/0010638 A1 | 1/2006 | Shimizu et al. |
| 2006/0020369 A1 | 1/2006 | Taylor et al. |
| 2006/0020370 A1 | 1/2006 | Abramson |
| 2006/0021168 A1 | 2/2006 | Nishikawa |
| 2006/0025134 A1 | 2/2006 | Cho et al. |
| 2006/0037170 A1 | 2/2006 | Shimizu |
| 2006/0042042 A1 | 3/2006 | Mertes et al. |
| 2006/0044546 A1 | 3/2006 | Lewin et al. |
| 2006/0060216 A1 | 3/2006 | Woo |
| 2006/0061657 A1 | 3/2006 | Rew et al. |
| 2006/0064828 A1 | 3/2006 | Stein et al. |
| 2006/0087273 A1 | 4/2006 | Ko et al. |
| 2006/0089765 A1 | 4/2006 | Pack et al. |
| 2006/0100741 A1 | 5/2006 | Jung |
| 2006/0107894 A1 | 5/2006 | Buckley et al. |
| 2006/0119839 A1 | 6/2006 | Bertin et al. |
| 2006/0143295 A1 | 6/2006 | Costa-Requena et al. |
| 2006/0146776 A1 | 7/2006 | Kim |
| 2006/0150361 A1 | 7/2006 | Aldred et al. |
| 2006/0184293 A1 | 8/2006 | Konandreas et al. |
| 2006/0185690 A1 | 8/2006 | Song et al. |
| 2006/0190133 A1 | 8/2006 | Konandreas et al. |
| 2006/0190134 A1 | 8/2006 | Ziegler et al. |
| 2006/0190146 A1 | 8/2006 | Morse et al. |
| 2006/0196003 A1 | 9/2006 | Song et al. |
| 2006/0200281 A1 | 9/2006 | Ziegler et al. |
| 2006/0220900 A1 | 10/2006 | Ceskutti et al. |
| 2006/0229774 A1 | 10/2006 | Park et al. |
| 2006/0259194 A1 | 11/2006 | Chiu |
| 2006/0259494 A1 | 11/2006 | Watson et al. |
| 2006/0278161 A1 | 12/2006 | Burkholder et al. |
| 2006/0288519 A1 | 12/2006 | Jaworski et al. |
| 2006/0293787 A1 | 12/2006 | Kanda et al. |
| 2006/0293808 A1 | 12/2006 | Qian |
| 2007/0006404 A1 | 1/2007 | Cheng et al. |
| 2007/0016328 A1 | 1/2007 | Ziegler et al. |
| 2007/0017061 A1 | 1/2007 | Yan |
| 2007/0028574 A1 | 2/2007 | Yan |
| 2007/0032904 A1 | 2/2007 | Kawagoe et al. |
| 2007/0042716 A1 | 2/2007 | Goodall et al. |
| 2007/0043459 A1 | 2/2007 | Abbott et al. |
| 2007/0061041 A1 | 3/2007 | Zweig |
| 2007/0061043 A1 | 3/2007 | Ermakov et al. |
| 2007/0114975 A1 | 5/2007 | Cohen et al. |
| 2007/0142964 A1 | 6/2007 | Abramson |
| 2007/0150096 A1 | 6/2007 | Yeh et al. |
| 2007/0156286 A1 | 7/2007 | Yamauchi |
| 2007/0157415 A1 | 7/2007 | Lee et al. |
| 2007/0157420 A1 | 7/2007 | Lee et al. |
| 2007/0179670 A1 | 8/2007 | Chiappetta et al. |
| 2007/0226949 A1 | 10/2007 | Hahm et al. |
| 2007/0234492 A1 | 10/2007 | Svendsen et al. |
| 2007/0244610 A1 | 10/2007 | Ozick et al. |
| 2007/0245511 A1 | 10/2007 | Hahm et al. |
| 2007/0250212 A1 | 10/2007 | Halloran et al. |
| 2007/0261193 A1 | 11/2007 | Gordon et al. |
| 2007/0266508 A1 | 11/2007 | Jones et al. |
| 2008/0007203 A1 | 1/2008 | Cohen et al. |
| 2008/0039974 A1 | 2/2008 | Sandin et al. |
| 2008/0052846 A1 | 3/2008 | Kapoor et al. |
| 2008/0091304 A1 | 4/2008 | Ozick et al. |
| 2008/0109126 A1 | 5/2008 | Sandin et al. |
| 2008/0134458 A1 | 6/2008 | Ziegler et al. |
| 2008/0140255 A1 | 6/2008 | Ziegler et al. |
| 2008/0155768 A1 | 7/2008 | Ziegler et al. |
| 2008/0184518 A1 | 8/2008 | Taylor et al. |
| 2008/0266748 A1 | 10/2008 | Lee |
| 2008/0276407 A1 | 11/2008 | Schnittman et al. |
| 2008/0281470 A1 | 11/2008 | Gilbert et al. |
| 2008/0282494 A1 | 11/2008 | Won et al. |
| 2008/0294288 A1 | 11/2008 | Yamauchi |
| 2008/0302586 A1 | 12/2008 | Yan |
| 2008/0307590 A1 | 12/2008 | Jones et al. |
| 2009/0007366 A1 | 1/2009 | Svendsen et al. |
| 2009/0038089 A1 | 2/2009 | Landry et al. |
| 2009/0048727 A1 | 2/2009 | Hong et al. |
| 2009/0049640 A1 | 2/2009 | Lee et al. |
| 2009/0055022 A1 | 2/2009 | Casey et al. |
| 2009/0102296 A1 | 4/2009 | Greene et al. |
| 2009/0292393 A1 | 11/2009 | Casey et al. |
| 2010/0006028 A1 | 1/2010 | Buckley et al. |
| 2010/0011529 A1 | 1/2010 | Won et al. |
| 2010/0049365 A1 | 2/2010 | Jones et al. |
| 2010/0063628 A1 | 3/2010 | Landry et al. |
| 2010/0082193 A1 | 4/2010 | Chiappetta |
| 2010/0107355 A1 | 5/2010 | Won et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0268384 A1 | 10/2010 | Jones et al. |
| 2010/0293742 A1 | 11/2010 | Chung et al. |
| 2010/0312429 A1 | 12/2010 | Jones et al. |

FOREIGN PATENT DOCUMENTS

| | | |
|---|---|---|
| DE | 3536907 C2 | 2/1989 |
| DE | 3404202 C2 | 12/1992 |
| DE | 199311014 U1 | 10/1993 |
| DE | 4338841 A1 | 5/1995 |
| DE | 4414683 A1 | 10/1995 |
| DE | 19849978 | 2/2001 |
| DE | 102004038074 | 6/2005 |
| DE | 10357636 | 7/2005 |
| DE | 102004041021 B3 | 8/2005 |
| DE | 102005046813 A1 | 4/2007 |
| DK | 338988 A | 12/1988 |
| EP | 0265542 A1 | 5/1988 |
| EP | 0281085 A2 | 9/1988 |
| EP | 0286328 A1 | 10/1988 |
| EP | 0294101 A2 | 12/1988 |
| EP | 0352045 A2 | 1/1990 |
| EP | 0433697 A2 | 6/1991 |
| EP | 0437024 A1 | 7/1991 |
| EP | 0554978 A2 | 8/1993 |
| EP | 0615719 A1 | 9/1994 |
| EP | 0792726 A1 | 9/1997 |
| EP | 0930040 A2 | 7/1999 |
| EP | 0845237 B1 | 4/2000 |
| EP | 0861629 B1 | 9/2001 |
| EP | 1228734 | 8/2002 |
| EP | 1331537 | 7/2003 |
| EP | 1380245 A1 | 1/2004 |
| EP | 1380246 A2 | 1/2004 |
| EP | 1018315 B1 | 11/2004 |
| EP | 1553472 A1 | 7/2005 |
| EP | 1557730 A1 | 7/2005 |
| EP | 1642522 A2 | 4/2006 |
| EP | 1836941 A2 | 9/2007 |
| ES | 2238196 A1 | 8/2005 |
| FR | 722755 | 3/1932 |
| FR | 2601443 A1 | 1/1988 |
| FR | 2828589 A1 | 2/2003 |
| GB | 702426 | 1/1954 |
| GB | 2128842 A | 5/1984 |
| GB | 2225221 A | 5/1990 |
| GB | 2267360 A | 12/1993 |
| GB | 2283838 A | 5/1995 |
| GB | 2284957 A | 6/1995 |
| GB | 2300082 A | 10/1996 |

(56) References Cited

FOREIGN PATENT DOCUMENTS

| | | |
|---|---|---|
| GB | 2344747 A | 6/2000 |
| GB | 2404330 A | 2/2005 |
| GB | 2417354 A | 2/2006 |
| JP | 53021869 | 2/1978 |
| JP | 53110257 A2 | 9/1978 |
| JP | 57064217 | 4/1982 |
| JP | 59005315 | 1/1984 |
| JP | 59033511 U | 3/1984 |
| JP | 59094005 | 5/1984 |
| JP | 59099308 | 6/1984 |
| JP | 59112311 | 6/1984 |
| JP | 59120124 A | 7/1984 |
| JP | 59131668 U | 9/1984 |
| JP | 59164973 | 9/1984 |
| JP | 59184917 A | 10/1984 |
| JP | 2283343 A2 | 11/1984 |
| JP | 59212924 | 12/1984 |
| JP | 59226909 | 12/1984 |
| JP | 60089213 A | 5/1985 |
| JP | 60211510 A | 10/1985 |
| JP | 60259895 | 12/1985 |
| JP | 61023221 | 1/1986 |
| JP | 61097712 A | 5/1986 |
| JP | 61160366 | 7/1986 |
| JP | 62070709 | 4/1987 |
| JP | 62074018 A | 4/1987 |
| JP | 62120510 A | 6/1987 |
| JP | 62154008 | 7/1987 |
| JP | 62164431 | 7/1987 |
| JP | 62263507 A | 11/1987 |
| JP | 62263508 A | 11/1987 |
| JP | 62189057 U | 12/1987 |
| JP | 63079623 A | 4/1988 |
| JP | 63158032 | 7/1988 |
| JP | 63203483 A | 8/1988 |
| JP | 63241610 A | 10/1988 |
| JP | 1118752 | 8/1989 |
| JP | 2-6312 U | 1/1990 |
| JP | 3051023 A | 3/1991 |
| JP | 4019586 | 1/1992 |
| JP | 4074285 A | 3/1992 |
| JP | 4084921 A | 3/1992 |
| JP | 5023269 A | 2/1993 |
| JP | 5042076 A | 2/1993 |
| JP | 5046246 | 2/1993 |
| JP | 5091604 A | 4/1993 |
| JP | 5095879 A | 4/1993 |
| JP | 5150827 A | 6/1993 |
| JP | 5150829 A | 6/1993 |
| JP | 5054620 U | 7/1993 |
| JP | 5040519 Y2 | 10/1993 |
| JP | 05257527 A | 10/1993 |
| JP | 5257533 | 10/1993 |
| JP | 05285861 A | 11/1993 |
| JP | 5302836 A | 11/1993 |
| JP | 5312514 A | 11/1993 |
| JP | 05046239 Y2 | 12/1993 |
| JP | 5341904 A | 12/1993 |
| JP | 6003251 U | 1/1994 |
| JP | 6038912 | 2/1994 |
| JP | 6105781 A | 4/1994 |
| JP | 6137828 A | 5/1994 |
| JP | 6154143 A | 6/1994 |
| JP | 6293095 A | 10/1994 |
| JP | 06327 598 A | 11/1994 |
| JP | 7047046 A | 2/1995 |
| JP | 07129239 A | 5/1995 |
| JP | 7059702 B | 6/1995 |
| JP | 07222705 A2 | 8/1995 |
| JP | 7270518 A | 10/1995 |
| JP | 7313417 A | 12/1995 |
| JP | 8000393 A | 1/1996 |
| JP | 8016776 A | 1/1996 |
| JP | 8084696 A | 4/1996 |
| JP | 8089449 A | 4/1996 |
| JP | 08089451 A | 4/1996 |
| JP | 8123548 | 5/1996 |
| JP | 8152916 A | 6/1996 |
| JP | 8263137 A | 10/1996 |
| JP | 8335112 A | 12/1996 |
| JP | 8339297 A | 12/1996 |
| JP | 943901 | 2/1997 |
| JP | 9044240 A | 2/1997 |
| JP | 9066855 A | 3/1997 |
| JP | 9145309 A | 6/1997 |
| JP | 09160644 A | 6/1997 |
| JP | 09179625 A | 7/1997 |
| JP | 09185410 | 7/1997 |
| JP | 9192069 A | 7/1997 |
| JP | 2555263 Y2 | 8/1997 |
| JP | 9204223 A | 8/1997 |
| JP | 09206258 A | 8/1997 |
| JP | 09233712 A | 9/1997 |
| JP | 9265319 A | 10/1997 |
| JP | 9269807 A | 10/1997 |
| JP | 9269810 A | 10/1997 |
| JP | 9319431 A1 | 12/1997 |
| JP | 9319432 A | 12/1997 |
| JP | 9319434 A | 12/1997 |
| JP | 9325812 A | 12/1997 |
| JP | 10055215 A | 2/1998 |
| JP | 10117973 A | 5/1998 |
| JP | 10118963 A | 5/1998 |
| JP | 10165738 A | 6/1998 |
| JP | 10177414 A | 6/1998 |
| JP | 10295595 A | 11/1998 |
| JP | 10314088 | 12/1998 |
| JP | 11015941 A | 1/1999 |
| JP | 11102220 A | 4/1999 |
| JP | 11162454 A | 6/1999 |
| JP | 11174145 A | 7/1999 |
| JP | 11175149 A | 7/1999 |
| JP | 11178765 A | 7/1999 |
| JP | 114008764 A | 7/1999 |
| JP | 11212642 A | 8/1999 |
| JP | 11213157 A | 8/1999 |
| JP | 11282532 A | 10/1999 |
| JP | 11282533 A | 10/1999 |
| JP | 11295412 A | 10/1999 |
| JP | 2000047728 | 2/2000 |
| JP | 2000056006 A | 2/2000 |
| JP | 2000056831 A | 2/2000 |
| JP | 2000060782 A | 2/2000 |
| JP | 2000066722 A | 3/2000 |
| JP | 2000075925 A | 3/2000 |
| JP | 2000102499 A | 4/2000 |
| JP | 2000275321 | 10/2000 |
| JP | 2000279353 A | 10/2000 |
| JP | 2000353014 A | 12/2000 |
| JP | 2001022443 A | 1/2001 |
| JP | 2001067588 | 3/2001 |
| JP | 2001087182 | 4/2001 |
| JP | 2001121455 | 5/2001 |
| JP | 2001125641 | 5/2001 |
| JP | 2001508572 A | 6/2001 |
| JP | 2001197008 A | 7/2001 |
| JP | 3197758 B2 | 8/2001 |
| JP | 3201903 B2 | 8/2001 |
| JP | 2001216482 A | 8/2001 |
| JP | 2001258807 | 9/2001 |
| JP | 2001265437 A | 9/2001 |
| JP | 2001275908 A | 10/2001 |
| JP | 2001289939 | 10/2001 |
| JP | 2001306170 A | 11/2001 |
| JP | 2002073170 A | 3/2002 |
| JP | 2002078650 A | 3/2002 |
| JP | 2002204768 A | 7/2002 |
| JP | 2002204769 A | 7/2002 |
| JP | 2002247510 A | 8/2002 |
| JP | 2002532180 A | 10/2002 |
| JP | 2002323925 | 11/2002 |
| JP | 2002333920 A | 11/2002 |
| JP | 2002355206 | 12/2002 |
| JP | 2002360471 A | 12/2002 |

(56) References Cited

FOREIGN PATENT DOCUMENTS

| | | |
|---|---|---|
| JP | 2002360482 A | 12/2002 |
| JP | 2002366227 | 12/2002 |
| JP | 2002369778 | 12/2002 |
| JP | 2003005296 A | 1/2003 |
| JP | 2003010076 A | 1/2003 |
| JP | 2003010088 A | 1/2003 |
| JP | 2003028528 A | 1/2003 |
| JP | 2003036116 A | 2/2003 |
| JP | 2003038401 A | 2/2003 |
| JP | 2003038402 A | 2/2003 |
| JP | 2003047579 | 2/2003 |
| JP | 2003061882 A | 3/2003 |
| JP | 2003084994 | 3/2003 |
| JP | 2003167628 A | 6/2003 |
| JP | 2003180586 A | 7/2003 |
| JP | 2003180587 A | 7/2003 |
| JP | 2003186539 A | 7/2003 |
| JP | 2003190064 A | 7/2003 |
| JP | 2003241836 A | 8/2003 |
| JP | 2003262520 A | 9/2003 |
| JP | 2003304992 A | 10/2003 |
| JP | 2003310509 A | 11/2003 |
| JP | 2003330543 A | 11/2003 |
| JP | 2004123040 A | 4/2004 |
| JP | 2004148021 A | 5/2004 |
| JP | 2004160102 A | 6/2004 |
| JP | 2004166968 A | 6/2004 |
| JP | 2004198330 A | 7/2004 |
| JP | 2004219185 | 8/2004 |
| JP | 2004351234 A | 12/2004 |
| JP | 2005118354 A | 5/2005 |
| JP | 2005211360 A | 8/2005 |
| JP | 2005224265 A | 8/2005 |
| JP | 2005230032 A | 9/2005 |
| JP | 2005245916 A | 9/2005 |
| JP | 2005352707 A | 12/2005 |
| JP | 2006043071 A | 2/2006 |
| JP | 2006155274 A | 6/2006 |
| JP | 2006164223 A | 6/2006 |
| JP | 2006227673 A | 8/2006 |
| JP | 2006247467 A | 9/2006 |
| JP | 2006260161 A | 9/2006 |
| JP | 2006293662 A | 10/2006 |
| JP | 2006296697 A | 11/2006 |
| JP | 2007034866 A | 2/2007 |
| JP | 2007213180 A | 8/2007 |
| JP | 2009015611 A | 1/2009 |
| JP | 2010198552 A | 9/2010 |
| WO | 9526512 A1 | 10/1995 |
| WO | 9530887 A1 | 11/1995 |
| WO | 9617258 A1 | 6/1996 |
| WO | 9715224 A1 | 5/1997 |
| WO | 9740734 A1 | 11/1997 |
| WO | 9741451 A1 | 11/1997 |
| WO | 9853456 A1 | 11/1998 |
| WO | 9905580 A2 | 2/1999 |
| WO | 9916078 A1 | 4/1999 |
| WO | 9938056 A1 | 7/1999 |
| WO | 9938237 A1 | 7/1999 |
| WO | 9943250 A1 | 9/1999 |
| WO | 0038026 A1 | 6/2000 |
| WO | 0038028 A1 | 6/2000 |
| WO | 0038029 A1 | 6/2000 |
| WO | 0004430 A1 | 10/2000 |
| WO | 0078410 A1 | 12/2000 |
| WO | 0106904 A1 | 2/2001 |
| WO | 0106905 A1 | 2/2001 |
| WO | 0180703 A1 | 11/2001 |
| WO | 0191623 A2 | 12/2001 |
| WO | 0224292 A1 | 3/2002 |
| WO | 0239864 A1 | 5/2002 |
| WO | 0239868 A1 | 5/2002 |
| WO | 02058527 A1 | 8/2002 |
| WO | 02062194 A1 | 8/2002 |
| WO | 02067744 A1 | 9/2002 |
| WO | 02067745 A1 | 9/2002 |
| WO | 02067752 A1 | 9/2002 |
| WO | 02069774 A1 | 9/2002 |
| WO | 02069775 A2 | 9/2002 |
| WO | 02071175 A1 | 9/2002 |
| WO | 02074150 A1 | 9/2002 |
| WO | 02075356 A1 | 9/2002 |
| WO | 02075469 A1 | 9/2002 |
| WO | 02075470 A1 | 9/2002 |
| WO | 02081074 A1 | 10/2002 |
| WO | 02101477 A2 | 12/2002 |
| WO | 03015220 A1 | 2/2003 |
| WO | 03024292 A2 | 3/2003 |
| WO | 03040546 A1 | 5/2003 |
| WO | 03040845 A1 | 5/2003 |
| WO | 03040846 A1 | 5/2003 |
| WO | 03062850 A2 | 7/2003 |
| WO | 03062852 A1 | 7/2003 |
| WO | 2004004533 A1 | 1/2004 |
| WO | 2004004534 A1 | 1/2004 |
| WO | 2004006034 A2 | 1/2004 |
| WO | 2004025947 A2 | 3/2004 |
| WO | 2004058028 A2 | 7/2004 |
| WO | 2004059409 A1 | 7/2004 |
| WO | 2005006935 A1 | 1/2005 |
| WO | 2005037496 A1 | 4/2005 |
| WO | 2005055795 A1 | 6/2005 |
| WO | 2005055796 A2 | 6/2005 |
| WO | 2005076545 A1 | 8/2005 |
| WO | 2005077243 A1 | 8/2005 |
| WO | 2005077244 A1 | 8/2005 |
| WO | 2005081074 A1 | 9/2005 |
| WO | 2005083541 A1 | 9/2005 |
| WO | 2005098475 A1 | 10/2005 |
| WO | 2005098476 A1 | 10/2005 |
| WO | 2006046400 A1 | 5/2006 |
| WO | 2006061133 A1 | 6/2006 |
| WO | 2006068403 A1 | 6/2006 |
| WO | 2006073248 A1 | 7/2006 |
| WO | 2006089307 A2 | 8/2006 |
| WO | 2007028049 A2 | 3/2007 |
| WO | 2007036490 A2 | 4/2007 |
| WO | 2007065033 A2 | 6/2007 |
| WO | 2007137234 A2 | 11/2007 |
| WO | 2002075350 A1 | 1/2012 |

OTHER PUBLICATIONS

Ascii, Mar. 25, 2002, http://ascii.jp/elem/000/000/330/330024/, accessed Nov. 2011, 15 pages (with English translation).

Barker, "Navigation by the Stars—Ben Barker 4th Year Project," Nov. 2004, 20 pages.

Becker et al., "Reliable Navigation Using Landmarks," IEEE International Conference on Robotics and Automation, 0-7803-1965-6, pp. 401-406, 1995.

Benayad-Cherif et al., "Mobile Robot Navigation Sensors," SPIE vol. 1831 Mobile Robots, VII, pp. 378-387, 1992.

Betke et al. "Mobile robot localization using landmarks," Proceedings of the IEEE/RSJ/GI International Conference on Intelligent Robots and Systems '94 Advanced Robotic Systems and the Real World' (IROS '94), Accessed via IEEE Xplore, 1994, 8 pages.

Bison et al., "Using a structured beacon for cooperative position estimation," *Robotics and Autonomous Systems*, 29(1):33-40, Oct. 1999.

Blaasvaer et al., "AMOR—An Autonomous Mobile Robot Navigation System," Proceedings of the IEEE International Conference on Systems, Man, and Cybernetics, pp. 2266-2271, 1994.

Borges et al., "Optimal Mobile Robot Pose Estimation Using Geometrical Maps," IEEE Transactions on Robotics and Automation, 18(1): 87-94, Feb. 2002.

Braunstingl et al., "Fuzzy Logic Wall Following of a Mobile Robot Based on the Concept of General Perception," ICAR '95, 7th International Conference on Advanced Robotics, Sant Feliu De Guixols, Spain, pp. 367-376, Sep. 1995.

Bulusu et al., "Self Configuring Localization systems: Design and Experimental Evaluation,"*ACM Transactions on Embedded Computing Systems*, 3(1):24-60, 2003.

(56) References Cited

OTHER PUBLICATIONS

Caccia et al., "Bottom-Following for Remotely Operated Vehicles,"5th IFAC Conference, Alaborg, Denmark, pp. 245-250, Aug. 2000.

Certified U.S. Appl. No. 60/605,066 as provided to WIPO in PCT/US2005/030422, corresponding to U.S. Appl. No. 11/574,290, U.S. publication 2008/0184518, filed Aug. 27, 2004.

Certified U.S. Appl. No. 60/605,181 as provided to WIPO in PCT/US2005/030422, corresponding to U.S. Appl. No. 11/574,290, U.S. publication 2008/0184518, filed Aug. 27, 2004.

Chae et al., "StarLITE: A new artificial landmark for the navigation of mobile robots," http://www.irc.atr.jp/jk-nrs2005/pdf/Starlite.pdf, 4 pages, 2005.

Chamberlin et al., "Team 1: Robot Locator Beacon System, " NASA Goddard SFC, Design Proposal, 15 pages, Feb. 2006.

Champy, "Physical management of IT assets in Data Centers using RFID technologies," RFID 2005 University, Oct. 12-14, 2005 , 19 pages.

Chin, "Joystick Control for Tiny OS Robot," http://www.eecs.berkeley.edu/Programs/ugrad/superb/papers2002/chiri.pdf. 12 pages, Aug. 2002.

Christensen et al. "Theoretical Methods for Planning and Control in Mobile Robotics," 1997 First International Conference on Knowledge-Based Intelligent Electronic Systems, Adelaide, Australia, pp. 81-86, May 1997.

CleanMate 365, Intelligent Automatic Vacuum Cleaner, Model No. QQ-1, User Manual www.metapo.com/support/user_manual.pdf, Dec. 2005, 11 pages.

Clerentin et al., "A localization method based on two omnidirectional perception systems cooperation," *Proc of IEEE International Conference on Robotics & Automation*, San Francisco, CA vol. 2, pp. 1219-1224, Apr. 2000.

Corke, "High Performance Visual serving for robots end-point control," SPIE vol. 2056, Intelligent Robots and Computer Vision, 1993, 10 pages.

Cozman et al., "Robot Localization using a Computer Vision Sextant," IEEE International Midwest Conference on Robotics and Automation, pp. 106-111, 1995.

D'Orazio et al., "Model based Vision System for mobile robot position estimation", *SPIE*, vol. 2058 Mobile Robots VIII, pp. 38-49, 1992.

De Bakker et al., "Smart PSD- array for sheet of light range imaging", Proc. of *SPIE*, vol. 3965, pp. 1-12, May 2000.

Denning Roboscrub image (1989), 1 page.

Desaulniers et al., "An Efficient Algorithm to find a shortest path for a car-like Robot," *IEEE Transactions on robotics and Automation* , 11(6):819-828, Dec. 1995.

Dorfmüller-Ulhaas, "Optical Tracking From User Motion to 3D Interaction," http://www.cg.tuwien.ac.at/research/publications/2002/Dorfmueller-Ulhaas-thesis, 182 pages, 2002.

Dorsch et al., "Laser Triangulation: Fundamental uncertainty in distance measurement," *Applied Optics*, 33(7):1306-1314, Mar. 1994.

Doty et al., "Sweep Strategies for a Sensory-Driven, Behavior-Based Vacuum Cleaning Agent," AAAI 1993 Fall Symposium Series, Instantiating Real-World Agents, pp. 1-6, Oct. 22-24, 1993.

Dudek et al., "Localizing a Robot with Minimum Travel" *Proceedings of the sixth annual ACM-SIAM symposium on Discrete Algorithms*, 27(2):583-604, Apr. 1998.

Dulimarta et al., "Mobile Robot Localization in Indoor Environment", *Pattern Recognition*, 30(1):99-111, 1997.

Dyson's Robot Vacuum Cleaner—the DC06, May 2004, Retrieved from the Internet: URL< http://www.gizmag.com/go/1282/>. Accessed Nov. 2011, 3 pages.

EBay, "Roomba Timer -> Timed Cleaning—Floorvac Robotic Vacuum," Retrieved from the Internet: URL Cgi.ebay.com/ws/eBayISAPI.dll?viewitem&category=43526&item=4375198387&rd=1, 5 pages, Apr. 2005.

Electrolux Trilobite, "Time to enjoy life," Retrieved from the Internet: URL<http://www.robocon.co.kr/trilobite/Presentation_Trilobite_Kor_030104.ppt, 26 pages, accessed Dec. 2011.

Electrolux Trilobite, Jan. 12, 2001, http://www.electroluxui.com:8080/2002%5C822%5C833102EN.pdf, accessed Jul. 2, 2012, 10 pages.

Electrolux, "Designed for the well-lived home," Retrieved from the Internet: URL<http://www.electroluxusa.com/node57.as[?currentURL=node142.asp%3F >. Accessed Mar. 2005, 2 pages.

Eren et al., "Accuracy in position estimation of mobile robots based on coded infrared signal transmission," Proceedings: Integrating Intelligent Instrumentation and Control, Instrumentation and Measurement Technology Conference, 1995, IMTC/95. pp. 548-551, 1995.

Eren et al., "Operation of Mobile Robots in a Structured Infrared Environment," Proceedings 'Sensing, Processing, Networking', IEEE Instrumentation and Measurement Technology Conference, 1997 (IMTC/97), Ottawa, Canada vol. 1, pp. 20-25, May 1997.

Euroflex Intelligente Monstre, (English excerpt only), 2006, 15 pages.

Euroflex, Jan. 2006, Retrieved from the Internet: URL< http://www.euroflex.tv/novita_dett.php?id=15, accessed Nov. 2011, 1 page.

eVac Robotic Vacuum S1727 Instruction Manual, Sharper Image Corp, Copyright 2004, 16 pages.

Everyday Robots, "Everyday Robots: Reviews, Discussion and News for Consumers," Aug. 2004, Retrieved from the Internet: URL< www.everydayrobots.com/index.php?option=content&task=view&id=9> (Sep. 2012), 4 pages.

Evolution Robotics, "NorthStar—Low-cost Indoor Localiztion—How it Works," E Evolution Robotics , 2 pages, 2005.

Facchinetti Claudio et al., "Self-Positioning Robot Navigation Using Ceiling Images Sequences," ACCV '95, 5 pages, Dec. 1995.

Facchinetti Claudio et al., "Using and Learning Vision-Based Self-Positioning for Autonomous Robot Navigation," ICARCV '94, vol. 3, pp. 1694-1698, 1994.

Facts on Trilobite, webpage, Retrieved from the Internet: URL< http://trilobiteelectroluxse/presskit_en/mode111335asp?print=yes&pressID=>. 2 pages, accessed Dec. 2003.

Fairfield et al., "Mobile Robot Localization with Sparse Landmarks," SPIE vol. 4573, pp. 148-155, 2002.

Favre-Bulle, "Efficient tracking of 3D—Robot Position by Dynamic Triangulation," IEEE Instrumentation and Measurement Technology Conference IMTC 98 Session on Instrumentation and Measurement in Robotics, vol. 1, pp. 446-449, May 1998.

Fayman, "Exploiting Process Integration and Composition in the context of Active Vision," IEEE Transactions on Systems, Man, and Cybernetics—Part C: Application and reviews, vol. 29, No. 1, pp. 73-86, Feb. 1999.

Floorbot GE Plastics—IMAGE, available at http://www.fuseid.com/, 1989-1990, Accessed Sep. 2012, 1 page.

Floorbotics, VR8 Floor Cleaning Robot, Product Description for Manufacturing, URL: <http://www.consensus.sem.au/SoftwareAwards/CSAarchive/CSA2004/CSAart04/FloorBot/F>. Mar. 2004, 11 pages.

Franz et al., "Biomimetric robot navigation", Robotics and Autonomous Systems, vol. 30 pp. 133-153, 2000.

Friendly Robotics, "Friendly Robotics—Friendly Vac, Robotic Vacuum Cleaner," Retrieved from the Internet: URL< www.friendlyrobotics.com/vac.htm > 5 pages, Apr. 2005.

Friendly Robotics, Retrieved from the Internet: URL<http://www.robotsandrelax.com/PDFs/RV400Manual.pdf>. 18 pages, accessed Dec. 2011.

Fuentes et al., "Mobile Robotics 1994," University of Rochester. Computer Science Department, TR 588, 44 pages, Dec. 1994.

Fukuda et al., "Navigation System based on Ceiling Landmark Recognition for Autonomous mobile robot," 1995 IEEE/RSJ International Conference on Intelligent Robots and Systems 95. 'Human Robot Interaction and Cooperative Robots', Pittsburgh, PA, pp. 1466-1471, Aug. 1995.

Gat, "Robust Low-Computation Sensor-driven Control for Task-Directed Navigation," Proc of IEEE International Conference on Robotics and Automation , Sacramento, CA pp. 2484-2489, Apr. 1991.

Gionis, "A hand-held optical surface scanner for environmental Modeling and Virtual Reality," Virtual Reality World, 16 pages, 1996.

(56) References Cited

OTHER PUBLICATIONS

Goncalves et al., "A Visual Front-End for Simultaneous Localization and Mapping", Proceedings of the 2005 IEEE International Conference on Robotics and Automation, Barcelona, Spain, pp. 44-49, Apr. 2005.
Gregg et al., "Autonomous Lawn Care Applications," 2006 Florida Conference on Recent Advances in Robotics, Miami, Florida, May 25-26, 2006, Florida International University, 5 pages.
Grumet, "Robots Clean House," Popular Mechanics, Nov. 2003, 3 pages.
Hamamatsu "SI PIN Diode S5980, S5981 S5870—Multi-element photodiodes for surface mounting," Hamatsu Photonics, 2 pages, Apr. 2004.
Haralick et al. "Pose Estimation from Corresponding Point Data", *IEEE Transactions on Systems, Man, and Cybernetics*, 19(6):1426-1446, Nov. 1989.
Hausler, "About the Scaling Behaviour of Optical Range Sensors," Fringe '97, Proceedings of the 3rd International Workshop on Automatic Processing of Fringe Patterns, Bremen, Germany, pp. 147-155, Sep. 1997.
Hitachi, accessed at http://www.hitachi.co.jp/New/cnews/hi_030529_hi_030529.pdf , May 29, 2003, 15 pages (with English translation).
Hitachi: News release: "The home cleaning robot of the autonomous movement type (experimental machine)," Retrieved from the Internet: URL< www.i4u.com./japanreleases/hitachirobot.htm>. 5 pages, Mar. 2005.
Hoag et al., "Navigation and Guidance in interstellar space," ACTA Astronautica, vol. 2, pp. 513-533 , Feb. 1975.
Home Robot—UBOT; Microbotusa.com, retrieved from the WWW at www.microrobotusa.com, accessed Dec. 2, 2008, 2 pages.
Huntsberger et al., "CAMPOUT: A Control Architecture for Tightly Coupled Coordination of Multirobot Systems for Planetary Surface Exploration," *IEEE Transactions on Systems, Man, and Cybernetics—Part A: Systems and Humans*, 33(5):550-559, Sep. 2003.
Iirobotics.com, "Samsung Unveils Its Multifunction Robot Vacuum," Retrieved from the Internet: URL<.www.iirobotics.com/webpages/hotstuff.php?ubre=111>. 3 pages, Mar. 2005.
InMach "Intelligent Machines," Retrieved from the Internet: URL<www.inmach.de/inside.html>. 1 page , Nov. 2008.
Innovation First, "2004 EDU Robot Controller Reference Guide," Retrieved from the Internet: URL<http://www.ifirobotics.com>. 13 pages, Mar. 2004.
IT media, Retrieved from the Internet: URL<http://www.itmedia.co.jp/news/0111/16/robofesta_m.html>. Accessed Nov. 1, 2011, 8 pages (with English translation).
It's eye, Retrieved from the Internet: URL< www.hitachi.co.jp/rd/pdf/topics/hitac2003_10.pdf>. 2003, 11 pages (with English translation).
Jarosiewicz et al., "Final Report—Lucid," University of Florida, Departmetn of Electrical and Computer Engineering, EEL 5666—Intelligent Machine Design Laboratory, 50 pages, Aug. 1999.
Jensfelt et al., "Active Global Localization for a mobile robot using multiple hypothesis tracking," *IEEE Transactions on Robots and Automation*, 17(5): 748-760, Oct. 2001.
Jeong et al., "An intelligent map-building system for indoor mobile robot using low cost photo sensors,"*SPIE*, vol. 6042, 6 pages, 2005.
Kahney, "Robot Vacs are in the House," Retrieved from the Internet: URL<www.wired.com/news/technology/o,1282,59237,00.html>. 6 pages, Jun. 2003.
Karcher "Karcher RoboCleaner RC 3000," Retrieved from the Internet: URL<www.robocleaner.de/english/screen3.html>. 4 pages, Dec. 2003.
Karcher RC 3000 Cleaning Robot-user manual Manufacturer: Alfred-Karcher GmbH & Co, Cleaning Systems, Alfred Karcher-Str 28-40, PO Box 160, D-71349 Winnenden, Germany, Dec. 2002, 8 pages.
Karcher RC3000 RoboCleaner,—IMAGE, Accessed at <http://www.karcher.de/versions/int/assets/video/2_4_robo_en.swf>. Accessed Sep. 2009, 1 page.
Karcher USA, RC3000 Robotic Cleaner, website: http://www.karcher-usa.com/showproducts.php?op=view prod¶m1=143 ¶m2=&param3=, 3 pages, accessed Mar. 2005.
Karcher, "Product Manual Download Karch", available at www.karcher.com, 16 pages, 2004.
Karlsson et al, "Core Technologies for service Robotics," IEEE/RSJ International Conference on Intelligent Robots and Systems (IROS 2004), vol. 3, pp. 2979-2984, Sep. 2004.
Karlsson et al., The vSLAM Algorithm for Robust Localization and Mapping, Proceedings of the 2005 IEEE International Conference on Robotics and Automation, Barcelona, Spain, pp. 24-29, Apr. 2005.
King and Weiman, "HelpmateTM Autonomous Mobile Robots Navigation Systems," SPIE vol. 1388 Mobile Robots, pp. 190-198, 1990.
Kleinberg, The Localization Problem for Mobile Robots, Laboratory for Computer Science, Massachusetts Institute of Technology, 1994 IEEE, pp. 521-531, 1994.
Knights, et al., "Localization and Identification of Visual Landmarks," *Journal of Computing Sciences in Colleges*, 16(4):312-313, May 2001.
Kolodko et al., "Experimental System for Real-Time Motion Estimation," Proceedings of the 2003 IEEE/ASME International Conference on Advanced Intelligent Mechatronics (AIM 2003), pp. 981-986, 2003.
Komoriya et al., "Planning of Landmark Measurement for the Navigation of a Mobile Robot," Proceedings of the 1992 IEEE/RSJ International Cofnerence on Intelligent Robots and Systems, Raleigh, NC pp. 1476-1481, Jul. 1992.
KOOLVAC Robotic Vacuum Cleaner Owner's Manual, Koolatron, 2004, 13 pages.
Krotkov et al., "Digital Sextant," Downloaded from the internet at: http://www.cs.cmu.edu/~epk/ , 1 page, 1995.
Krupa et al., "Autonomous 3-D Positioning of Surgical Instruments in Robotized Laparoscopic Surgery Using Visual Servoin," *IEEE Transactions on Robotics and Automation*, 19(5):842-853, Oct. 2003.
Kuhl et al., "Self Localization in Environments using Visual Angles," VRCAI '04 Proceedings of the 2004 ACM SIGGRAPH international conference on Virtual Reality continuum and its applications in industry, pp. 472-475, 2004.
Kurs et al, Wireless Power transfer via Strongly Coupled Magnetic Resonances, Downloaded from www.sciencemag.org, Aug. 2007, 5 pages.
Kurth, "Range-Only Robot Localization and SLAM with Radio", http://www.ri.cmu.edu/pub_files/pub4/kurth_derek_2004_1/kurth_derek_2004_1.pdf. 60 pages, May 2004, accessed Jul. 27, 2012.
Kwon et al., "Table Recognition through Range-based Candidate Generation and Vision based Candidate Evaluation," ICAR 2007, The 13th International Conference on Advanced Robotics Aug. 21-24, 2007, Jeju, Korea, pp. 918-923, 2007.
Lambrinos et al., "A mobile robot employing insect strategies for navigation," Retrieved from the Internat: URL<http://www8.cs.umu.se/kurser/TDBD17/VT04/dl/Assignment%20Papers/lambrinos-RAS-2000.pdf>. 38 pages, Feb. 1999.
Lang et al., "Visual Measurement of Orientation Using Ceiling Features", 1994 IEEE, pp. 552-555, 1994.
Lapin, "Adaptive position estimation for an automated guided vehicle," *SPIE*, vol. 1831 Mobile Robots VII, pp. 82-94, 1992.
LaValle et al., "Robot Motion Planning in a Changing, Partially Predictable Environment," 1994 IEEE International Symposium on Intelligent Control, Columbus, OH, pp. 261-266, Aug. 1994.
Lee et al., "Development of Indoor Navigation system for Humanoid Robot Using Multi-sensors Integration", ION NTM, San Diego, CA pp. 798-805, Jan. 2007.
Lee et al., "Localization of a Mobile Robot Using the Image of a Moving Object," *IEEE Transaction on Industrial Electronics*, 50(3):612-619, Jun. 2003.
Leonard et al., "Mobile Robot Localization by tracking Geometric Beacons," *IEEE Transaction on Robotics and Automation*, 7(3):376-382, Jun. 1991.

(56) References Cited

OTHER PUBLICATIONS

Li et al. "Robust Statistical Methods for Securing Wireless Localization in Sensor Networks," Information Processing in Sensor Networks, 2005, Fourth International Symposium on, pp. 91-98, Apr. 2005.

Li et al., "Making a Local Map of Indoor Environments by Swiveling a Camera and a Sonar," Proceedings of the 1999 IEEE/RSJ International Conference on Intelligent Robots and Systems, pp. 954-959, 1999.

Lin et al., "Mobile Robot Navigation Using Artificial Landmarks," *Journal of robotics System*, 14(2): 93-106, 1997.

Linde, Dissertation—"On Aspects of Indoor Localization," Available at: https://eldorado.tu-dortmund.de/handle/2003/22854, University of Dortmund, 138 pages, Aug. 2006.

Lumelsky et al., "An Algorithm for Maze Searching with Azimuth Input", 1994 IEEE International Conference on Robotics and Automation, San Diego, CA vol. 1, pp. 111-116, 1994.

Luo et al., "Real-time Area-Covering Operations with Obstacle Avoidance for Cleaning Robots," IEEE, pp. 2359-2364, 2002.

Ma, Thesis—"Documentation on Northstar," California Institute of Technology, 14 pages, May 2006.

Madsen et al., "Optimal landmark selection for triangulation of robot position," Journal of Robotics and Autonomous Systems, vol. 13 pp. 277-292, 1998.

Malik et al., "Virtual Prototyping for Conceptual Design of a Tracked Mobile Robot," Electrical and Computer Engineering, Canadian Conference on, IEEE, PI. pp. 2349-2352, May 2006.

Martishevcky, "The Accuracy of point light target coordinate determination by dissectoral tracking system", SPIE vol. 2591, pp. 25-30, Oct. 23, 2005.

Maschinemarkt Würzburg 105, No. 27, pp. 3, 30, Jul. 5, 1999 (with English translation).

Matsumura Camera Online Shop: Retrieved from the Internet: URL< http://www.rakuten.co.jp/matsucame/587179/711512/>. Accessed Nov. 2011, 15 pages (with English translation).

Matsutek Enterprises Co. Ltd, "Automatic Rechargeable Vacuum Cleaner," http://matsutek.manufacturer.globalsources.com/si/6008801427181/pdtl/Home-vacuum/10 . . . , Apr. 2007, 3 pages.

McGillem et al., "Infra-red Lacation System for Navigation and Autonomous Vehicles," 1988 IEEE International Conference on Robotics and Automation, vol. 2, pp. 1236-1238, Apr. 1988.

McGillem,et al. "A Beacon Navigation Method for Autonomous Vehicles," *IEEE Transactions on Vehicular Technology*, 38(3):132-139, Aug. 1989.

McLurkin "Stupid Robot Tricks: A Behavior-based Distributed Algorithm Library for Programming Swarms of Robots," Paper submitted for requirements of BSEE at MIT, May 2004, 127 pages.

McLurkin, "The Ants: A community of Microrobots," Paper submitted for requirements of BSEE at MIT, May 1995, 60 pages.

Michelson, "Autonomous navigation," McGraw-Hill—Access Science, Encyclopedia of Science and Technology Online, 2007, 4 pages.

Miro et al., "Towards Vision Based Navigation in Large Indoor Environments," Proceedings of the IEEE/RSJ International Conference on Intelligent Robots and Systems, Beijing, China, pp. 2096-2102, Oct. 2006.

MobileMag, "Samsung Unveils High-tech Robot Vacuum Cleaner," Retrieved from the Internet: URL<http://www.mobilemag.com/content/100/102/C2261/>. 4 pages, Mar. 2005.

Monteiro et al., "Visual Servoing for Fast Mobile Robot: Adaptive Estimation of Kinematic Parameters," Proceedings of the IECON '93., International Conference on Industrial Electronics, Maui, HI, pp. 1588-1593, Nov. 1993.

Moore et al., "A simple Map-bases Localization strategy using range measurements," *SPIE*, vol. 5804 pp. 612-620, 2005.

Morland,"Autonomous Lawnmower Control", Downloaded from the internet at: http://cns.bu.edu/~cjmorlan/robotics/lawnmower/report.pdf, 10 pages, Jul. 2002.

Munich et al., "ERSP: A Software Platform and Architecture for the Service Robotics Industry," Intelligent Robots and Systems, 2005. (IROS 2005), pp. 460-467, Aug. 2005.

Munich et al., "SIFT-ing Through Features with ViPR", IEEE Robotics & Automation Magazine, pp. 72-77, Sep. 2006.

Nam et al., "Real-Time Dynamic Visual Tracking Using PSD Sensors and extended Trapezoidal Motion Planning", Applied Intelligence 10, pp. 53-70, 1999.

Nitu et al., "Optomechatronic System for Position Detection of a Mobile Mini-Robot," *IEEE Ttransactions on Industrial Electronics*, 52(4):969-973, Aug. 2005.

On Robo, "Robot Reviews Samsung Robot Vacuum (VC-RP3OW)," Retrieved from the Internet: URL <www.onrobo.com/reviews/AT_Home/vacuum_cleaners/on00vcrb30rosam/index.htm>. 2 pages, 2005.

OnRobo "Samsung Unveils Its Multifunction Robot Vacuum," Retrieved from the Internet: URL <www.onrobo.com/enews/0210/samsung_vacuum.shtml>. 3 pages, Mar. 2005.

Pages et al., "A camera-projector system for robot positioning by visual serving," Proceedings of the 2006 Conference on Computer Vision and Pattern Recognition Workshop (CVPRW06), 8 pages, Jun. 2006.

Pages et al., "Optimizing Plane-to-Plane Positioning Tasks by Image-Based Visual Servoing and Structured Light," *IEEE Transactions on Robotics*, 22(5):1000-1010, Oct. 2006.

Pages et al., "Robust decoupled visual servoing based on structured light," 2005 IEEE/RSJ, Int. Conf. on Intelligent Robots and Systems, pp. 2676-2681, 2005.

Park et al., "A Neural Network Based Real-Time Robot Tracking Controller Using Position Sensitive Detectors," IEEE World Congress on Computational Intelligence., 1994 IEEE International Conference on Neutral Networks, Orlando, Florida pp. 2754-2758, Jun./Jul. 1994.

Park et al., "Dynamic Visual Servo Control of Robot Manipulators using Neutral Networks," *The Korean Institute Telematics and Electronics*, 29-B(10):771-779, Oct. 1992.

Paromtchik "Toward Optical Guidance of Mobile Robots," Proceedings of the Fourth World Multiconference on Systemics, Cybermetics and Informatics, Orlando, FL, USA, Jul. 23, 2000, vol. IX, pp. 44-49, available at http://emotion.inrialpes.fr/~paromt/infos/papers/paromtchik:asama:sci:2000.ps.gz, accessed Jul. 3, 2012, 6 pages.

Paromtchik et al., "Optical Guidance System for Multiple mobile Robots," Proceedings 2001 ICRA. IEEE International Conference on Robotics and Automation, vol. 3, pp. 2935-2940, May 2001.

Penna et al., "Models for Map Building and Navigation", IEEE Transactions on Systems. Man. and Cybernetics., 23(5):1276-1301, Sep./Oct. 1993.

Pirjanian et al. "Representation and Execution of Plan Sequences for Multi-Agent Systems," Proceedings of the 2001 IEEE/RSJ International Conference on Intelligent Robots and Systems, Maui, Hawaii, pp. 2117-2123, Oct. 2001.

Pirjanian et al., "A decision-theoretic approach to fuzzy behavior coordination", 1999 IEEE International Symposium on Computational Intelligence in Robotics and Automation, 1999. CIRA '99., Monterey, CA, pp. 101-106, Nov. 1999.

Pirjanian et al., "Distributed Control for a Modular, Reconfigurable Cliff Robot," Proceedings of the 2002 IEEE International Conference on Robotics & Automation, Washington, D.C. pp. 4083-4088, May 2002.

Pirjanian et al., "Improving Task Reliability by Fusion of Redundant Homogeneous Modules Using Voting Schemes," Proceedings of the 1997 IEEE International Conference on Robotics and Automation, Albuquerque, NM, pp. 425-430, Apr. 1997.

Pirjanian et al., "Multi-Robot Target Acquisition using Multiple Objective Behavior Coordination," Proceedings of the 2000 IEEE International Conference on Robotics & Automation, San Francisco, CA, pp. 2696-2702, Apr. 2000.

Pirjanian, "Challenges for Standards for consumer Robotics," IEEE Workshop on Advanced Robotics and its Social impacts, pp. 260-264, Jun. 2005.

Pirjanian, "Reliable Reaction," Proceedings of the 1996 IEEE/SICE/RSJ International Conference on Multisensor Fusion and Integration for Intelligent Systems, pp. 158-165, 1996.

(56) References Cited

OTHER PUBLICATIONS

Prassler et al., "A Short History of Cleaning Robots," Autonomous Robots 9, 211-226, 2000, 16 pages.
Put Your Roomba . . . On, Automatic webpages: http://www.acomputeredge.com/roomba, 5 pages, accessed Apr. 2005.
Remazeilles et al., "Image based robot navigation in 3D environments," Proc. of *SPIE*, vol. 6052, pp. 1-14, Dec. 2005.
Rives et al., "Visual servoing based on ellipse features," *SPIE*, vol. 2056 Intelligent Robots and Computer Vision pp. 356-367, 1993.
Roboking—not just a vacuum cleaner, a robot!, Jan. 21, 2004, infocom.uz/2004/01/21/robokingne-prosto-pyilesos-a-robot/, accessed Oct. 10, 2011, 5 pages.
RoboMaid Sweeps Your Floors so You Won't Have to, the Official Site, website: Retrieved from the Internet: URL<http://therobomaid.com>. 2 pages, accessed Mar. 2005.
Robot Buying Guide, "LG announces the first robotic vacuum cleaner for Korea," Retrieved from the Internet: URL<http://robotbg.com/news/2003/04/22/1g_announces_the_first_robotic_vacu>. 1 page, Apr. 2003.
Robotics World, "A Clean Sweep," 5 pages, Jan. 2001.
Ronnback, "On Methods for Assistive Mobile Robots," Retrieved from the Internet: URL<http://www.openthesis.org/documents/methods-assistive-mobile-robots-595019.html>. 218 pages, Jan. 2006.
Roth-Tabak et al., "Environment Model for mobile Robots Indoor Navigation," *SPIE*, vol. 1388 Mobile Robots, pp. 453-463, 1990.
Sahin et al., "Development of a Visual Object Localization Module for Mobile Robots," 1999 Third European Workshop on Advanced Mobile Robots, (Eurobot '99), pp. 65-72, 1999.
Salomon et al., "Low-Cost Optical Indoor Localization system for Mobile Objects without Image Processing," IEEE Conference on Emerging Technologies and Factory Automation, 2006. (ETFA '06), pp. 629-632, Sep. 2006.
Sato, "Range Imaging Based on Moving Pattern Light and Spatio-Temporal Matched Filter," Proceedings International Conference on Image Processing, vol. 1., Lausanne, Switzerland, pp. 33-36, Sep. 1996.
Schenker et al., "Lightweight rovers for Mars science exploration and sample return," Intelligent Robots and Computer Vision XVI, *SPIE* Proc. 3208, pp. 24-36, 1997.
Schlemmer, "Electrolux Trilobite Robotic Vacuum," Retrieved from the Internet: URL< www.hammacher.com/publish/71579.asp?promo=xsells>. 3 pages, Mar. 2005.
Schofield, "Neither Master nor slave-A Practical Study in the Development and Employment of Cleaning Robots, Emerging Technologies and Factory Automation," 1999 Proceedings ETFA '99 1999 7th IEEE International Conference on Barcelona, Spain, pp. 1427-1434, Oct. 1999.
Shimoga et al., "Touch and Force Reflection for Telepresence Surgery," Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.
Sim et al, "Learning Visual Landmarks for Pose Estimation," IEEE International Conference on Robotics and Automation, vol. 3, Detroit, MI, pp. 1972-1978, May 1999.
Sobh et al., "Case Studies in Web-Controlled Devices and Remote Manipulation," Automation Congress, 2002 Proceedings of the 5th Biannual World, pp. 435-440, Dec. 2002.
Special Reports, "Vacuum Cleaner Robot Operated in Conjunction with 3G Cellular Phone," 59(9): 3 pages, Retrieved from the Internet: URL<http://www.toshiba.co.jp/tech/review/2004/09/59_0>. 2004.
Stella et al., "Self-Location for Indoor Navigation of Autonomous Vehicles," Part of the SPIE conference on Enhanced and Synthetic Vision SPIE vol. 3364, pp. 298-302, 1998.
Summet, "Tracking Locations of Moving Hand-held Displays Using Projected Light," Pervasive 2005, LNCS 3468, pp. 37-46, 2005.

Svedman et al., "Structure from Stereo Vision using Unsynchronized Cameras for Simultaneous Localization and Mapping," 2005 IEEE/RSJ International Conference on Intelligent Robots and Systems, pp. 2993-2998, 2005.
SVET Computers—New Technologies—Robot Vacuum Cleaner, Oct. 1999, available at http://www.sk.rs/1999/10/sknt01.html, 1 page, accessed Nov. 1, 2011.
Taipei Times, "Robotic vacuum by Matsuhita about to undergo testing," Retrieved from the Internet: URL<http://www.taipeitimes.com/News/worldbiz/archives/2002/03/26/0000129338>. accessed Mar. 2002, 2 pages.
Takio et al., "Real-Time Position and Pose Tracking Method of Moving Object Using Visual Servo System," 47th IEEE International Symposium on Circuits and Systems, pp. 167-170, 2004.
"Tech-on!," Retrieved from the Internet: URL http://techon.nikkeibp.co.jp/members/01db/200203/1006501/, accessed Nov. 2011, 7 pages (with English translation).
Teller, "Pervasive pose awareness for people, Objects and Robots," http://www.ai.mit.edu/lab/dangerous-ideas/Spring2003/teller-pose.pdf, 6 pages, Apr. 2003.
Terada et al., "An Acquisition of the Relation between Vision and Action using Self-Organizing Map and Reinforcement Learning," 1998 Second International Conference on Knowledge-Based Intelligent Electronic Systems, Adelaide, Australia, pp. 429-434, Apr. 1998.
The Sharper Image, eVac Robotic Vacuum—Product Details, www.sharperiamge.com/us/en/templates/products/pipmorework1printable.jhtml, 1 page, Accessed Mar. 2005.
TheRobotStore.com, "Friendly Robotics Robotic Vacuum RV400—The Robot Store," www.therobotstore.com/s.nl/sc.9/category.-109/it.A/id.43/.f, 1 page, Apr. 2005.
Thrun, Sebastian, "Learning Occupancy Grid Maps With Forward Sensor Models," Autonomous Robots 15, 28 pages, Sep. 1, 2003.
TotalVac.com, RC3000 RoboCleaner website, 2004, Accessed at http://ww.totalvac.com/robot_vacuum.htm (Mar. 2005), 3 pages.
Trebi-Ollennu et al., "Mars Rover Pair Cooperatively Transporting a Long Payload," Proceedings of the 2002 IEEE International Conference on Robotics & Automation, Washington, D.C. pp. 3136-3141, May 2002.
Tribelhorn et al., "Evaluating the Roomba: A low-cost, ubiquitous platform for robotics research and education," *IEEE*, pp. 1393-1399, 2007.
Tse et al., "Design of a Navigation System for a Household Mobile Robot Using Neural Networks," Department of Manufacturing Engg. & Engg. Management, City University of Hong Kong, pp. 2151-2156, 1998.
UAMA (Asia) Industrial Co., Ltd., "RobotFamily," 2005, 1 page.
UBOT, cleaning robot capable of wiping with a wet duster, Retrieved from the Internet: URL<http://us.aving.net/news/view.php?articleId=23031>. 4 pages, accessed Nov. 2011.
Watanabe et al., "Position Estimation of Mobile Robots With Internal and External Sensors Using Uncertainty Evolution Technique," 1990 IEEE International Conference on Robotics and Automation, Cincinnati, OH, pp. 2011-2016, May 1990.
Watts, "Robot, boldly goes where no man can," The Times—pp. 20, Jan. 1985.
Wijk et al., "Triangulation-Based Fusion of Sonar Data with Application in Robot Pose Tracking," *IEEE Transactions on Robotics and Automation*, 16(6):740-752, Dec. 2000.
Wolf et al., "Robust Vision-Based Localization by Combining an Image-Retrieval System with Monte Carol Localization,", *IEEE Transactions on Robotics*, 21(2):208-216, Apr. 2005.
Wolf et al., "Robust Vision-based Localization for Mobile Robots Using an Image Retrieval System Based on Invariant Features," Proceedings of the 2002 IEEE International Conference on Robotics & Automation, Washington, D.C., pp. 359-365, May 2002.
Wong, "EIED Online>> Robot Business", ED Online ID# 13114, 17 pages, Jul. 2006.
Yamamoto et al., "Optical Sensing for Robot Perception and Localization," 2005 IEEE Workshop on Advanced Robotics and its Social Impacts, pp. 14-17, 2005.

(56) References Cited

OTHER PUBLICATIONS

Yata et al., "Wall Following Using Angle Information Measured by a Single Ultrasonic Transducer," Proceedings of the 1998 IEEE, International Conference on Robotics & Automation, Leuven, Belgium, pp. 1590-1596, May 1998.
Yujin Robotics,"An intelligent cleaning robot," Retrieved from the Internet: URL<http://us.aving.net/news/view.php?articleId=7257>. 8 pages, accessed Nov. 2011.
Yun et al., "Image-Based Absolute Positioning System for Mobile Robot Navigation," IAPR International Workshops SSPR, Hong Kong, pp. 261-269, Aug. 2006.
Yun et al., "Robust Positioning a Mobile Robot with Active Beacon Sensors," *Lecture Notes in Computer Science*, 2006, vol. 4251, pp. 890-897, 2006.
Yuta et al., "Implementation of an Active Optical Range sensor Using Laser Slit for In-Door Intelligent Mobile Robot," IEE/RSJ International Workshop on Intelligent Robots and Systems (IROS 91) vol. 1, Osaka, Japan, pp. 415-420, Nov. 3-5, 1991.
Zha et al., "Mobile Robot Localization Using Incomplete Maps for Change Detection in a Dynamic Environment," Advanced Intelligent Mechatronics '97. Final Program and Abstracts., IEEE/ASME International Conference, pp. 110, Jun. 1997.
Zhang et al., "A Novel Mobile Robot Localization Based on Vision," *SPIE* vol. 6279, 6 pages, Jan. 2007.
Zoombot Remote Controlled Vaccuum-RV-500 New Roomba 2, website: http://cgi.ebay.com/ws/eBayISAPI.dl1?ViewItem&category=43526&item=4373497618&rd=1, accessed Apr. 20, 2005, 7 pages.
Office Action received for U.S. Appl. No. 11/648,241, dated Mar. 18, 2011, 11 pages.
Office Action received for U.S. Appl. No. 11/648,230, dated Mar. 2, 2011, 11 pages.
Office Action received for Australian Patent Application No. 2010212297, mailed on Feb. 16, 2011, 3 pages.
Office Action received for Australian Patent Application No. 2004316156, mailed on Feb. 13, 2009, 2 pages.
Extended Search Report received for European Patent Application No. 10181174.3, mailed on Feb. 10, 2011, 6 pages.
Extended Search Report received for corresponding European Patent Application No. 10181187.5, mailed on Feb. 10, 2011, 8 pages.
Office Action received for European Patent Application No. 10160949.3, mailed on Mar. 17, 2011, 5 pages.
Office Action received for European Patent Application No. 04704061.3, mailed on Mar. 6, 2007, 4 pages.
Office Action received for European Patent Application No. 04704061.3, mailed on Nov. 30, 2007, 4 pages.
Office Action received for Singapore Patent Application No. 200505559-5, mailed on Oct. 30, 2007, 4 pages.
Examination report dated Jan. 7, 2008 for U.S. Appl. No. 11/648,241.
Examination report dated Jan. 27, 2009 for U.S. Appl. No. 11/648,241.
Examination report dated Jan. 30, 2006 for U.S. Appl. No. 10/762,219.
Examination report dated Feb. 25, 2008 for U.S. Appl. No. 11/648,230.
Examination report dated Apr. 2, 2010 for U.S. Appl. No. 11/648,241.
Examination report dated Apr. 6, 2009 for U.S. Appl. No. 11/648,230.
Examination report dated May 14, 2007 for U.S. Appl. No. 10/762,219.
Examination report dated Jul. 29, 2008 for U.S. Appl. No. 11/648,241.
Examination report dated Oct. 17, 2008 for U.S. Appl. No. 11/648,230.
Examination report dated Nov. 12, 2009 for U.S. Appl. No. 11/648,230.
Examination report dated Aug. 12, 2010 for corresponding application (KR) 10-2006-7014807.
Examination report dated Aug. 12, 2010 for corresponding application (KR) 10-2009-7025882.
Examination report dated Jun. 11, 2010 for U.S. Appl. No. 11/648,230.
Examination report dated May 27, 2010 for corresponding application (EP) 10160949.3.
Examination report dated Sep. 10, 2008 for corresponding application (EP) 08151962.1.
Examination report dated Feb. 16, 2011 from corresponding Australian Patent Application No. 2010212297.
Extended Search Report dated Feb. 10, 2011 from corresponding EP Application No. 10181187.
JP 2006-551013; Office Action dated Apr. 27, 2009 for Japanese counterpart application (7 pages).
JP 2007-10829; Office Action dated May 11, 2009 for Japanese counterpart application (6 pages).
JP2006-551013; Office Action dated Apr. 27, 2009 for Japanese counterpart (7 pages).
Office Action received for European Patent Application No. 10160949.3, mailed on Mar. 17, 2011, 5 pages.
Office Action received for Korean Patent Application No. 10-2006-7014807, mailed on May 10, 2011.
Office Action received for Korean Patent Application No. 10-2009-7025882, mailed on May 10, 2011.
Office Action received for Korean Patent Application No. 10-2010-7025523, mailed on Feb. 15, 20011, 11 pages including English translation.
Office Action received for Korean Patent Application No. 10-2010-7025523, mailed on Feb. 15, 2011, 11 pages including English translation.
Office Action received for U.S. Appl. No. 11/834,575, mailed on May 29, 2009.
Office Action received for U.S. Appl. No. 11/834,575, mailed on May 5, 2008.
Office Action received for U.S. Appl. No. 11/834,575, mailed on Nov. 28, 2008.
Written Opinion for corresponding application PCT/US2004/001504, Aug. 20, 2012, 9 pages.

\* cited by examiner

AUTONOMOUS ROBOT AUTO-DOCKING AND ENERGY MANAGEMENT SYSTEMS AND METHODS

This application is a continuation of, and claims priority under 35 U.S.C. §120 from, U.S. application Ser. No. 13/291,633, entitled "Autonomous Robot Auto-Docking and Energy Management Systems and Methods," filed on Nov. 8, 2011, which is a continuation of, and claims priority under 35 U.S.C. §120 from, U.S. application Ser. No. 11/648,230, entitled "Autonomous Robot Auto-Docking and Energy Management Systems and Methods," filed on Dec. 29, 2006, which is a divisional, and claims priority under 35 U.S.C. §120 from, U.S. application Ser. No. 10/762,219, entitled "Autonomous Robot Auto-Docking and Energy Management Systems and Methods," filed on Jan. 21, 2004. The disclosures of each of these prior applications are considered part of the disclosure of this application and are hereby incorporated by reference in their entireties.

TECHNICAL FIELD

The present invention relates generally to robotic systems and, more specifically, to auto-docking and energy management systems for autonomous robots.

BACKGROUND

Automated robots and robotic devices are becoming more prevalent today and are used to perform tasks traditionally considered mundane, time-consuming, or dangerous. As the programming technology increases, so too does the demand for robotic devices that require a minimum of human interaction for tasks such as robot refueling, testing, and servicing. A goal is a robot that could be configured a single time, which would then operate autonomously, without any need for human assistance or intervention.

Robotic devices and associated controls, navigational systems, and other related systems moving in this direction are being developed. For example, U.S. Pat. No. 6,594,844 discloses a Robot Obstacle Detection System, the disclosure of which is hereby incorporated by reference in its entirety. Additional robot control and navigation systems are disclosed in U.S. patent application Ser. Nos. 10/167,851, 10/056,804, 10/696,456, 10/661,835, and 10/320,729 the disclosures of which are hereby incorporated by reference in their entireties.

Generally, autonomous robotic devices include an on-board power unit (usually a battery) that is recharged at a base or docking station. The types of charging stations and methods used by robots in finding or docking with them (e.g., radio signals, dead reckoning, ultrasonic beams, infrared beams coupled with radio signals, etc.) vary greatly in both effectiveness and application. Wires buried below the surface on which the robot operates are common, but are obviously limited in application, as it is costly to install guide wires within the floor of a building or below a road surface. If installed on the surface, the guide wires may be damaged by the robot itself or other traffic. Moreover, the wires need to be moved when the base station is relocated. A base station that emits a beam or beacon to attract the robotic device is, therefore, more desirable. Such devices, however, still exhibit numerous operational limitations.

Base stations that utilize emitted signals often still require additional safeguards to ensure proper mating between the robot and base station and, therefore, safe and effective charging. Some require mechanical locking devices to prevent dislocation of the robot during charging, or other components such raised guiding surfaces to direct the robot into contact with the station. Such components can increase the size of the base station while decreasing the aesthetics, important considerations for automated robots directed at the consumer market. An increase in base station size also typically makes unobtrusive placement in the home more difficult and decreases the floor area available for cleaning. Additionally, existing base stations generally lack the ability to protect themselves from contact with the robot during operation, increasing the likelihood of damage to either the station or robot, or dislocation of the base station. Such an unintentional collision may require human intervention to reposition the base station or repair a damaged component.

These limitations are, at present, a hurdle to creating a truly independent autonomous robot, free from human interaction. There is, therefore, a need for a robot and base station that can ensure proper mating regardless of location of the base station. Moreover, a system that can prevent inadvertent dislocation of the base station by eliminating collisions between the station and robot is desirable.

SUMMARY OF THE INVENTION

In one aspect, the invention relates to a method for energy management in a robotic device, the robotic device including at least one energy storage unit and a signal detector. The method includes the steps of: a base station for mating with the robotic device, the base station having a plurality of signal emitters including a first signal emitter and a second signal emitter; determining a quantity of energy stored in the energy storage unit, the quantity characterized at least by a high energy level and a low energy level; and performing, by the robotic device, a predetermined task based at least in part on the quantity of energy stored. In various embodiments of the foregoing aspect, coulometry or setting a time period are used to determine the quantity of energy stored or task period of the device.

In other embodiments of the foregoing aspect, the step of performing the predetermined task occurs when the quantity of energy stored exceeds the high energy level, the predetermined task including movement of the robotic device away from the base station in response to reception, by the signal detector, of a base station avoidance signal. Still other embodiments include the step of returning the robotic device to the base station in response to reception, by the signal detector, of a base station homing signal and/or returning the robotic device to the base station when the quantity of energy stored is less than the high energy level. In other embodiments of the foregoing aspect, the step of returning the robotic device to the base station occurs when the quantity of energy stored is less than the low energy level, and wherein the predetermined task includes a reduction in energy use by the robotic device. Various embodiments further include altering a travel characteristic of the robotic device to locate effectively the base station, charging the device upon contact, and/or resuming the predetermined or a different task.

In another aspect, the invention relates to a method of docking a robotic device with a base station that has a plurality of signal emitters, including a first signal emitter and a second signal emitter. The method includes the steps of orienting the robotic device in relation to (i) a first signal transmitted by the first signal emitter and (ii) a second signal transmitted by the second signal emitter, and maintaining an orientation of the robotic device relative to the first and second signals as the robotic device approaches to the base station. Certain embodiments of the method of the foregoing aspect include the steps of detecting, by the robotic device, an overlap between the first signal and the second signal; following, by the robotic device, a path defined at least in part by the signal overlap; and docking the robotic device with the base station. Other related embodiments include reducing the velocity of the robotic device in the step of following the path defined at least in part by the signal overlap.

Various embodiments of the method of the foregoing aspect also include, during the step of docking the robotic device with the base station: detecting, by the robotic device, contact with charging terminals on the base station, and stopping movement of the robotic device. In some embodiments, contact of one or more on-board tactile sensors can be used, additionally or alternatively, to stop movement of the robotic device. Other embodiments include the step of charging fully the robotic device and/or charging the robotic device to one of a plurality of charging levels. Certain embodiments allow for resumption of the predetermined task or a new task upon completion of charging.

In another aspect of the invention, the invention relates to an autonomous system including a base station, that includes charging terminals for contacting external terminals of a robotic device, and a first signal emitter and a second signal emitter. Certain embodiments of the above aspect provide that the first signal emitter transmit a base station avoidance signal and the second signal emitter transmit a base station homing signal. In other embodiments, the homing signal is a pair of signals, which can be either the same or different. The pair of signals may be emitted by a pair of emitters. In some embodiments, the signals may overlap, and may be optical signals.

Certain embodiments of the above aspect further include a robotic device for performing a predetermined task, the robotic device having at least one energy storage unit with an external terminal for contacting the charging terminal, and at least one signal detector. In certain embodiments, the at least one signal detector is adapted to detect at least one optical signal. The robotic device has, in certain embodiments, the capability to distinguish between the signals generated by multiple emitters.

Still other aspects of the current invention relate to an energy manager including: a robotic device having at least one energy storage unit and a signal detector; a base station for mating with the robotic device, the base station having a plurality of signal emitters including a first signal emitter and a second signal emitter; and a processor for determining a quantity of energy stored in the energy storage unit. Certain embodiments of the foregoing aspect use coulometry or set a time period to determine the quantity of energy stored or task period of the device. In still other embodiments the first signal emitter transmits an avoidance signal, thereby restricting a movement of the robotic device to directions away from the base station, and the second signal emitter transmits a homing signal, thereby directing a movement of the robotic device to the base station.

Other aspects of the invention relate to a homing system including a robotic device having a signal detector, and a base station having a first signal emitter and a second signal emitter. Certain embodiments of the foregoing aspect overlap signals transmitted by the first signal emitter and the second signal emitter. Still other embodiments further include charging terminals on the base station, and charging terminals on the robotic device.

An additional aspect of the invention relates to a horning system for base station including a first signal emitter that transmits a first signal projected outward from the first signal emitter, and a second signal emitter that transmits a second signal projected outward from the second signal emitter, such that the first signal and the second signal overlap. Another aspect relates to an avoidance system for restricting a movement of at least one of a first device and a second device, the avoidance system including a first device that emits a signal, and a second device that receives the signal, thereby restricting the movement of at least one of the first device and the second device.

Still another aspect of the invention relates to a base station, including a base plate and a backstop, for a robotic device including: electrical contacts located on a top side of the base plate; a first signal emitter located on the backstop wherein a signal transmitted by the first signal emitter restricts the robotic device from moving within a predetermined distance of the base station; and a second signal emitter and a third signal emitter, wherein a plurality of signals transmitted by the second signal emitter and the third signal emitter guide at least one electrical contact of the robotic device to contact the at least one electrical contact of the base station.

Another aspect of the invention relates to a method of charging a battery of a device, the method having the steps of providing low power to charging terminals of a charger, detecting presence of the device by monitoring at least one of a predetermined change in and a predetermined magnitude of a parameter associated with the charger, and increasing power to the charging terminals to charge the battery. One embodiment of the method of the above aspect further includes the steps of determining a level of charge in the device, and permitting charging of the battery in the device when the level of charge is below a predetermined threshold.

Still another aspect of the invention relates to a system for charging a mobile device, the system having: a stationary charger comprising first charging terminals, circuitry for detecting presence of the device by monitoring at least one of a predetermined change in and a predetermined magnitude of a parameter associated with the charger, and a mobile device having: a battery, and second charging terminals adapted to mate with first charging terminals. Various embodiments of the above aspect include systems wherein the circuitry determines a level of charge in the battery and controls a power level provided to the first charging terminals. Still other embodiments include systems wherein the circuitry increases the power level provided to the first charging terminals upon measuring a predetermined voltage across the first charging terminals when mated with the second charging terminal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
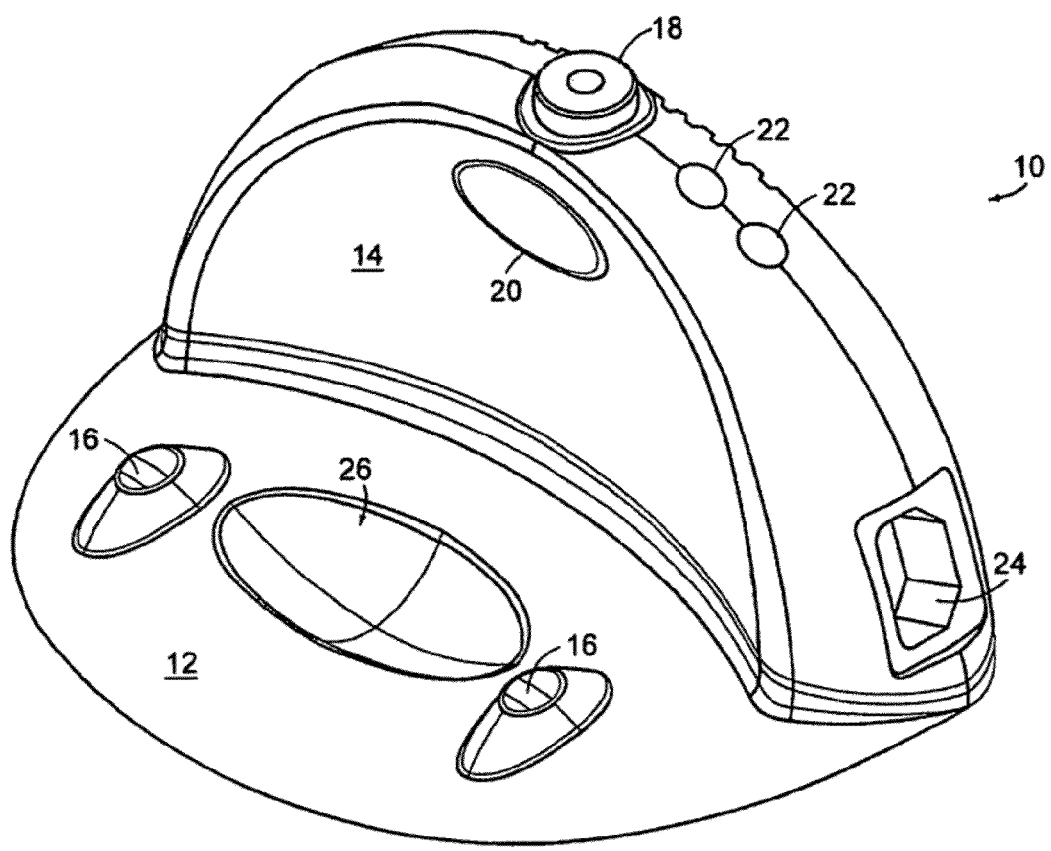
FIG. 1 is a schematic perspective view a base station in accordance with one embodiment of the invention.

FIG. 1 is a schematic perspective view a base station 10 in accordance with one embodiment of the invention. The base station 10 includes both a substantially horizontal base plate 12 and a substantially vertical backstop 14. The base station 10 may be any of a variety of shapes or sizes, providing sufficient space for the desired components and systems, described below. The base plate 12 is generally parallel to the ground surface on which the base station 10 rests, but may have a slight upwards angle directed toward the backstop 14. By minimizing the angle of rise of the base plate 12, the robotic device (FIGS. 2A-2B) may easily dock with the station 10. Electrical charging contacts 16 are located on a top surface of the base plate 12, allowing them to contact corresponding contacts (FIG. 2B) on the underside of the robotic device. The contacts 16 or the contacts on the robot may be either fixed or compliant. In the depicted embodiment, two contacts 16 (one positive, one negative) are utilized to properly detect a completed circuit when the robot 40 docks with the base station 10. This circuit recognition sequence is described in more detail below. In other embodiments, however, a single contact 16 or more than two contacts may be utilized. An additional contact would provide redundancy in the event that one of the robot contacts becomes damaged, dirty, or obstructed. This would allow the robot to dock and recharge itself properly, even after such an occurrence. Other embodiments utilize two contacts 16 to charge the battery and additional contacts to transmit data and information between the devices.

The contacts 16 are sized and positioned to reliably and repeatably contact the corresponding contacts on the robot. For example, the contacts 16 may be oversized and/or may extend above the base plate 12, e.g., in a domed shape, to ensure contact with the robot contacts. Alternatively, the contacts 16 may be flush-mounted on a base plate 12 with a higher angle of rise or may protrude above a base plate 12 that is flat or has substantially no rise. Depending on the application, the base plate 12 angle of rise may vary from 0° to up to 20° and greater. The embodiment depicted in FIG. 1 also includes a depression 26 in the base plate 12, between the two contacts 16, sized to engage a front caster (FIG. 2B) of the robot. The depression 26, in combination with the configuration of the charging contacts 16, ensures proper alignment and registration between the charging contacts on both the base station 14 and the robot. Alternatively, the depression 26 may contain one or more of the contacts 16 arranged to mate with one or more corresponding contacts on the front caster of the robot.

The backstop 14 provides locations for many of the base station 10 components. Specifically, in the depicted embodiment, the backstop 14 includes a top signal emitter 18, a front signal emitter 20, several indicator LEDs 22, and an AC plug receptacle 24. The top signal emitter 18 generates a first signal, such as an avoidance signal (FIG. 3), in a diffuse region near the base station 10 to prevent generally the robot from coming into inadvertent direct contact with the base station 10 while performing a task, such as vacuuming. The top signal emitter 18 generally utilizes a parabolic reflector to transmit the avoidance signal. In such an embodiment, the avoidance signal is emitted by a single LED directed at a lens whose geometry is determined by rotating a parabola about its focus. This parabolic reflector thus projects the avoidance signal 60 out in a 360° pattern, without the necessity of multiple emitters. A similar configuration can be employed in the detector on the robot, with a single receiver used in place of the single LED.

While the location of the top signal emitter 18 may vary, locating the emitter 18 on top of the backstop 14 transmits the avoidance signal through an uninterrupted 360° field around the base station 10. Alternatively, base stations designed for corner, on-wall, or near-wall installation may project the avoidance signal substantially only along the unobstructed side. The front signal emitter 20 projects one or more additional signals, such as homing beams (FIGS. 4A-4C), to allow the robotic device to orient itself during docking with the base station 10 for recharging or during periods of non-use. Naturally, if properly located on the base station 10, a single emitter may be used to perform the functions of both emitters 18, 20. Both the avoidance signal and homing beams described in more detail below.

Figure 2A:
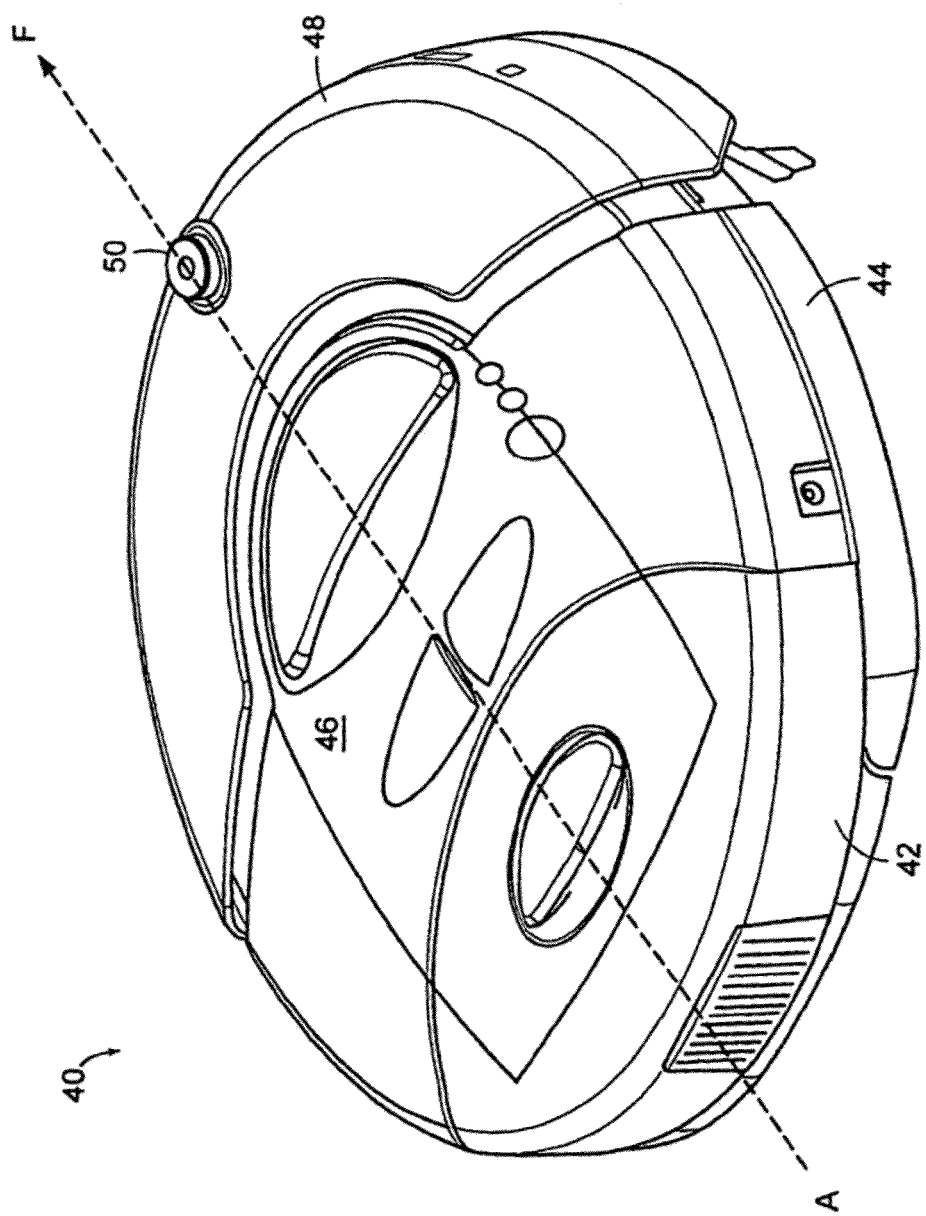
FIG. 2A is a schematic perspective view of an robotic device in accordance with one embodiment of the invention.
Figure 2B:
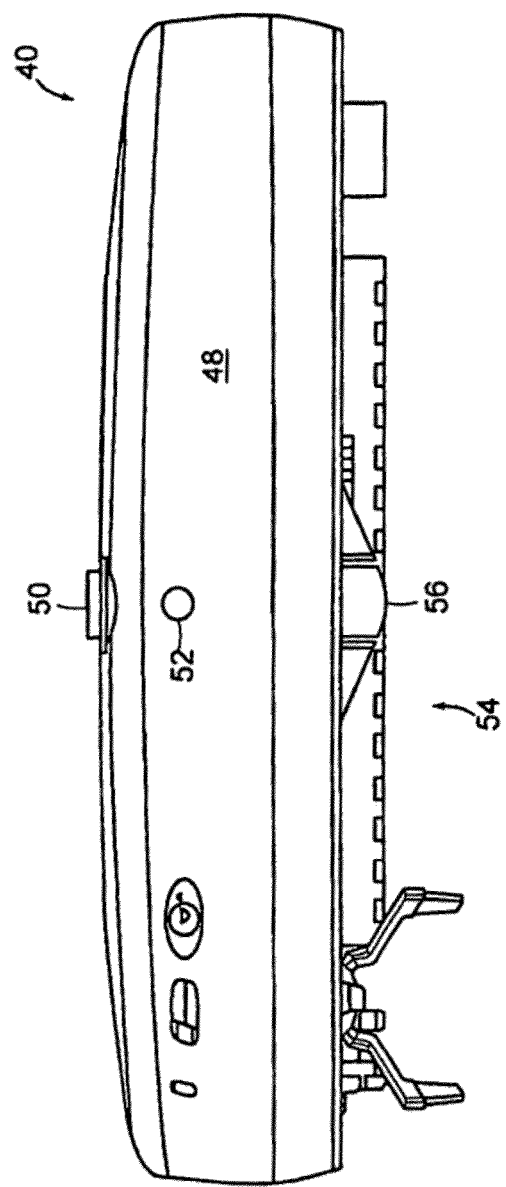
FIG. 2B is a schematic side view of the robotic device of FIG. 2A.

FIGS. 2A-2B are schematic perspective views of a robotic device, such as an autonomous robot 40 adapted to mate with the base station 10. In the following description of the autonomous robot 40, use of the terminology "forward/fore" refers generally to the primary direction of motion of the robot 40, and the terminology fore-aft axis (see reference characters "FA" in FIG. 2A) defines the forward direction of motion (indicated by arrowhead of the fore-aft axis FA), which is coincident with the fore-aft diameter of the robot 40.

In the embodiment depicted, the housing infrastructure 42 of the robot 40 includes a chassis 44, a cover 46, and a displaceable bumper 48. The chassis 44 may be molded from a material such as plastic as a unitary element that includes a plurality of preformed wells, recesses, and structural members for, inter alia, mounting or integrating elements of the various subsystems that operate the robotic device 40. Such subsystems may include a microprocessor, a power subsystem (including one or more power sources for the various subsystems and components), a motive subsystem, a sensor subsystem, and task-specific component subsystems. The cover 46 may be molded from a material such as plastic as a unitary element that is complementary in configuration with the chassis 44 and provides protection of and access to elements and components mounted to the chassis 44. The chassis 44 and the cover 46 are detachably integrated in combination by any suitable means (e.g., screws), and in combination, the chassis 44 and cover 46 form a structural envelope of minimal height having a generally cylindrical configuration that is generally symmetrical along the fore-aft axis FA.

The displaceable bumper 48, which has a generally arcuate configuration, is mounted in movable combination at the forward portion of the chassis 44 to extend outwardly therefrom (the "normal operating position"). The mounting configuration of the displaceable bumper 48 is such that it is displaced towards the chassis 44 (from the normal operating position) whenever the bumper 48 encounters a stationary object or obstacle of predetermined mass (the "displaced position"), and returns to the normal operating position when contact with the stationary object or obstacle is terminated (due to operation of a control sequence which, in response to any such displacement of the bumper 48, implements a "bounce" mode that causes the robot 40 to evade the stationary object or obstacle and continue its task routine).

Mounted on the robotic device 40 are a pair of detectors 50, 52. In this embodiment of the robotic device 40, the detectors 50, 52 receive signals projected from the emitters 18, 20 on the base station 10. In other embodiments, a single detector receives signals from both emitters 18, 20 on the base station 10, or more than two detectors may be used. In certain embodiments, the detectors 50, 52 are standard infrared ("IR") detector modules, that include a photodiode and related amplification and detection circuitry, in conjunction with an omni-directional lens, where omni-directional refers to a substantially single plane. The IR detector module can be of the type manufactured by East Dynamic Corporation (p/n IRM-8601S). However, any detector, regardless of modulation or peak detection wavelength, can be used as long as the emitters 18, 20 on the base station 10 are adapted to match the detectors 50, 52 on the robot 40. In another embodiment, IR phototransistors may be used with or without electronic amplification elements and may be connected directly to the analog inputs of a microprocessor. Signal processing tray then be used to measure the intensity of IR light at the robot 40, which provides an estimate of the distance between the robot 40 and the source of IR light. Alternatively, radio frequencies, magnetic fields, and ultrasonic sensors and transducers may be employed. As shown in FIGS. 2A-2B, at least one detector 50 is mounted at the highest point on the robot 40 and toward the front of the robot 40 as defined by the primary traveling direction, as indicated by an arrow on axis FA.

While the detector 50 is mounted at the highest point of the robot 40 in order to avoid shadows, it is desirable in certain applications to minimize the height of the robot 40 and/or the detector 50 to prevent operational difficulties and to allow the robot 40 to pass under obstacles. In certain embodiments, the detector 50 can be spring-mounted to allow the detector 50 to collapse into the body of the robot 40 when the robot 40 runs under a solid overhanging object.

One of skill in the art will recognize that, in alternative embodiments, multiple detectors can be used. Such an embodiment might include using multiple side-mounted sensors or detectors. Each of the sensors can be oriented in a manner so that a collective field of view of all the sensors corresponds to that of the single, top mounted sensor. Because a single, omni-directional detector is mounted at the highest point of the robot for optimal performance, it is possible to lower the profile of the robot by incorporating multiple, side mounted detectors.

The undercarriage of the robotic device 40 is indicated generally by numeral 54. One or more charging contacts are present in the undercarriage 54, configured in such a location to correspond with the location of the electrical contacts 16 of the base station 10. Generally, the charging contacts on the robotic device mirror those present on the base station 10, regardless of their location or orientation. In certain embodiments, the charging contacts may be larger on either the base station 10 or robot 40, to allow wider compliance in making contact. Also, the motive and task specific components of the robot 40 are located in the undercarriage 54. The motive components may include any combination of motors, wheels, drive shafts, or tracks as desired, based on cost or intended application of the robot 40, all of which are well known in the art. The motive components may include at least one caster 56 which, in this embodiment, drives the robot 40 and mates with the depression 26 on the base plate 12. As the tasks to which the robotic device 40 is suited are virtually unlimited, so too are the components to perform those tasks. For example, the robotic device 40 may be used for floor waxing and polishing, floor scrubbing, ice resurfacing (as typically performed by equipment manufactured under the brand name Zamboni®), sweeping and vacuuming, unfinished floor sanding and stain/paint application, ice melting and snow removal, grass cutting, etc. Any number of components may be required for such tasks, and may each be incorporated into the robotic device 40, as necessary. For simplicity, this application will describe vacuuming as the demonstrative predetermined task. It will be apparent, though, that the energy management and auto-docking functions disclosed herein have wide application across a variety of robotic systems.

The robotic device 40 uses a variety of behavioral modes to vacuum effectively a working area. Behavioral modes are layers of control systems that can be operated in parallel. The microprocessor is operative to execute a prioritized arbitration scheme to identify and implement one or more dominant behavioral modes for any given scenario, based upon inputs from the sensor system. The microprocessor is also operative to coordinate avoidance, homing, and docking maneuvers with the base station 10.

Generally, the behavioral modes for the described robotic device 40 can be characterized as: (1) coverage behavioral modes; (2) escape behavioral modes, and (3) safety behavioral modes. Coverage behavioral modes are primarily designed to allow the robotic device 40 to perform its operations in an efficient and effective manner, while the escape and safety behavioral modes are priority behavioral modes implemented when a signal from the sensor system indicates that normal operation of the robotic device 40 is impaired (e.g., obstacle encountered), or is likely to be impaired (e.g., drop-off detected).

Representative and illustrative coverage behavioral modes (for vacuuming) for the robotic device 40 include: (1) a Spot Coverage pattern; (2) an Obstacle-Following (or Edge-Cleaning) Coverage pattern, and (3) a Room Coverage pattern. The Spot Coverage pattern causes the robotic device 40 to clean a limited area within the defined working area, e.g., a high-traffic area. In a certain embodiments the Spot Coverage pattern is implemented by means of a spiral algorithm (but other types of self-bounded area algorithms, such as polygonal, can be used). The spiral algorithm, which causes outward or inward spiraling movement of the robotic device 40, is implemented by control signals from the microprocessor to the motive system to change the turn radius/radii thereof as a function of time or distance traveled (thereby increasing/decreasing the spiral movement pattern of the robotic device 40).

The robotic device 40 is operated in the Spot Coverage pattern for a predetermined or random period of time, for a predetermined or random distance (e.g., a maximum spiral distance) and/or until the occurrence of a specified event, e.g., activation of one or more of the obstacle detection systems (collectively a transition condition). Once a transition condition occurs, the robotic device 40 can implement or transition to a different behavioral mode, e.g., a Straight Line behavioral mode (in one embodiment of the robotic device 40, the Straight Line behavioral mode is a low priority, default behavior that propels the robot in an approximately straight line at a preset velocity of approximately 0.306 m/s) or a Bounce behavioral mode in combination with a Straight Line behavioral mode. The Bounce behavioral mode is a basic function that allows the robot 40 to evade a stationary object or obstacle and continue its task routine. Avoidance is achieved by executing a series of turns until the obstacle is no longer detected (i.e., the bumper 48 is no longer compressed).

If the transition condition is the result of the robotic device 40 encountering an obstacle, the robotic device 40 can take other actions in lieu of transitioning to a different behavioral mode. The robotic device 40 can momentarily implement a behavioral mode to avoid or escape the obstacle and resume operation under control of the spiral algorithm (i.e., continue spiraling in the same direction). Alternatively, the robotic device 40 can momentarily implement a behavioral mode to avoid or escape the obstacle and resume operation under control of the spiral algorithm (but in the opposite direction—reflective spiraling).

The Obstacle-Following Coverage pattern causes the robotic device 40 to clean the perimeter of the defined working area, e.g., a room bounded by walls, and/or the perimeter of an obstacle (e.g., furniture) within the defined working area. Preferably, the robotic device 40 utilizes an obstacle-following system to continuously maintain its position with respect to an obstacle, such as a wall or a piece of furniture, so that the motion of the robotic device 40 causes it to travel adjacent to and concomitantly clean along the perimeter of the obstacle. Different embodiments of the obstacle-following system can be used to implement the Obstacle-Following behavioral pattern.

In certain embodiments, the obstacle-following system is operated to detect the presence or absence of the obstacle. In an alternative embodiment, the obstacle-following system is operated to detect an obstacle and then maintain a predetermined distance between the obstacle and the robotic device 40. In the first embodiment, the microprocessor is operative, in response to signals from the obstacle-following system, to implement small clockwise or counterclockwise turns to maintain its position with respect to the obstacle. The robotic device 40 implements a small clockwise turn when the robotic device 40 transitions from obstacle detection to non-detection (reflection to non-reflection) or to implement a small counterclockwise turn when the robotic device 40 transitions from non-detection to detection (non-reflection to reflection). Similar turning behaviors are implemented by the robotic device 40 to maintain the predetermined distance from the obstacle.

The robotic device 40 is operated in the Obstacle-Following behavioral mode for a predetermined or random period of time, for a predetermined or random distance (e.g., a maximum or minimum distance) and/or until the occurrence of a specified event, e.g., activation of one or more of the obstacle detection system a predetermined number of times (collectively a transition condition). In certain embodiments, the microprocessor will cause the robotic device 40 to implement an Align behavioral mode upon activation of the obstacle-detection system in the Obstacle-Following behavioral mode, wherein the robot 40 implements a minimum angle counter-clockwise turn to align the robotic device 40 with the obstacle.

The Room Coverage pattern can be used by the robotic device 40 to clean any defined working area that is bounded by walls, stairs, obstacles or other barriers (e.g., a virtual wall unit that prevents the robotic device 40 from passing through an otherwise unbounded zone). Certain embodiments of the Room Coverage pattern include the Random-Bounce behavioral mode in combination with the Straight Line behavioral mode. Initially, the robotic device 40 travels under control of the Straight-Line behavioral mode (wheels operating at the same rotational speed in the same direction) until an obstacle is encountered. The obstacle may be indicated by physical contact with a wall or detection of the base station avoidance signal. Upon activation of one or more of the obstacle detection system, the microprocessor is operative to compute an acceptable range of new directions based upon the obstacle detection system activated. The microprocessor selects a new heading from within the acceptable range and implements a clockwise or counterclockwise turn to achieve the new heading with minimal movement. In some embodiments, the new turn heading may be followed by forward movement to increase the cleaning efficiency of the robotic device 40. The new heading may be randomly selected across the acceptable range of headings, or based upon some statistical selection scheme, such as Gaussian distribution. In other embodiments of the Room. Coverage behavioral mode, the microprocessing unit can be programmed to change headings randomly or at predetermined times, without input from the sensor system.

The robotic device 40 is operated in the Room Coverage behavioral mode for a predetermined or random period of time, for a predetermined or random distance (e.g., a maximum or minimum distance) and/or until the occurrence of a specified event, e.g., activation of the obstacle-detection system a predetermined number of times (collectively a transition condition).

Certain embodiments of the robotic device 40 include four escape behavioral modes: a Turn behavioral mode, an Edge behavioral mode, a Wheel Drop behavioral mode, and a Slow behavioral mode. One skilled in the art will appreciate that other behavioral modes can be utilized by the robotic device 40. One or more of these behavioral modes may be implemented, for example, in response to a current rise in one of the task components (indicating some sort of interference), the forward bumper 48 being in compressed position for determined time period, or detection of a wheel-drop event.

In the Turn behavioral mode, the robotic device 40 turns in place in a random direction, starting at higher velocity (e.g., twice normal turning velocity) and decreasing to a lower velocity (one-half normal turning velocity), i.e., small panic turns and large panic turns, respectively. Low panic turns are preferably in the range of 45° to 90°, large panic turns are preferably in the range of 90° to 270°. The Turn behavioral mode prevents the robotic device 40 from becoming stuck on surface impediments (e.g., high spot on carpet), from becoming stuck under other obstacles (e.g., an overhang), or from becoming trapped in a confined area.

In the Edge behavioral mode, the robotic device 40 follows the edge of an obstacle unit it has turned through a predetermined number of degrees, without activation of any of the obstacle detection units, or until the robotic device 40 has turned through a predetermined number of degrees, since initiation of the Edge behavioral mode. The Edge behavioral mode allows the robotic device 40 to move through the smallest possible openings to escape from confined areas.

In the Wheel Drop behavioral mode, the microprocessor reverses the direction of the main wheel drive assemblies momentarily, then stops them. If the activated wheel drop sensor deactivates within a predetermined time, the microprocessor then reimplements the behavioral mode that was being executed prior to the activation of the wheel drop sensor.

In response to certain events, e.g., activation of a wheel drop sensor or a cliff detector, the Slow behavioral mode is implemented to slow down the robotic device 40 for a predetermined distance and then ramp back up to its normal operating speed.

When a safety condition is detected by the sensor subsystem, e.g., a series of task component or wheel stalls that cause the corresponding electric motors to be temporarily cycled off, or a wheel drop sensor or a cliff detection sensor activated for greater that a predetermined period of time, the robotic device 40 is generally cycled to an off state. In addition, an audible alarm may be generated.

The foregoing description of typical behavioral modes for the robotic device 40 are intended to be representative of the types of operating modes that can be implemented by the robotic device 40. One skilled in the art will appreciate that the behavioral modes described above can be implemented in other combinations and other modes can be defined to achieve a desired result in a particular application.

A navigational control system may be used advantageously in combination with the robotic device 40 to enhance the cleaning efficiency thereof, by adding a deterministic component (in the form of a control signal that controls the movement of the robotic device 40) to the motion algorithms, including random motion, autonomously implemented by the robotic device 40. The navigational control system operates under the direction of a navigation control algorithm. The navigation control algorithm includes a definition of a predetermined triggering event.

Broadly described, the navigational control system, under the direction of the navigation control algorithm, monitors the movement activity of the robotic device 40. In one embodiment, the monitored movement activity is defined in terms of the "position history" of the robotic device 40, as described in further detail below. In another embodiment, the monitored movement activity is defined in terms of the "instantaneous position" of the robotic device 40.

The predetermined triggering event is a specific occurrence or condition in the movement activity of the robotic device 40. Upon the realization of the predetermined triggering event, the navigational control system operates to generate and communicate a control signal to the robotic device 40. In response to the control signal, the robotic device 40 operates to implement or execute a conduct prescribed by the control signal, i.e., the prescribed conduct. This prescribed conduct represents a deterministic component of the movement activity of the robotic device 40.

Figure 3:
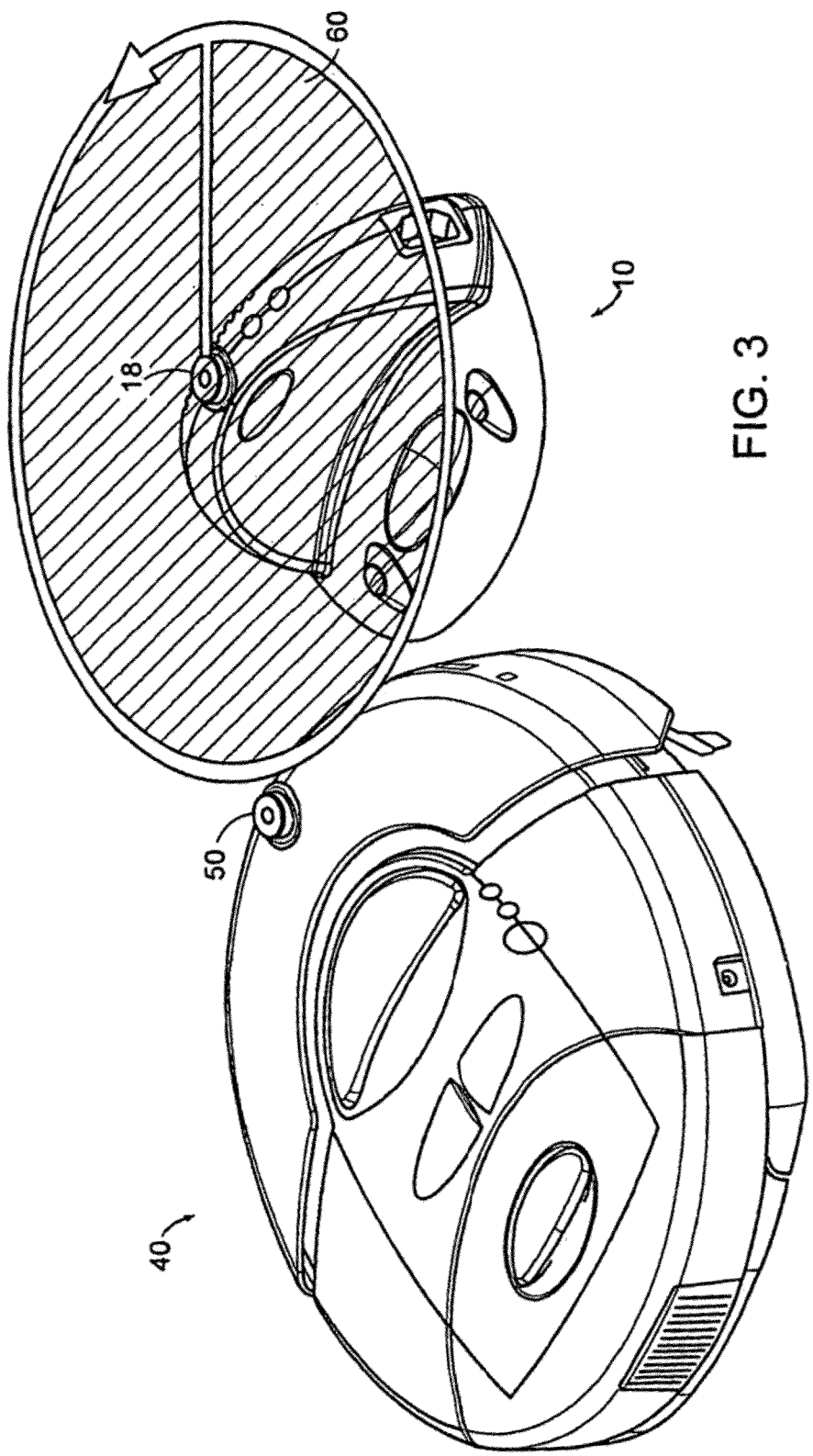
FIG. 3 is a schematic perspective view of a representation of robotic device and base station, depicting an avoidance signal in accordance with one embodiment of the invention transmitted by the base station and detected by the robotic device.

While the robotic device 40 is vacuuming, it will periodically approach the stationary base station 10. Contact with the base station 10 could damage or move the base station into an area that would make docking impossible. Therefore, avoidance functionality is desirable. To avoid inadvertent contact, the base station 10 may generate an avoidance signal 60, as depicted in FIG. 3. The avoidance signal 60 is shown being transmitted from the emitter 18 on the top of the backstop 14. The radial range of the avoidance signal 60 from the base station 10 may vary, depending on predefined factory settings, user settings, or other considerations. At a minimum, the avoidance signal 60 need only project a distance sufficient to protect the base station 10 from unintentional contact with the robot 40. The avoidance signal 60 range can extend from beyond the periphery of the base station 10, to up to and beyond several feet from the base station 10, depending on the application.

Here, the avoidance signal 60 is depicted as an omni-directional (i.e., single plane) infrared beam, although other signals are contemplated, such as a plurality of single stationary beams or signals. If stationary beams are used, however, a sufficient number could provide adequate coverage around the base station 10 to increase the chances of the robotic device 40 encountering them. When the detector 50 of the robotic device 40 receives the avoidance signal 60 from the emitter 18, the robotic device 40 can alter its course, as required, to avoid the base station 10. Alternatively, if the robotic device 40 is actively or passively seeking the base station 10 (for recharging or other docking purposes), it can alter its course toward the base station 10, such as by circling the base station 10, in such a way to increase the chances of encountering the homing signals described with respect to FIGS. 4A-4B below.

In certain embodiments, a collimated IR emitter is used, such as Waitrony p/n IE-320H. Because of potential interference from sunlight and other IR sources, most IR devices, such as remote controls, personal digital assistants and other IR communication devices, emit signals that may be modulated. Herein, the emitters 18, 20 modulate the beams at 38 kHz. In an embodiment of the present invention, additional modulation of the beams at a frequency, for example 500 Hz, different from the frequency of common IR bit streams, prevents interference with other IR equipment. Generally, the avoidance signal 60 is coded, as are the homing signals 62, 64. The bit encoding method as well as binary codes are selected such that the robot 40 can detect the presence of each signal, even if the robot 40 receives multiple codes simultaneously.

Whenever measurable level of IR radiation from the avoidance signal 60 strikes the detector 50, the robot's IR avoidance behavior is triggered. In one embodiment, this behavior causes the robot 40 to spin in place to the left until the IR signal falls below detectable levels. The robot 40 then resumes its previous motion. Spinning left is desired in certain systems because, by convention, the robot may attempt to keep all objects to its right during following operations. The robot's avoidance behavior is consistent with its other behaviors if it spins left on detecting the avoidance signal 60. In one embodiment, the detector 50 acts as a gradient detector. When the robot 40 encounters a region of higher IR intensity, the robot 40 spins in place. Because the detector 50 is mounted at the front of the robot 40 and because the robot 40 does not move backward, the detector 50 always "sees" the increasing IR intensity before other parts of the robot 40. Thus, spinning in place causes the detector 50 to move to a region of decreased intensity. When the robot 40 next moves forward, it necessarily moves to a region of decreased IR intensity—away from the avoidance signal 60.

In other embodiments, the base station 10 includes multiple coded emitters at different power levels or emitters that vary their power level using a system of time multiplexing. These create concentric coded signal rings which enable the robot 40 to navigate towards the base station 10 from far away in the room. Thus, the robot 40 would be aware of the presence of the base station 10 at all times, facilitating locating the base station 10, docking, determining how much of the room has been cleaned, etc. Alternatively, the robot 40 uses its motion through the IR field to measure a gradient of IR energy. When the sign of the gradient is negative (i.e., the detected energy is decreasing with motion), the robot 40 goes straight (away from the IR source). When the sign of the gradient is positive (energy increasing), the robot 40 turns. The net effect is to implement a "gradient descent algorithm," with the robot 40 escaping from the source of the avoidance signal 60. This gradient method may also be used to seek the source of emitted signals. The concentric rings at varying power levels facilitate this possibility even without a means for determination of the raw signal strength.

Figure 6A:
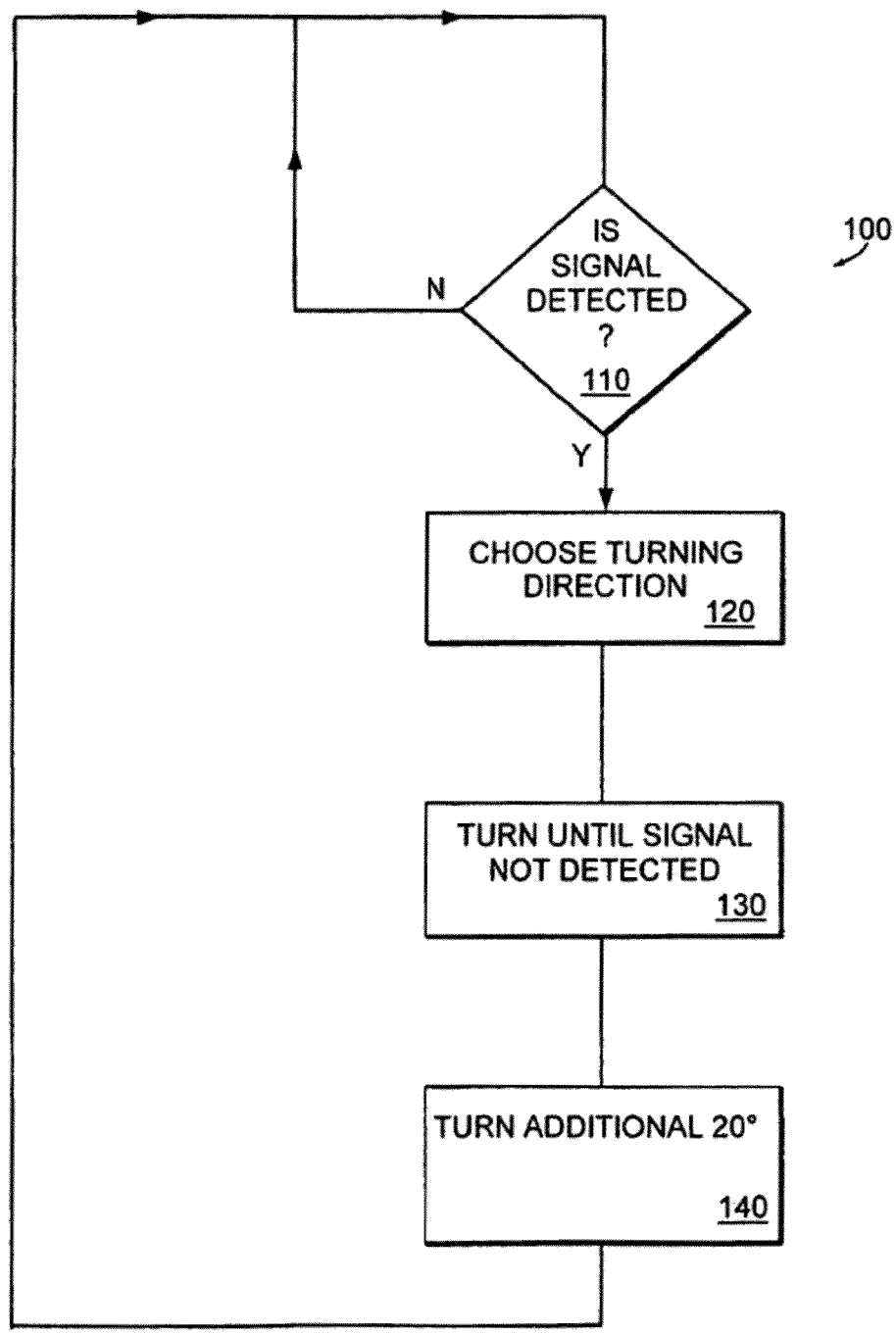
FIGS. 6A-6B are flow charts of avoidance algorithms in accordance with one embodiment of the invention.

A flowchart of one embodiment of the control logic of the avoidance behavior 100 is shown in FIG. 6A. The robot 40 determines whether the signal 110 detected by the detector 50 is an avoidance signal 60. If an avoidance signal 60 is detected, the robot 40 chooses a turning direction 120. The robot 40 then begins to turn in the chosen direction until the avoidance signal 60 is no longer detected 130. Once the avoidance signal 60 is no longer detected, the robot 40 continues turning for an additional amount 140, such as 20°, or the robot may turn randomly between 0° and 135°.

Figure 6B:
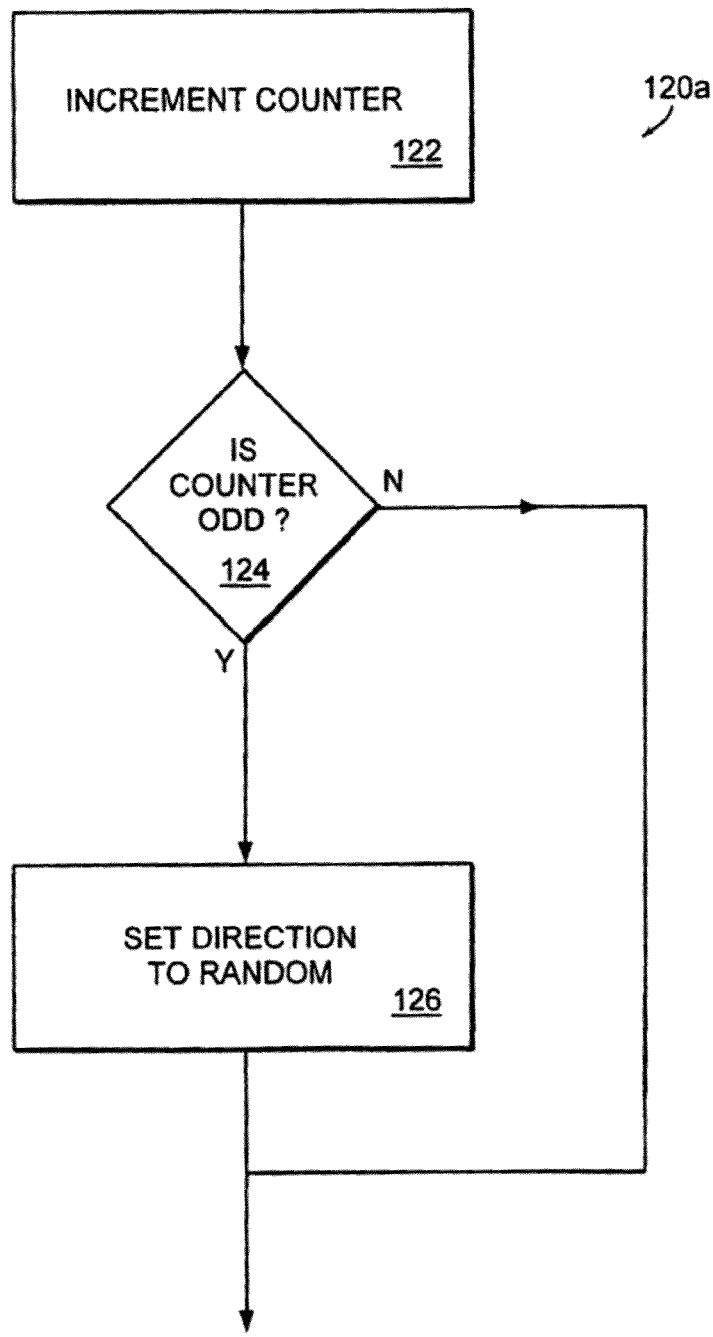

While in flowchart step 120, the direction selection algorithm 120a, illustrated in the flowchart shown in FIG. 6B, is used. The robot's control logic keeps track of the robot's discrete interactions with the beam. The robot 40 first increments a counter by one 122. On odd numbered interactions, the robot 40 chooses a new turning direction randomly 124, 126; on even numbered interactions, the robot 40 again uses its most recent turning direction. In the alternative, the robot 40 may choose which direction to turn at random. It will continue to turn in that direction until it has moved a sufficient distance.

In other embodiments, the robot 40 can always turn in a single direction or choose a direction randomly. When the robot 40 always turns in one direction, it may get stuck in a loop by turning away from the beam, bumping into another obstacle in a room, turning back toward the beam, seeing the beam again, turning away, bumping again, ad infinitum. Moreover, when the robot 40 only turns in a single direction, it consequently may fail to vacuum certain areas of the floor. Thus, where the robot's task is to complete work evenly throughout a room, a single turning direction may not be optimal. If the direction is chosen purely randomly, the robot 40 may turn back and forth often, as it encounters the beam.

Again referring to FIG. 6A, in the embodiment of step 140, the robot 40 turns an additional 20° from the point at which the avoidance signal 60 is lost. The arc of the turn can be varied for the particular robot 40 and application. The additional turn helps to prevent the robot 40 from re-encountering the avoidance signal 60 immediately after first encountering it. For various applications, the amount of additional movement (linear or turning) can be a predetermined distance, angle or time, or in the alternative may include a random component. In still other embodiments, the robot's avoidance behavior may include reversing the robot's direction until the avoidance signal 60 is no longer detected, or as described above, the robot may turn randomly between 0° and 135° after losing the avoidance signal 60.

Figure 4A:
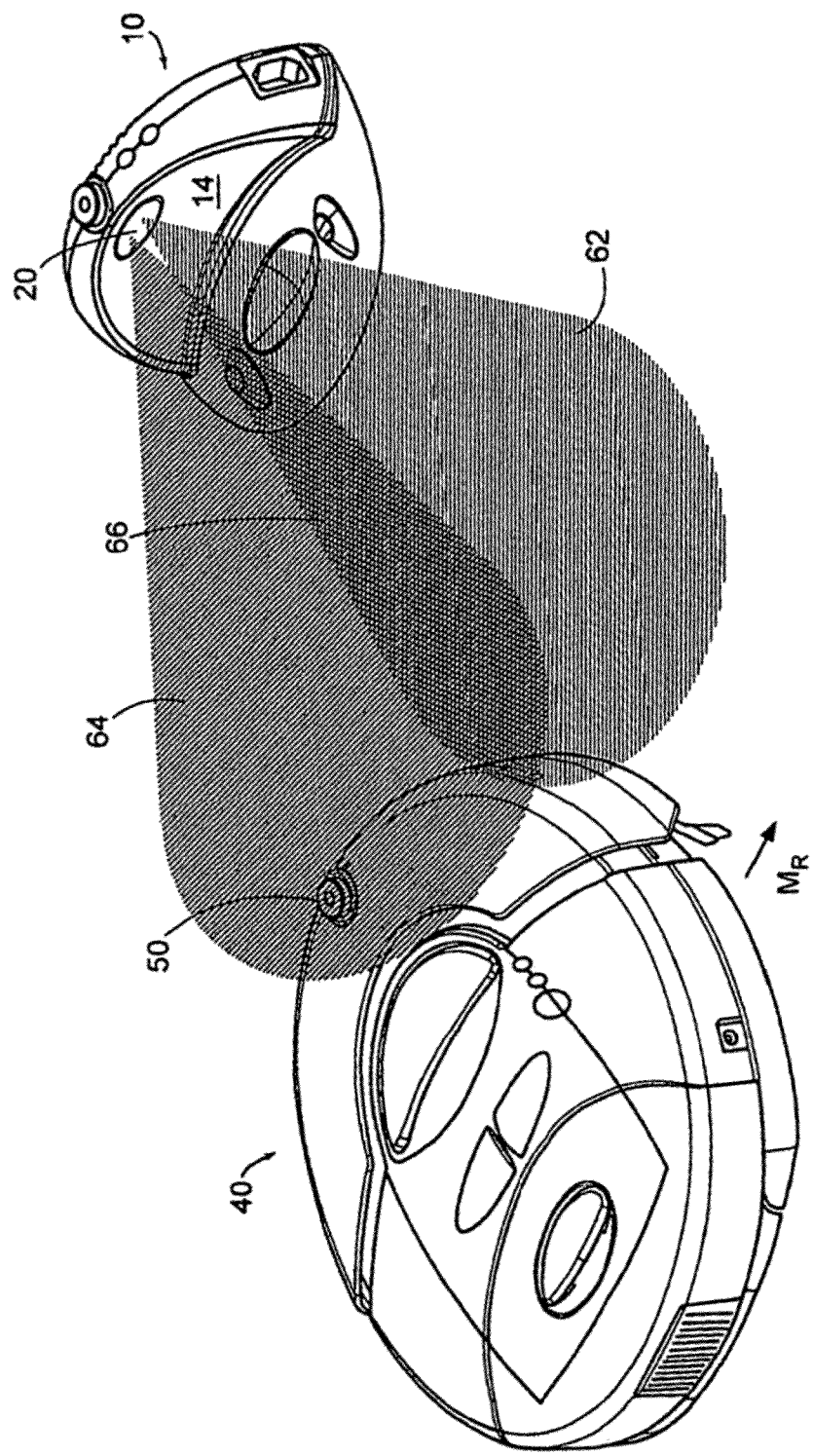
FIGS. 4A-4C are schematic perspective views of representations of homing signals in accordance with one embodiment of the invention transmitted by the base station and detected by the robotic device.
Figure 4B:
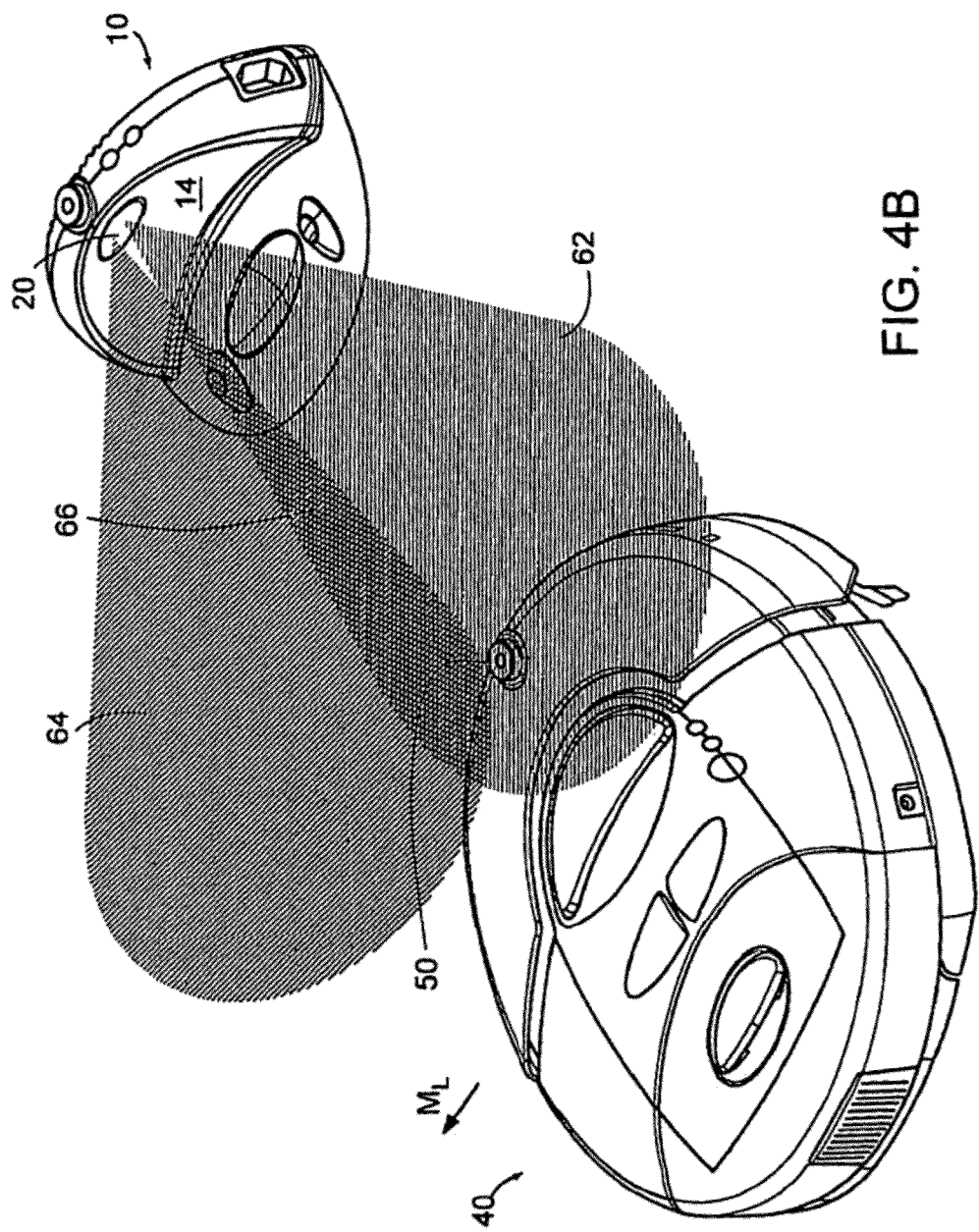
Figure 4C:
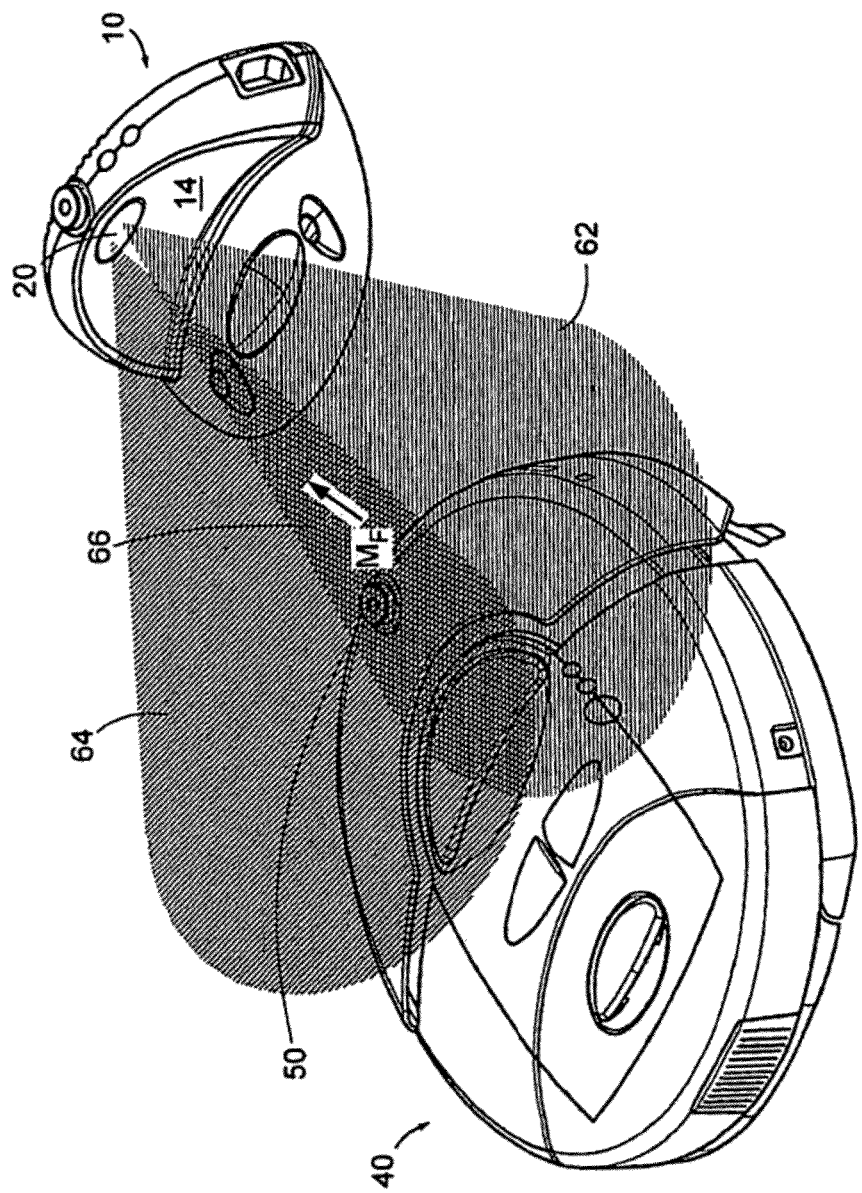

FIGS. 4A-4C depict the robotic device 40 in various stages of seeking the base station 10 by using the homing signals 62, 64. The robotic device 40 may seek the base station 10 when it detects the need to recharge its battery, or when it has completed vacuuming the room. As described above, once the robotic device 40 detects the presence of the avoidance signal 60 (and therefore the base station 10), it can move as required to detect the homing signals 62, 64. As with the avoidance signal 60 above, the projected range and orientation of the homing signals 62, 64 may be varied, as desired. It should be noted however, that longer signals can increase the chance of the robot 40 finding the base station 10 efficiently. Longer signals can also be useful if the robotic device 40 is deployed in a particularly large room, where locating the base station 10 randomly could be inordinately time consuming. Homing signal 62, 64 ranges that extend from approximately six inches beyond the front of the base plate 12, to up to and beyond several feet beyond the base plate 12 are contemplated, depending on application. Naturally, the angular width of the homing signals 62, 64 may vary depending on application, but angular widths in the range of 5° to up to and beyond 60° are contemplated. A gradient behavior as described above can also be used to aid the robot in seeking out the base station.

In addition to operating as navigational beacons, horning signals 62, 64 (and even the avoidance signal 60) may also be used to transmit information, including programming data, fail safe and diagnostic information, docking control data and information, maintenance and control sequences, etc. In such an embodiment, the signals can provide the control information, dictating the robot's reactions, as opposed to the robot 40 taking certain actions upon contacting certain signals from the base station 10. In that case, the robot 40 functions as more of a slave to the base station 10, operating as directed by the signals sent.

The robot 40 performs its docking with the base station 10 accurately and repeatably, without the need for gross mechanical guidance features. The two homing signals 62, 64 are distinguishable by the robotic device, for example as a red signal 62 and a green signal 64. IR beams are generally used to produce the signals and, as such, are not visible. The color distinction is given for illustrative purposes only, and any "color" (i.e., signal bit pattern) may be used, provided the robotic device 40 recognizes which signal to orient a particular side. Alternatively, the signals 62, 64 may be distinguished by using different wavelengths or by using different carrier frequencies (e.g., 380 kHz versus 38 kHz, etc.).

Thus, when the robotic device 40 wants or needs to dock, if the detector 50 receives the red signal 62 transmitting from the base station 10, it moves to keep the red signal 62 on the robot's right side; if it detects the green signal 64 transmitting from the base station 10, it moves to keep the green signal 64 on the robot's left side. Where the two signals overlap (the "yellow" zone 66), the robot 40 knows that the base station 10 is nearby and may then dock. Such a system may be optimized to make the yellow zone 66 as thin as practicably possible, to ensure proper orientation and approach of the robot 40 and successful docking. Alternatively, the red signal 62 and green signal 64 may be replaced by a single signal, which the robot 40 would follow until docked.

FIGS. 4A-4C depict, at various stages, a docking procedure utilizing two signals. In FIG. 4A, the detector 50 is in the green or left signal 64 field, and thus the robotic device 40 will move towards the right, in direction $M_R$ in an effort to keep that green signal 64 to the left of the robot 40 (in actuality, the robot 40 moves to keep the green signal 64 to the left of the detector 50). Similarly, in FIG. 4B, the detector 50 is in the red or right signal 62 field, and thus the robotic device 40 will move towards the left, in direction $M_L$ in an effort to keep that red signal 64 to the right of the detector 50. Last, in FIG. 4C, the detector 50 has encountered yellow zone 66. At this point, the robotic device 40 will move in direction $M_F$ directly towards the base station 10. While approaching the base station 10, the robotic device 40 may slow its speed of approach and/or discontinue vacuuming, or perform other functions to ensure trouble-free docking. These operations may occur when the robot 40 detects the avoidance signal 60, thus recognizing that it is close to the base station 10, or at some other predetermined time, e.g., upon a change in the signal from the emitters 62, 64.

Figure 5:
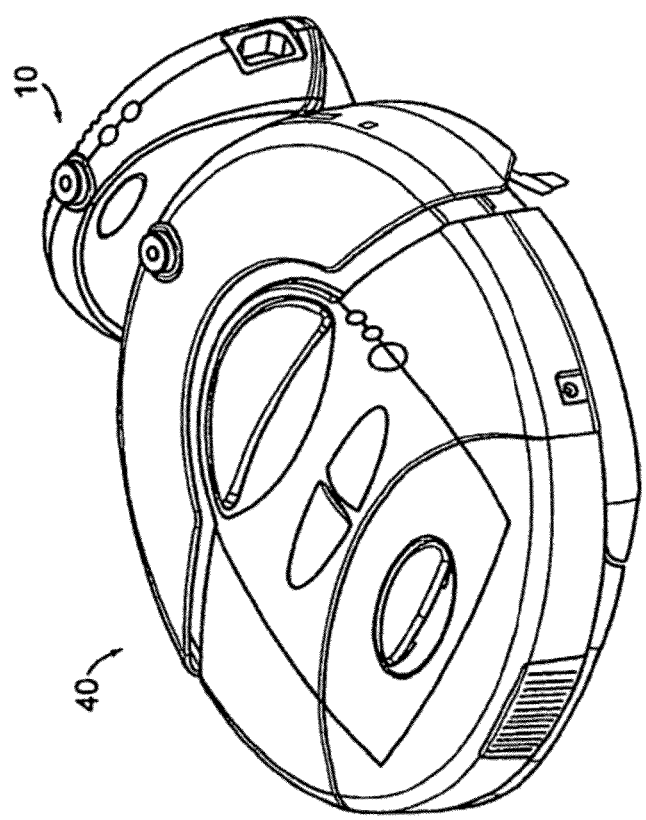
FIG. 5 is a schematic perspective view of the robotic device and the base station in a docking or mating position.

Various methods are contemplated for ensuring that the robot 4Q correctly docks with base station 10. For example, the robot 40 can continue to move toward the base station 10 (within the yellow zone 66) until the bumper 48 is depressed, signaling the robot 40 that it has contacted the base station 10. Another embodiment overlaps the horning signals 62, 64 such that the yellow zone 66 terminates at a point calibrated such that the robot 40 will contact the charging contacts 16 upon reaching the termination point. Other embodiments simply stop the robot 40 when its electrical contacts touch the electrical contacts 16 on the base station 10. This would guarantee that the robot 40 is moving over the contacts 16, providing a wiping action that cleans the contacts 16 and improves the electrical integrity of the connection. This also enables the base station 10 to be lighter, since it does not have to resist the force necessary to depress the robot's bumper 48. FIG. 5 shows the robotic device 40 completely docked with the base station 10. Naturally, this procedure may also utilize detector 52 or a combination of both detectors.

While this embodiment of the invention describes use of IR signals for both avoidance and homing, the system and method of the present invention can use other signals to accomplish the goals. Other types of waves may have drawbacks, however. For example, radio waves are more difficult and expensive to make directional, and visible light suffers from interference from many sources and may be distracting to users. Sound waves could also be used, but it is similarly difficult to make sound purely directional and such waves tend to scatter and reflect more.

Figure 7:
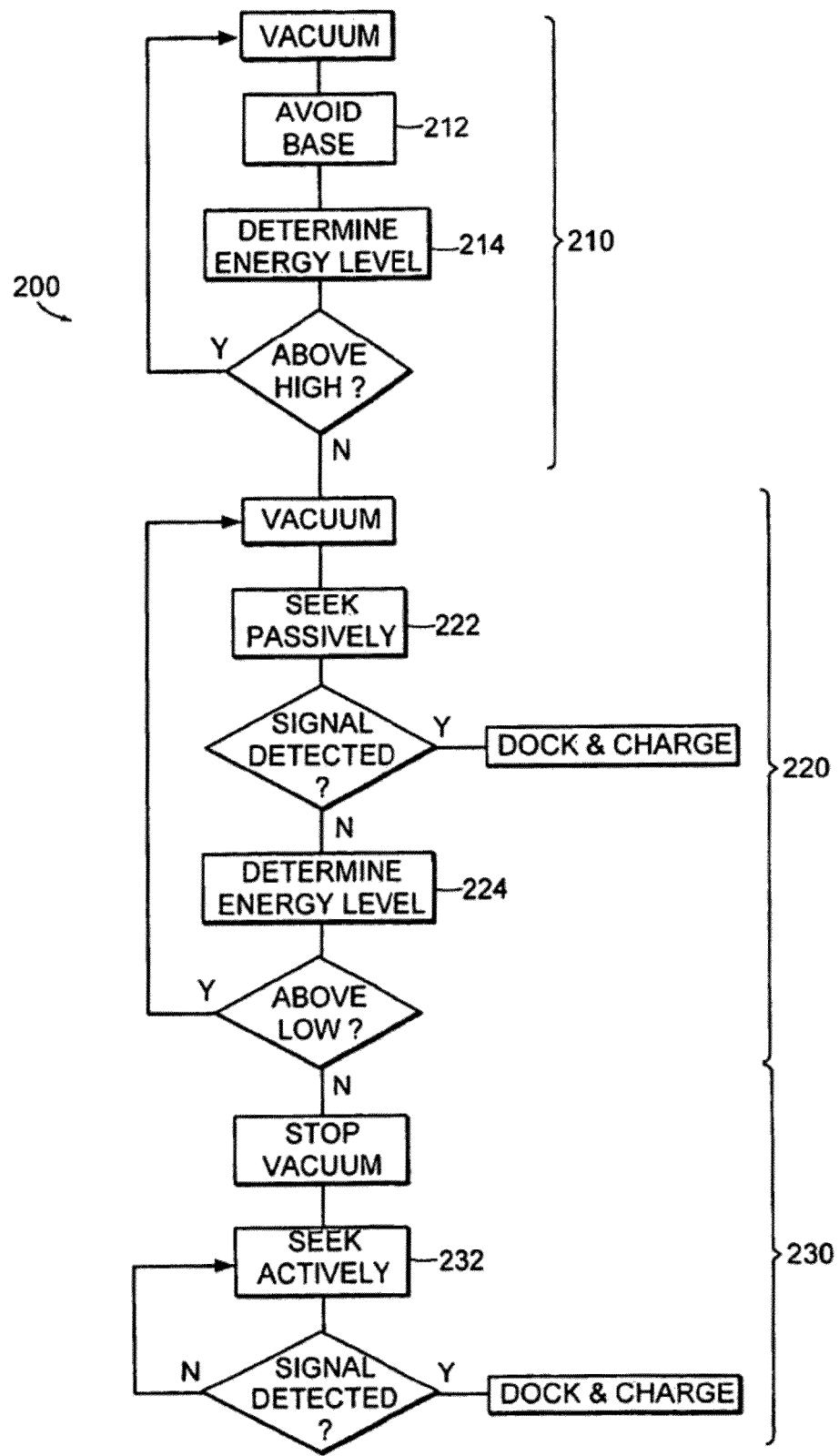
FIG. 7 is a flow chart of an energy management algorithm in accordance with one embodiment of the invention.

FIG. 7 depicts a schematic diagram which shows the control sequence 200 of the robotic device 40 during vacuuming. Generally, the control sequence 200 includes three subsequences based on the measured energy level of the robotic device 40. Those are referenced generally as a high energy level 210, a medium energy level 220, and a low energy level 230. In the high energy level subsequence 210, the robotic device 40 performs its predetermined task, in this case, vacuuming (utilizing various behavioral modes as described above), while avoiding the base station 212. When avoiding the base station 212, the robotic device 40 performs its avoidance behavior and continues to operate normally. This process continues while the robotic device 40 continually monitors its energy level 214. Various methods are available to monitor the energy level 214 of the power source, such as coulometry (i.e., the measuring of current constantly entering and leaving the power source), or simply measuring voltage remaining in the power source. Other embodiments of the robotic device 40 may simply employ a timer and a look-up table stored in memory to determine how long the robotic device 40 can operate before it enters a different energy level subsequence. Still other embodiments may simply operate the robot 40 for a predetermined time period before recharging, without determining which energy level subsequence it is operating in. If the robot 40 operates on a liquid or gaseous fuel, this level may also be measured with devices currently known in the art.

Once the energy remaining drops below a predetermined high level, the robot 40 enters its medium energy level sequence 220. The robot 40 continues to vacuum and monitor its energy level 224, employing methods indicated in step 214 above. In the medium energy level 220, however, the robot 40 "passively seeks" 222 the base station 10. While passively seeking 222 the base station 10, the robot 40 does not alter its travel characteristics; rather, it continues about its normal behavioral mode until it fortuitously detects the avoidance signal 60 or a homing signal 62, 64, each of which tray be followed until the robot 40 ultimately docks with the base station 10. In other words, if the robot detects the avoidance signal 60 while passively seeking 222, rather than avoiding the base station 10 as it normally would, it alters its travel characteristics until it detects the homing signals 62 or 64, thus allowing it to dock.

Alternatively, the robot 40 continues operating in this medium energy level subsequence 220 until it registers an energy level 224 below a predetermined low level. At this point, the robot 40 enters the low level subsequence 230, characterized by a change in operation and travel characteristics. To conserve energy, the robot 40 may discontinue powering all incidental systems, and operations, such as vacuuming, allowing it to conserve as much energy as possible for "actively searching" 232 for the base station 10. While actively searching 232, the robot 40 may alter its travel characteristics to increase its chances of finding the base station 10. It may discontinue behavioral modes such as those employing a spiral movement, which do not necessarily create a higher chance of locating the base station, in favor of more deliberate modes, such as wall-following. This deliberate seeking will continue until the robot 40 detects the presence of the base station 10, either by detecting the avoidance signal 60 or the homing signals 62, 64. Clearly, additional subsequences may be incorporated which sound alarms when the power remaining reaches a critical level, or which reconstruct the route the robot 40 has taken since last contacting the base station 10 to aid in relocating the station 10.

The robot 40 may also dock because it has determined that it has completed its assigned task (e.g., vacuuming a room). The robot 40 may make this determination based on a variety of factors, including considerations regarding room size, total run time, total distance traveled, dirt sensing, etc. Alternatively, the robot may employ room-mapping programs, using the base station 10 and/or walls and large objects as points of reference. Upon determining that it has completed its task, the robot 40 will alter its travel characteristics in order to find the base station 10 quickly.

Once the robot 40 contacts the base station 10, it can recharge itself autonomously. Circuitry within the base station 10 detects the presence of the robot 40 and then switches on the charging voltage to its contacts 16. The robot 40 then detects the presence of the charging voltage and then switches on its internal transistor power switch to allow current flow into the battery. In one embodiment, the base station 10 contains a constant-current type switching charger. Maximum current is limited to approximately 1.25 amps even under a short circuit condition. Maximum unloaded terminal voltage is limited to approximately 22Vdc. This constant-current charging circuit is used to charge the battery in the robot 40 via the electrical connections provided by the contacts 16 on the base station 10 and those on the undercarriage 54 of the robot 40. One embodiment of this charging sequence is detailed below.

Generally, while the robot 40 is away from the base station 10, the charging contacts 16 will present five volts, limited to 1 mA maximum short circuit current flow. This low voltage/low current "sense" condition limits the amount of available energy at the contacts 16, thus rendering them safe in the event they are contacted by humans, animals, and electrically conductive objects. The contacts on the undercarriage 54 of the robot 40, when contacting the contacts 16 on the base station 10, present a precise resistive load that, along with a resistor in the base station 10, creates a high impedance voltage divider. A microprocessor that constantly monitors the voltage across the contacts 16 recognizes this lower voltage. This voltage divider creates a specific voltage, plus or minus a known tolerance. When the microprocessor determines that the voltage has fallen into the specific range, it detects that the robot 40 is present. The microprocessor then turns on a transistor switch that delivers a higher voltage/current charge (capable of charging the robot's internal battery) to the charging contacts 16. Alternatively, the robot 40 and/or base station 10 can verify the integrity of the charging circuit by sending signals through the IR beams, thereby confirming that the robot 40 has, in fact, docked.

Figure 8:
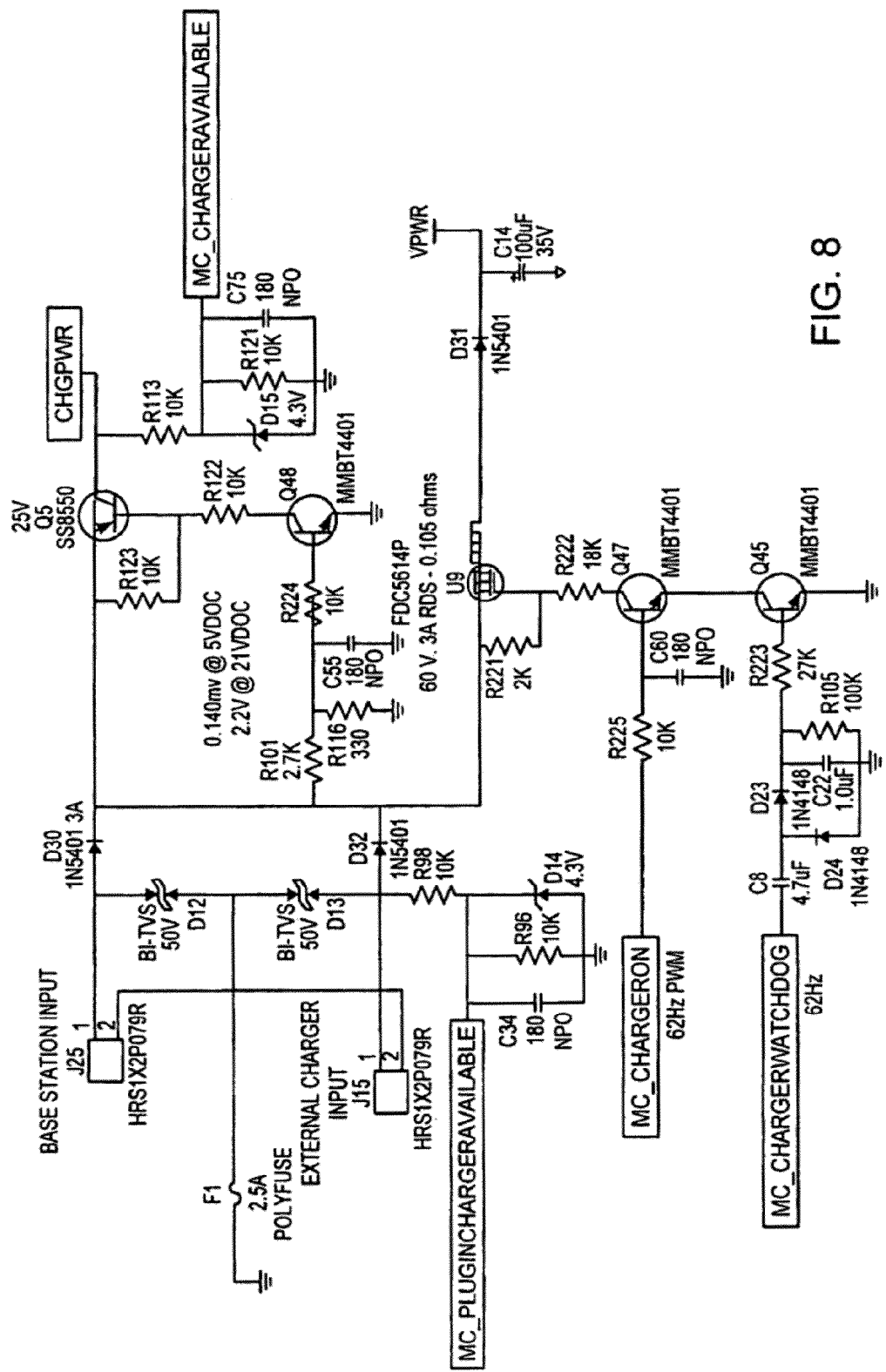
FIG. 8 depicts an embodiment of the charger circuitry schematic in accordance with one embodiment of the invention.

FIG. 8 depicts an embodiment of the charger circuitry schematic. With five volts being presented by the base station, it is the job of resistor dividers R101 and R116 to hold Q48 and Q5 off when J25 is in contact with the initial low voltage state. This divider also provides the known impedance of R101 plus R116 in parallel with R224 plus the base-emitter diode drop of Q48. This Thevenin impedance is in series with a resistor in the docking station thus forming a voltage divider. A window comparator circuit within the docking station looks for a specific voltage created by the divider. Once the base station has determined this impedance is likely the robot (not some other conductive body), it then delivers the full 22 volt capable, 1.25 Amp charging voltage to the robot.

At the onset of this higher voltage, the divider of R101 and R224 are such that the requirements are met to turn on Q48 and Q5 respectively. It is this combination of transistors that then allows current to flow to the on-board robot electronics only, allowing the robot's processor to become active if in fact it was inoperative due to a depleted battery.

Once operative, the robot's processor is then able to detect the presence of the base station voltage via R113 and D15 and if driving, turn off its drive motors. Once stable on the charging contacts, it becomes the job of the robot processor to measure the internal robot battery and decide when and what type of charging control cycle is needed when allowing current to flow into the battery. For example, if the battery is at 12 volts, then it is acceptable to turn on Q45 and Q47 via processor control, in order to allow current to flow through FET U9 to the battery on a continuous basis.

If, however, the battery voltage is deemed less than 5 volts, it generally would not be desirable to allow the full current to flow to the battery on a continuous basis. The reason this condition is of concern lies in the fact that the power source within the DOC is a constant current charger, which will adjust its output voltage to be slightly higher than the battery voltage in order to flow 1.25 A into the battery. In some cases, this might be millivolts higher than the battery voltage itself and in the case of the battery at low voltage, for example, 3 volts, would cause the output voltage to drop below the necessary 5 volt level needed to operate the on board base station and robot electronics suite.

In this case, the robot processor then delivers a pulse width modulation to the charger control line pertaining to Q47, such that the energy storage capacitors in both the robot and base station maintain enough charge to keep their respective electronics working properly throughout the charge pulse. The energy storage capacitors are then replenished during the off time of the pulse width modulation charging cycle, ready to then sustain the next charge pulse. This scenario continues until the battery has been charged to the point where a continuous charge is no longer able to bring the supply voltage down to a critical level and the charge control can become a static level.

Since this pulse width modulation process in this embodiment relies on software control, health monitoring of the processor, both within the base station and robot, are important. The requirement then set fourth for charging is for a charger "watchdog" be incorporated via Q45 such that a static high or low state on this signal line will disable current flow into the battery. It is a requirement of the robot processor to continuously pulse this control line in order for any current to flow, therefore eliminating most cases of processor latch up due to electrostatic discharge or other battery related events from mistreating the charging profile. Naturally, other control and related fail safe schemes could be utilized.

The described charging sequence provides particular safety features, even though the charging contacts 16 are exposed and energized. Because a specific resistance required to create a specific voltage drop across the contacts 16 when the 5-volt sense voltage is present (i.e., when the robot 40 is not docked) there is no danger of electric shock due to accidental contact because the low sense current is harmless. Also, the base station 10 will never switch to the higher voltage/current level, because the sense current has not entered the predetermined range. When the base station 10 does determine that the robot 40 is present, it delivers the charging voltage/current. This charging current is limited to approximately 22 volts/1.25 amps maximum. Even if inadvertent contact occurred during delivery of the charging current—which is unlikely, since the robot chassis 44 effectively blocks the contacts 16—the voltage delivered would not present a serious shock hazard, as it is relatively low.

Another level of safety is afforded by the base station 10 checking for the robot 40 at regular intervals, from as little as once per minute to as much as 10 times per second or more. Thus, in the event that the robot 40 is dislodged from the base station 10 (either by an animal or human), the charging current could be shut down immediately. This same condition applies if the contacts 16 are short circuited with the robot 40 docked (either intentionally or accidentally, for example, if the robot 40 drags debris onto the charging contacts 16).

An additional safety feature of this charging sequence prevents overheating of contacts 16 due to intentional shorting or oxidation. A thermal circuit breaker or similar device can be employed to perform this task, as well as a microprocessor equipped with a temperature measuring subroutine. The circuit breaker, however, provides the advantage of controlling contact temperature in the event of a microprocessor or software failure. Additionally, the base station 10 circuitry can also incorporate a timer to reset the temperature measuring subroutine or circuit breaker in the event of system failure. These safety controls may be incorporated into the "watchdog" described above.

While docked with the base station 10, the robot 40 can also perform other maintenance or diagnostic checks. In certain embodiments, the robot 40 can completely recharge its power source or only partially charge it, based on various factors. For example, if the robot 40 determines, through the use of route-tracking subroutines, that only a small portion of the room still requires vacuuming, it may take only a minimal charge before returning to complete cleaning of the room. If, however, the robot 40 requires a full charge before returning to clean the room, that option is also available. If the robot 40 has completed its vacuuming of the room prior to docking, it may dock, fully recharge, and stand by to await a signal (either internal or external) to begin its next cleaning cycle. While in this stand-by mode, the robot 40 may continue to measure its energy levels and may begin charging sequences upon reaching an energy level below a predetermined amount. Alternatively, the robot 40 may maintain a constant or near-constant trickle charge to keep its energy levels at or near peak. Other behaviors while in the docking position such as diagnostic functions, internal mechanism cleaning, communication with network, or data manipulation functions may also be performed.

While there have been described herein what are to be considered exemplary and preferred embodiments of the present invention, other modifications of the invention will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the invention. Accordingly, what is desired to be secured by Letters Patent is the invention as defined and differentiated in the following claims.

What is claimed is:
1. An autonomous cleaning robot, comprising:
   an undercarriage;
   a wheel extending from the undercarriage toward a ground surface to support at least a portion of the mobile device above the ground surface;

an energy storage unit supported by the undercarriage and configured to be charged while the robot is positioned at a base station;

a navigational control system configured to direct the robot about a room, including mapping the room with respect to walls and objects as points of reference, and to monitor an amount of room remaining to be cleaned;

wherein the robot is configured to control charging as a function of the amount of room remaining to be cleaned.

2. The autonomous cleaning robot of claim 1, wherein the control system is configured to track a cleaning route of the robot and to thereby monitor the amount of room remaining to be cleaned.

3. The autonomous cleaning robot of claim 1, wherein the control system is configured to use a known position of the base station as a point of reference in mapping the room.

4. The autonomous cleaning robot of claim 1, wherein the control system is configured to alter a travel characteristic of the robot upon determining that the robot has completed a task, to direct the robot to the base station for charging.

5. The autonomous cleaning robot of claim 1, wherein the robot is configured to control charging at the base station by only partially charging the energy storage unit before leaving the base station.

6. The autonomous cleaning robot of claim 5, wherein the robot is configured to leave the base station and continue cleaning the room upon determining that the energy storage unit has reached a minimum amount of stored energy necessary to complete cleaning of the room.

7. The autonomous cleaning robot of claim 1, wherein the robot is configured to control charging at the base station by remaining at the base station and continuing to monitor remaining energy of the energy storage unit upon determining that the robot has completed cleaning the room.

8. The autonomous cleaning robot of claim 1, wherein the robot is configured to return to the base station when a quantity of energy remaining in the energy storage unit falls to a predetermined threshold.

9. The autonomous cleaning robot of claim 8, wherein the navigational control system is configured to direct the robot to the base station by seeking a base station homing signal.

10. The autonomous cleaning robot of claim 8, wherein the robot is configured to determine the quantity of energy in the energy storage unit using at least one of coulomtery and operating time.

11. The autonomous cleaning robot of claim 1, wherein the robot is configured to disable a cleaning function while returning to the base station for charging.

12. The autonomous cleaning robot of claim 1, wherein the energy storage unit comprises a battery.

13. The autonomous cleaning robot of claim 1, wherein the energy storage unit comprises electrical contacts arranged to make electrical contact with the base station during charging.

* * * * *